(12) United States Patent
Kono

(10) Patent No.: US 11,300,431 B2
(45) Date of Patent: Apr. 12, 2022

(54) PHYSICAL QUANTITY MEASUREMENT DEVICE

(71) Applicant: DENSO CORPORATION, Kariya (JP)

(72) Inventor: Yasushi Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/191,042

(22) Filed: Mar. 3, 2021

(65) Prior Publication Data

US 2021/0190559 A1 Jun. 24, 2021

Related U.S. Application Data

(63) Continuation of application No. PCT/JP2019/026932, filed on Jul. 8, 2019.

(30) Foreign Application Priority Data

Sep. 6, 2018 (JP) .............................. JP2018-167182

(51) Int. Cl.
*G01F 1/684* (2006.01)
*G01F 1/692* (2006.01)
*G01F 1/69* (2006.01)
*F02M 35/10* (2006.01)

(52) U.S. Cl.
CPC ....... *G01F 1/684* (2013.01); *F02M 35/10386* (2013.01); *G01F 1/6842* (2013.01); *G01F 1/6845* (2013.01); *G01F 1/69* (2013.01); *G01F 1/692* (2013.01)

(58) Field of Classification Search
CPC . G01F 1/684; G01F 1/69; G01F 1/692; G01F 1/6842; G01F 1/6845; G01F 5/00; F02M 35/10386
See application file for complete search history.

(56) References Cited

U.S. PATENT DOCUMENTS

| 5,708,205 | A  | * | 1/1998 | Yamada | G01F 1/692 |
|           |    |   |        |        | 73/204.26 |
| 6,516,785 | B1 | * | 2/2003 | Nakada | G01F 1/684 |
|           |    |   |        |        | 123/494 |
| 9,791,306 | B2 | * | 10/2017 | Tashiro | H05K 3/305 |

FOREIGN PATENT DOCUMENTS

| JP | 2005-337956 | | 12/2005 | | |
| JP | 2012013601 A | * | 1/2012 | ......... | G01F 15/185 |
| JP | 2014-001984 | | 1/2014 | | |
| JP | 2014-001985 | | 1/2014 | | |
| JP | 2014-185867 | | 10/2014 | | |
| JP | 2017-020982 | | 1/2017 | | |

* cited by examiner

*Primary Examiner* — Ryan D Walsh
(74) *Attorney, Agent, or Firm* — Nixon & Vanderhye P.C.

(57) ABSTRACT

The physical quantity measurement device for measuring the physical quantity of the fluid has a measurement flow passage through which the fluid flows; a detection element for detecting the physical quantity of the fluid; a plate-shape physical quantity detector that detects the physical quantity of the fluid by the detection element in the measurement flow passage; a protection body that protects the physical quantity detector; a body recess arranged on the outer surface of the protection body at a position separated from the physical quantity detector in the orthogonal direction, which is orthogonal to a thickness direction of the physical quantity detector.

12 Claims, 37 Drawing Sheets

FIG. 5
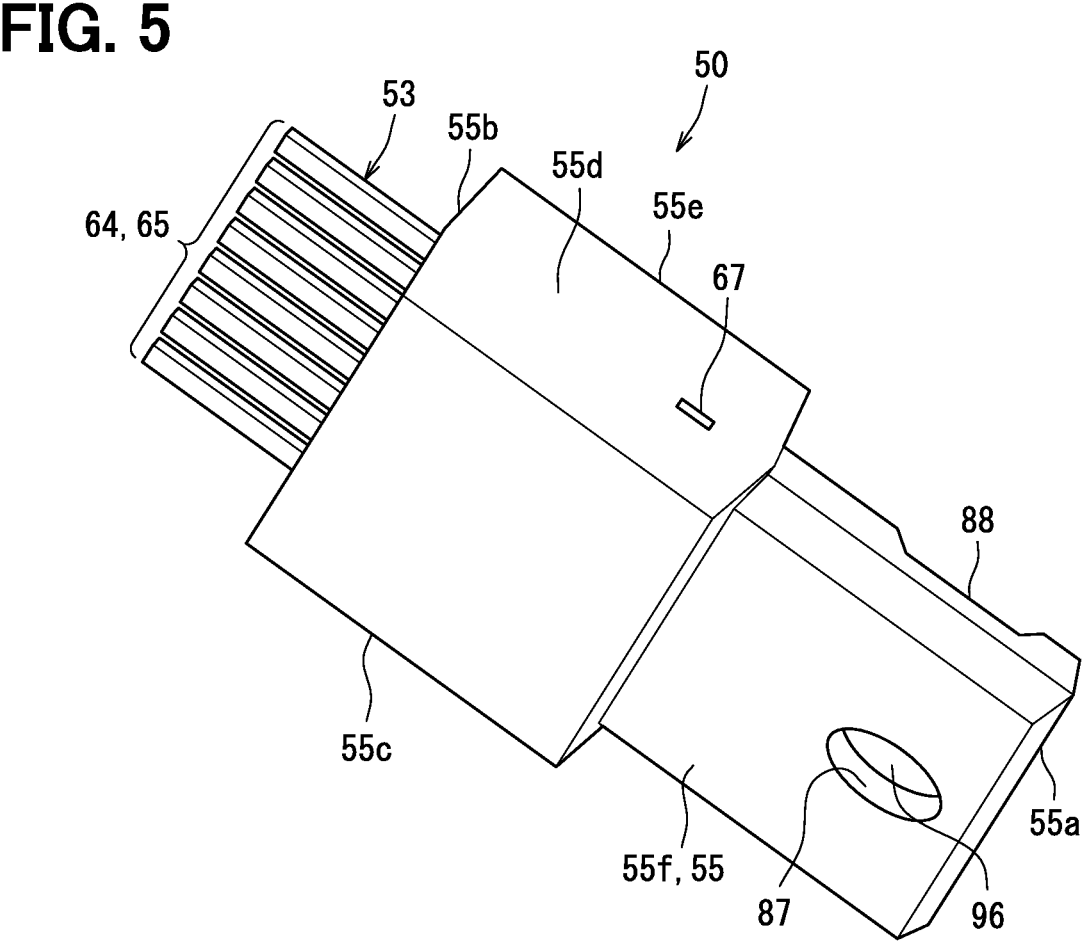
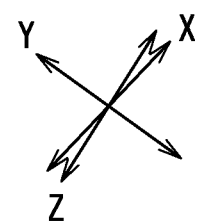

FIG. 19
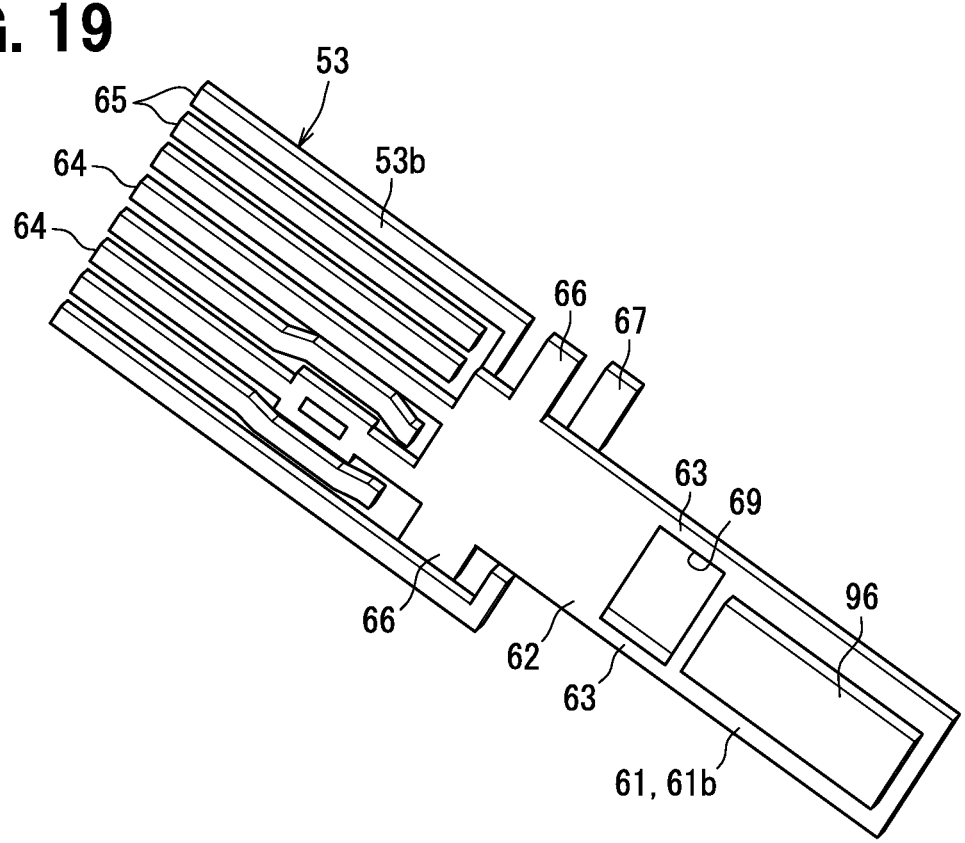
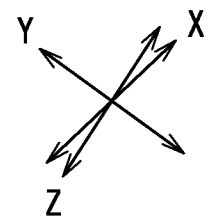

PHYSICAL QUANTITY MEASUREMENT DEVICE

CROSS REFERENCE TO RELATED APPLICATION

The present application is a continuation application of International Patent Application No. PCT/JP2019/026932 filed on Jul. 8, 2019, which designated the U.S. and claims the benefit of priority from Japanese Patent Application No. 2018-167182 filed on Sep. 6, 2018. The entire disclosures of all of the above applications are incorporated herein by reference.

TECHNICAL FIELD

The present disclosure relates to a physical quantity measurement device.

BACKGROUND

As a physical quantity measurement device for measuring a physical quantity of a fluid, for example, a thermal flow meter having a flow rate detecting unit for detecting a flow rate of air is conceivable. In this thermal flow meter, a flow rate detection unit is embedded in a molded resin that has been molded. The flow rate detection unit is made of a semiconductor material and is equipped with a detection element such as a resistor for detecting the flow rate.

SUMMARY

The physical quantity measurement device for measuring the physical quantity of the fluid has a measurement flow passage through which the fluid flows; a detection element for detecting the physical quantity of the fluid; a plate-shape physical quantity detector that detects the physical quantity of the fluid by the detection element in the measurement flow passage; a protection body that protects the physical quantity detector; a body recess arranged on the outer surface of the protection body at a position separated from the physical quantity detector in the orthogonal direction, which is orthogonal to a thickness direction of the physical quantity detector.

BRIEF DESCRIPTION OF THE DRAWINGS

The above and other objects, features and advantages of the present disclosure will become more apparent from the following detailed description made with reference to the accompanying drawings. In the drawings:

FIG. 5 is a perspective view of the sensor SA as viewed from the back side;

FIG. 19 is a perspective view of an SA substrate in a state where a filter unit attached, as viewed from the back side;

DETAILED DESCRIPTION

Figure 1:
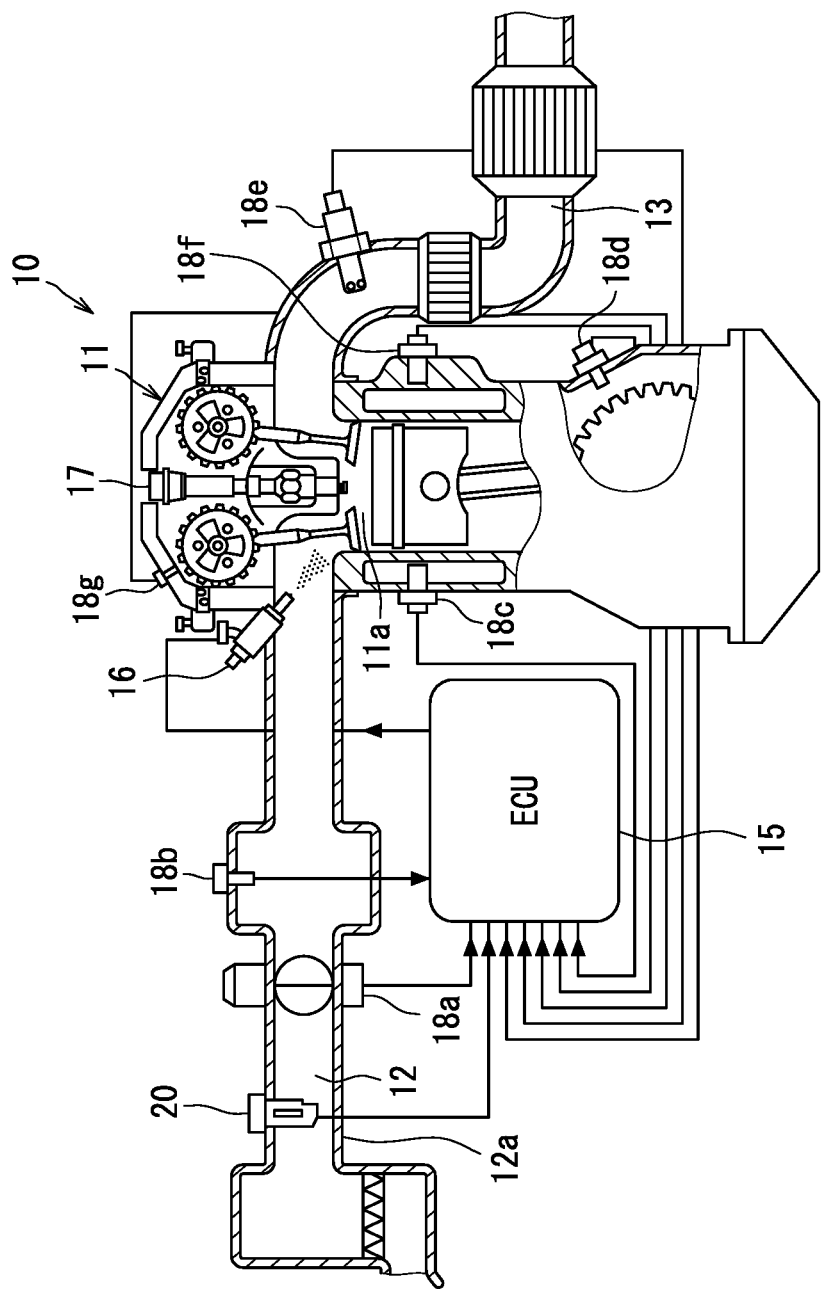
FIG. 1 is a diagram showing a configuration of a combustion system according to a first embodiment.

In a conceivable physical quantity measurement device, when the mold resin is deformed due to a temperature change or the like, it is assumed that the flow rate detection unit may be deformed with the deformation of the mold resin, and the detection element of the flow rate detection unit may be also deformed. If the detection element is deformed, the characteristics of the detection element may change, and there is a concern that the operation accuracy of the flow rate detection unit and the detection element may decrease, and the measurement accuracy of the thermal flowmeter may also decrease.

In view of the above point, a physical quantity measurement device is provided with improving the measurement accuracy of a physical quantity of a fluid.

According to the first aspect of the present embodiments, a physical quantity measurement device for measuring a physical quantity of a fluid has a measurement flow passage through which the fluid flows; a detection element for detecting the physical quantity of the fluid; a physical quantity detection unit having a plate shape, arranged in the measurement flow passage, and detecting the physical quantity of the fluid by the detection element; a protection body that protects the physical quantity detection unit; and a body recess arranged on an outer surface of the protection body at a position spaced apart from the physical quantity detection unit in a direction perpendicular to a thickness direction of the physical quantity detection unit.

According to the first aspect, since the body recess is provided on the outer surface of the protection body, the body recess may be easily deformed when the protection body is deformed due to a temperature change or the like. In this case, the stress generated by the deformation of the protection body causes the deformation of the body recess, so that the stress applied to the physical quantity detection unit is easily reduced. Moreover, since the body recess is arranged at a position separated from the physical quantity detection unit in the perpendicular direction, the body recess can be deformed independently of the physical quantity detection unit. In this way, by positively deforming the body recess, it is possible to realize a configuration in which the physical quantity detection unit and the detection element are not easily deformed.

As described above, even if the protection body is deformed, it can be suppressed by the body recess that the detection element is deformed and the detection accuracy of the physical quantity detection unit is lowered. Therefore, it is possible to improve the measurement accuracy of the physical quantity of the fluid for the physical quantity measurement device.

According to the second aspect of the present embodiments, a physical quantity measurement device for measuring a physical quantity of a fluid includes: a measurement flow passage through which the fluid flows; a detection element for detecting the physical quantity of the fluid; a base that supports the detection element; a physical quantity detection unit that has a plate shape, disposed in the measurement flow passage, and detects the physical quantity of the fluid by the detection element; a protection body that protects the physical quantity detection unit; and a base recess that is arranged on the outer surface pf the base at a position separated from the detection element in an orthogonal direction, which is perpendicular to the thickness direction of the physical quantity detection unit.

According to the second aspect, since the base recess is provided on the outer surface of the base, the base recess is easily deformed when the flow rate detection unit is deformed due to the deformation of the protection body or the like. In this case, the stress applied to the flow rate detection unit from the protection body causes the deformation of the base recess, so that the stress applied to the detection element can be easily reduced. Moreover, since the base recess is provided at a position spaced apart from the detection element in the orthogonal direction, the base recess can be deformed independently of the detection element. As described above, in the flow rate detection unit, it is possible to realize a configuration in which the detection element is less likely to be deformed by positively deforming the base recess.

As described above, even if the base unit is deformed, it is possible to suppress by the base recess that the detection element is deformed and the detection accuracy of the physical quantity detection unit is lowered. Therefore, similar to the first aspect, an accuracy in measurement of the physical quantity in the fluid by the physical quantity measurement device can be enhanced.

Hereinafter, a plurality of embodiments of the present disclosure will be described with reference to the drawings. The same reference numerals are assigned to the corresponding elements in each embodiment, and thus, duplicate descriptions may be omitted. When configurations are described only partly in the respective embodiments, the configurations of the embodiments previously described may be applied to the rest of the configurations. Further, not only the combinations of the configurations explicitly shown in the description of the respective embodiments, but also the configurations of the plurality of embodiments can be partially combined even when they are not explicitly shown as long as there is no difficulty in the combination in particular. Unspecified combinations of the configurations described in the plurality of embodiments and the modification examples are also disclosed in the following description.

First Embodiment

A combustion system 10 shown in FIG. 1 includes an internal combustion engine 11 such as a gasoline engine, an intake passage 12, an exhaust passage 13, an airflow meter 20, and an ECU 15, and the combustion system 10 is mounted on a vehicle, for example. The airflow meter 20 is provided in the intake passage 12 and measures physical quantities such as a flow rate, a temperature, a humidity, and a pressure of an intake air to be supplied to the internal combustion engine 11. The airflow meter 20 corresponds to a "physical quantity measurement device" that measures a fluid such as the intake air. The intake air is a gas to be supplied to a combustion chamber 11a of the internal combustion engine 11. In the combustion chamber 11a, a mixture of the intake air and a fuel is ignited by an ignition plug 17.

The ECU (Engine Control Unit) 15 is a controller for controlling an operation of the combustion system 10. The ECU 15 is a calculation processing circuit including a processor, a storage medium such as a RAM, a ROM and a flash memory, a microcomputer including an input and output unit, a power supply circuit, and the like. The ECU 15 receives a sensor signal output from the air flow meter 20, sensor signals output from a large number of vehicle-mounted sensors, and the like. The ECU 15 uses measurement results of the air flow meter 20 to perform an engine control such as control of a fuel injection amount and an EGR amount of an injector 16. The ECU 15 is a controller that controls an operation of the internal combustion engine 11, and the combustion system 10 may be referred to as an engine control system. The ECU 15 corresponds to an external device.

The combustion system 10 has a plurality of measurement units as in-vehicle sensors. As the measurement units, in addition to the airflow meter 20, a throttle sensor 18a, an intake pressure sensor 18b, a water temperature sensor 18c, a crank angle sensor 18d, an air-fuel ratio sensor 18e, a knock sensor 18f, a cam angle sensor 18g, and the like are included. Each of these measurement units is electrically connected to the ECU 15 and outputs a detection signal to the ECU 15. The air flow meter 20 is provided in the intake passage 12 on the upstream side of the throttle valve to which the throttle sensor 18a is attached.

Figure 3:
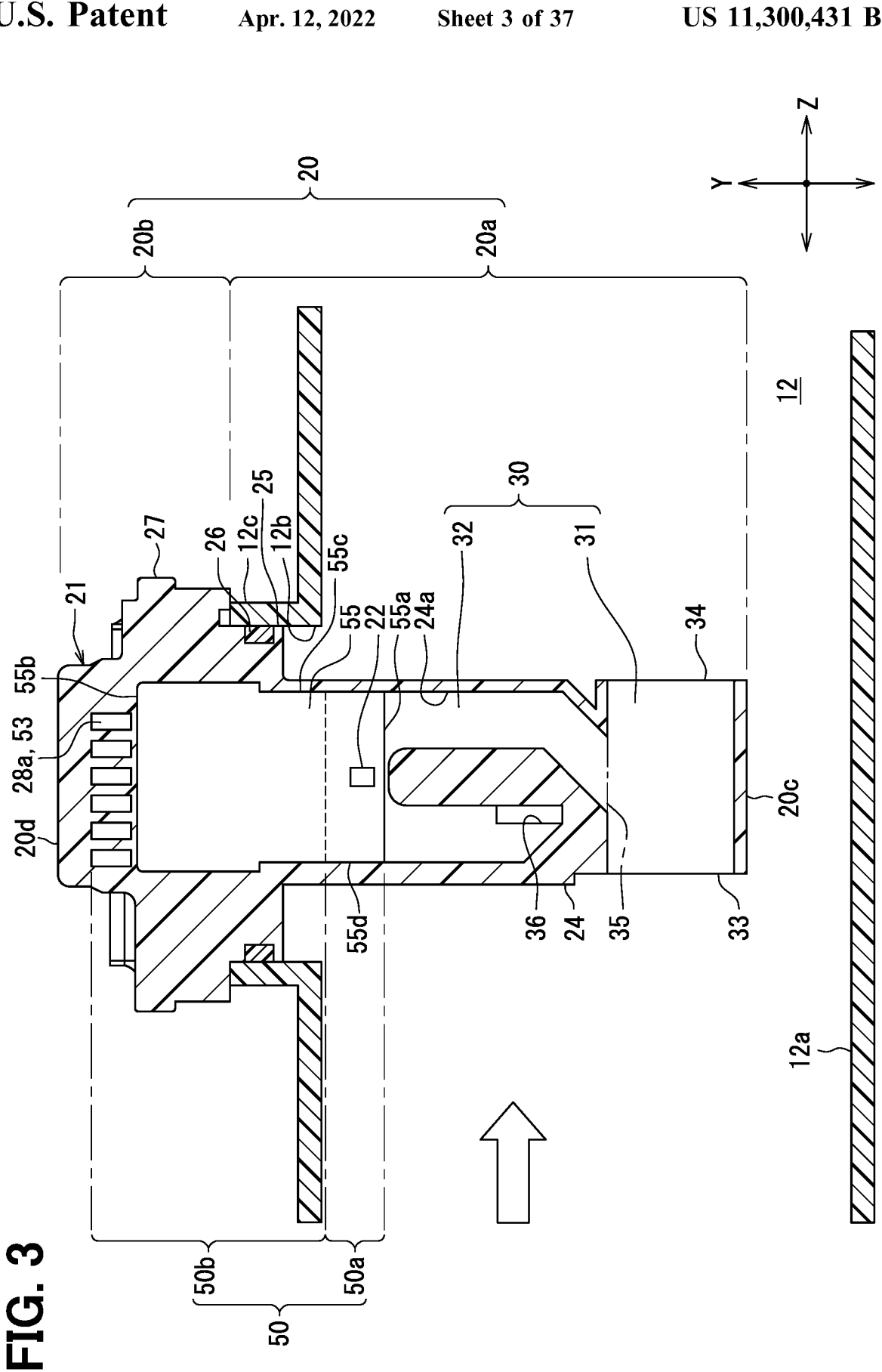
FIG. 3 is a vertical cross-sectional view of an air flow meter in a state in which the air flow meter is attached to an intake pipe.

As shown in FIG. 3, the airflow meter 20 is attached to an intake pipe 12a such as a duct for forming the intake passage 12. The intake pipe 12a has an airflow meter insertion hole 12b as a through hole penetrating through an outer peripheral portion of the intake pipe 12a. An annular pipe flange 12c is attached to the airflow insertion hole 12b, and the pipe flange 12c is included in the intake pipe 12a. The airflow meter 20 is inserted into the pipe flange 12c and the airflow insertion hole 12b to enter the intake passage 12, and is fixed to the intake pipe 12a and the pipe flange 12c in this state.

In the present embodiment, a width direction X, a height direction Y, and a depth direction Z are defined for the airflow meter 20, and those directions X, Y, and Z are orthogonal to each other. The airflow meter 20 extends in the height direction Y, and the intake passage 12 extends in the depth direction Z. The air flow meter 20 includes an inward unit 20a positioned in the intake passage 12 and an outward unit 20b protruding outward from the pipe flange 12c without being in the intake passage 12, and the inward unit 20a and the outward unit 20b are aligned in the height direction Y. In the airflow meter 20, one of a pair of end surfaces 20c and 20d aligned along the height direction Y and included in the inward unit 20a is referred to as an airflow tip end face 20c, and the other end surface included in the outward unit 20b is referred to as an airflow base end face 20d. The airflow meter tip end surface 20c and the airflow meter base end surface 20d are orthogonal to the height direction Y. Further, the tip end surface of the pipe flange 12c is also orthogonal to the height direction Y.

Figure 2:
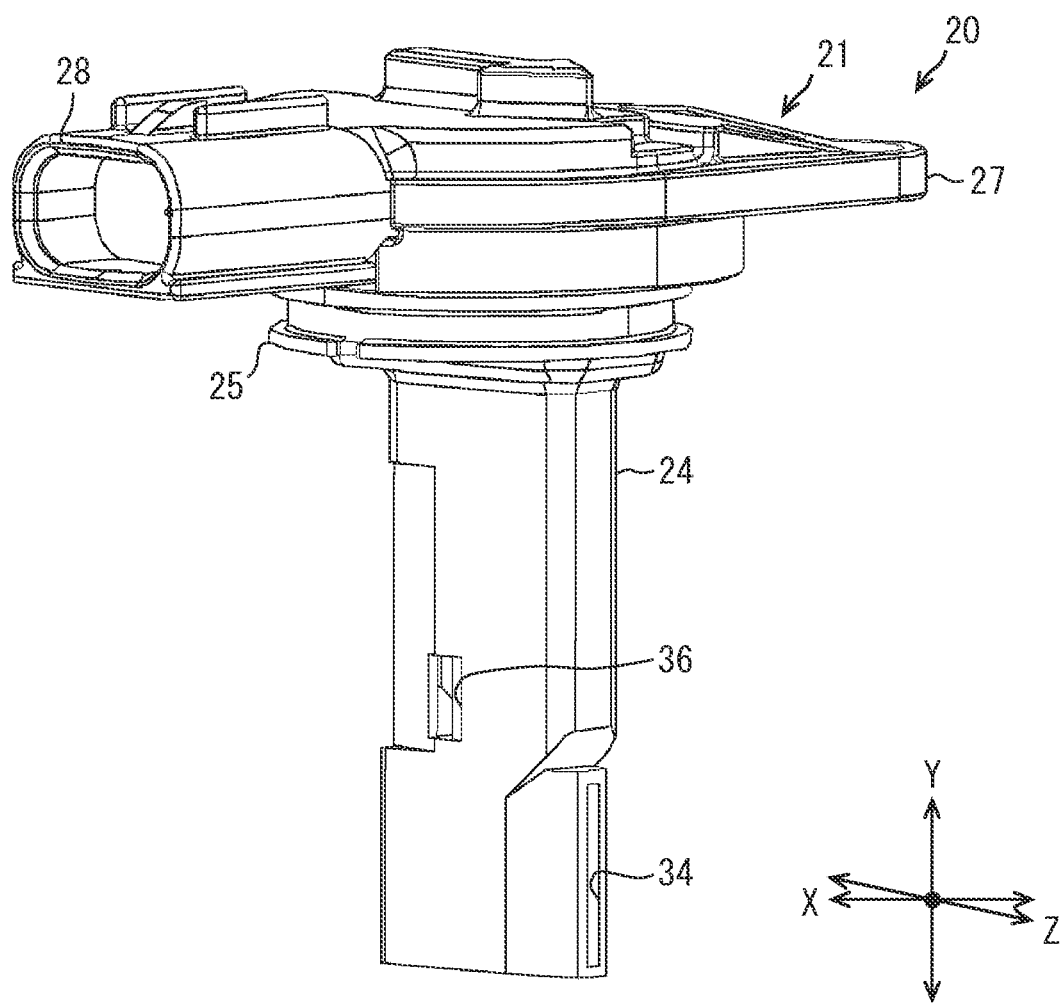
FIG. 2 is a perspective view of an air flow meter.

As shown in FIGS. 2 to 3, the airflow meter 20 includes a housing 21, a flow rate detection unit 22 that detects the flow rate of intake air, and an intake air temperature sensor 23 (not shown) that detects the temperature of intake air. The housing 21 is made of, for example, a resin material. The housing 21 of the airflow meter 20 is attached to the intake pipe 12a such that the flow rate detection unit 22 can come in contact with the intake air flowing through the intake passage 12. The housing 21 has a housing main body 24, a ring holding unit 25, a flange unit 27, and a connector unit 28, and an O-ring 26 is attached to the ring holding unit 25.

The housing main body 24 is formed in a cylindrical shape as a whole, and in the housing 21, the ring holding unit 25, the flange unit 27, and the connector unit 28 are integrally provided in the housing main body 24. The ring holding unit 25 is included in the inward unit 20a, and the flange unit 27 and the connector unit 28 are included in the outward unit 20b.

The ring holding unit 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding unit 25 and an inner peripheral surface of the pipe flange 12c. A fixing hole such as a screw hole for fixing a fixing tool such as a screw for fixing the airflow meter 20 to the intake pipe 12a is provided in the flange unit 27. The connector unit 28 is a protection portion for protecting a connector terminal 28a electrically connected to the flow rate detection unit 22.

The flow rate detection unit 22 is provided in an internal space 24a of the housing main body 24, and the intake air temperature sensor is provided outside the housing 21. The intake air temperature sensor 23 includes a temperature sensing element for sensing a temperature of the intake air, a lead wire extending from the temperature sensing element, and an intake air temperature terminal connected to the lead wire. The housing 21 includes a support portion that supports the intake air temperature sensor, and the support portion is provided on an outer peripheral side of the housing 21.

The housing body 24 forms a bypass channel 30 through which a part of the intake air flowing through the intake passage 12 flows. The bypass flow channel 30 is disposed in the inward unit 20a of the airflow meter 20. The bypass flow channel 30 has a passage flow channel 31 and a measurement flow channel 32, and the passage flow channel 31 and the measurement flow channel 32 are defined by an internal space 24a of the housing main body 24. The intake passage 12 may be referred to as a main passage, and the bypass flow channel 30 may be referred to as a sub passage.

The passage flow channel 31 penetrates through the housing main body 24 in the depth direction Z. The passage flow channel 31 has an inflow port 33 as an upstream end and an outflow port 34 as a downstream end. The measurement flow channel 32 is a branch flow channel branched from an intermediate portion of the passage flow channel 31, and the flow rate detection unit 22 is provided in the measurement flow channel 32. The measurement flow channel 32 has a measurement inlet 35 which is an upstream end of the measurement flow channel 32 and a measurement outlet 36 which is a downstream end of the measurement flow channel 32. A portion where the measurement flow channel 32 branches from the passage flow channel 31 is a boundary between the passage flow channel 31 and the measurement flow channel 32, and the measurement inlet 35 is included in the boundary. The measurement inlet 35 corresponds to a branch inlet, and the measurement outlet 36 corresponds to a branch outlet. The boundary between the through flow channel 31 and the measurement flow channel 32 may also be referred to as a flow channel boundary.

The flow rate detection unit 22 is a thermal type flow rate sensor having a heater. The flow rate detection unit 22 outputs a detection signal according to a temperature change when the temperature change is caused by heat generation of the heater. The flow rate detection unit 22 is a rectangular parallelepiped chip component, and the flow rate detection unit 22 may also be referred to as a sensor chip. The flow rate detection unit 22 corresponds to a physical quantity detection unit that detects the flow rate of the intake air as a physical quantity of fluid.

The airflow meter 20 has a sensor sub-assembly including the flow rate detection unit 22, and the sensor sub-assembly is referred to as a sensor SA 50. The sensor SA 50 is accommodated in the internal space 24a of the housing body 24. The sensor SA 50 may also be referred to as a detection unit, a measurement unit, or a sensor package.

The sensor SA 50 has an inward unit 50a entering the measurement flow channel 32 in the internal space 24a, and a outward unit 50b protruding from the measurement flow channel 32 without entering the measurement flow channel 32. The inward unit 50a and the outward unit 50b are aligned in the height direction Y, and the flow rate detection unit 22 is included in the inward unit 50a.

Figure 6:
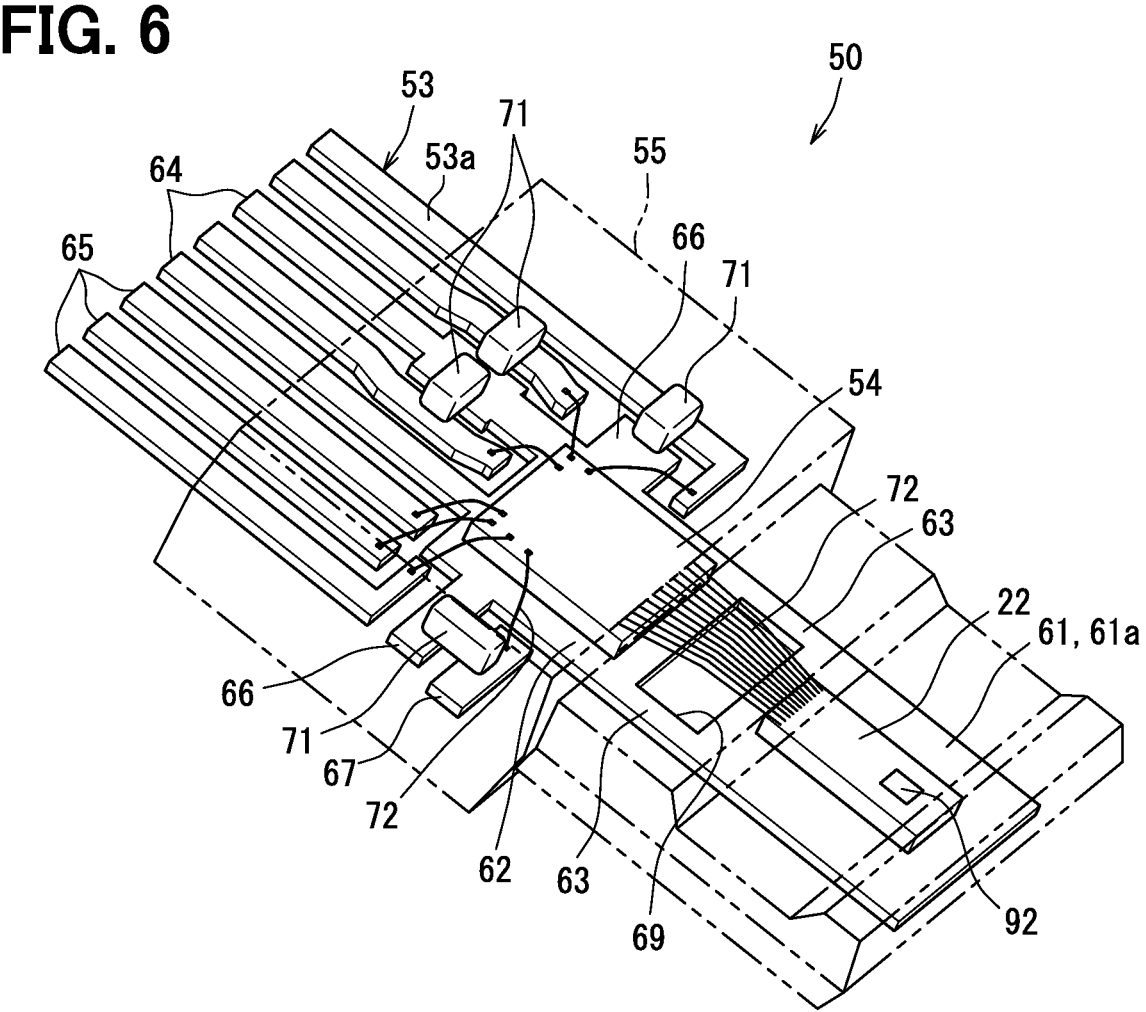
FIG. 6 is a perspective view showing the internal structure of the sensor SA.
Figure 7:
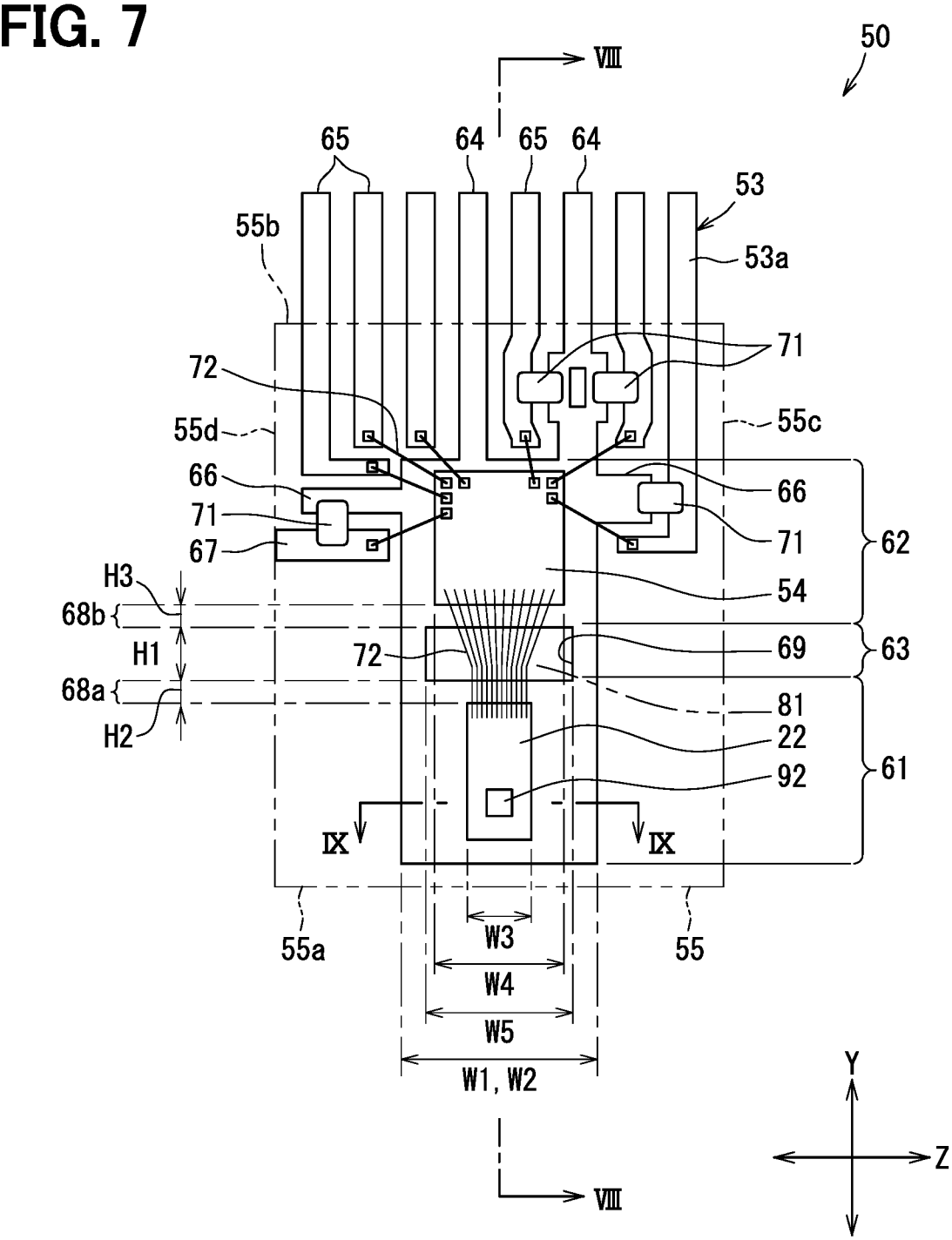
FIG. 7 is a front view showing the internal structure of the sensor SA.

As shown in FIGS. 4 to 7, the sensor SA 50 includes an SA substrate 53 on which the flow rate detection unit 22 is mounted, a flow rate processor 54 electrically connected to the flow rate detection unit 22, the SA substrate 53, and a flow rate detection unit 22, and a mold unit 55 that covers the flow rate processor 54. A detection signal is input to the flow rate processor 54 as the detection result of the flow rate detection unit 22, and the flow rate detection unit 22 corresponds to the physical quantity processor. Further, the SA substrate 53 corresponds to the support plate, and the mold unit 55 corresponds to the body that protects the physical quantity detection unit and the physical quantity processor. The SA substrate 223 may also be defined as a lead frame. In FIG. 7, the mold unit 55 is shown by a virtual line in order to illustrate the internal structure of the sensor SA 50.

The molded unit 55 is formed in a plate shape as a whole. As shown in FIG. 3, in the mold unit 55, one of the pair of end faces 55a and 55b arranged in the height direction Y, the one included in the inward unit 50a is referred to as the mold tip surface 55a and the other one included in the outward unit 50b is referred to as a mold base end surface 55b. One of a pair of surfaces 55c, 55d facing each other with sandwiching the mold tip end surface 55a and the mold base end surface 55b is defined as a mold upstream surface 55c, and the other one is referred to as a mold downstream surface 55d. The sensor SA 50 is arranged in the inner space 24a with an orientation such that the mold tip end surface 55a is arranged on the airflow meter tip end surface 20c side, and the mold upstream surface 55c is arranged on the upstream side of the mold downstream surface 55d in the measurement flow channel 32.

The mold upstream surface 55c of the sensor SA 50 is arranged on the upstream side of the mold downstream surface 55d in the measurement flow channel 32. A flow direction of air in a part of the measurement flow channel 32 where the flow rate sensor 22 is disposed is opposite to a flow direction of air in the intake passage 12. Therefore, the mold upstream surface 55c is arranged on the downstream side of the mold downstream surface 55d in the intake passage 12.

In FIGS. 6 and 7, the SA substrate 53 is made of metal material or the like and formed in a plate shape as a whole, and is a conductive substrate. A plate surface of the SA substrate 53 is orthogonal to the width direction X and extends in the height direction Y and the depth direction Z. The SA substrate 53 includes a detection frame 61 that supports the flow rate detection unit 22, a processor frame 62 that supports the flow rate processor 54, a connection frame 63 that connects these frames 61 and 62, and a lead terminals 64, 65 that are connected to the connector terminal 28a. The detection frame 61 corresponds to the detection support portion, the processor frame 62 corresponds to the processor support portion, and the connection frame 63 corresponds to the connection support portion. Further, the detection frame 61 corresponds to a portion of the SA substrate 53 that covers the recess.

Both the detection frame 61 and the processor frame 62 are formed in a rectangular shape as a whole, and their respective plate surfaces are orthogonal to the width direction X. The detection frame 61 is provided at a position separated from the processor frame 62 on the mold tip end surface 55a side. A pair of connection frames 63 are provided between the detection frame 61 and the processor frame 62 in the height direction Y, and each connection frame 63 is in a state of bridging the detection frame 61 and the processor frame 62. The pair of connection frames 63 are arranged in the depth direction Z in a state of being separated from each other.

A substrate hole 69 is formed in the SA substrate 53 as a through hole that penetrates the SA substrate 53 in the width direction X. The substrate hole 69 is provided between the detection frame 61 and the processor frame 62 in the height direction Y, and forms a separation portion between the frames 61 and 62. Further, the substrate hole 69 is provided between the pair of connection frames 63 in the depth direction Z, and form a separation portion between the connection frames 63. The substrate hole 69 is arranged between the flow rate detection unit 22 and the flow rate processor 54 in the height direction Y. Since the SA substrate 53 is provided with the substrate hole 69, the total of the cross sections of the pair of connection frames 63 is smaller than any one of the cross section of the detection frame 61 and the cross section of the processor frame 62 with respect to the cross section in the direction orthogonal to the height direction Y. Therefore, the connection frame 63 is less likely to transfer heat than either the detection frame 61 or the processor frame 62. The substrate hole 69 corresponds to the through portion.

Figure 8:
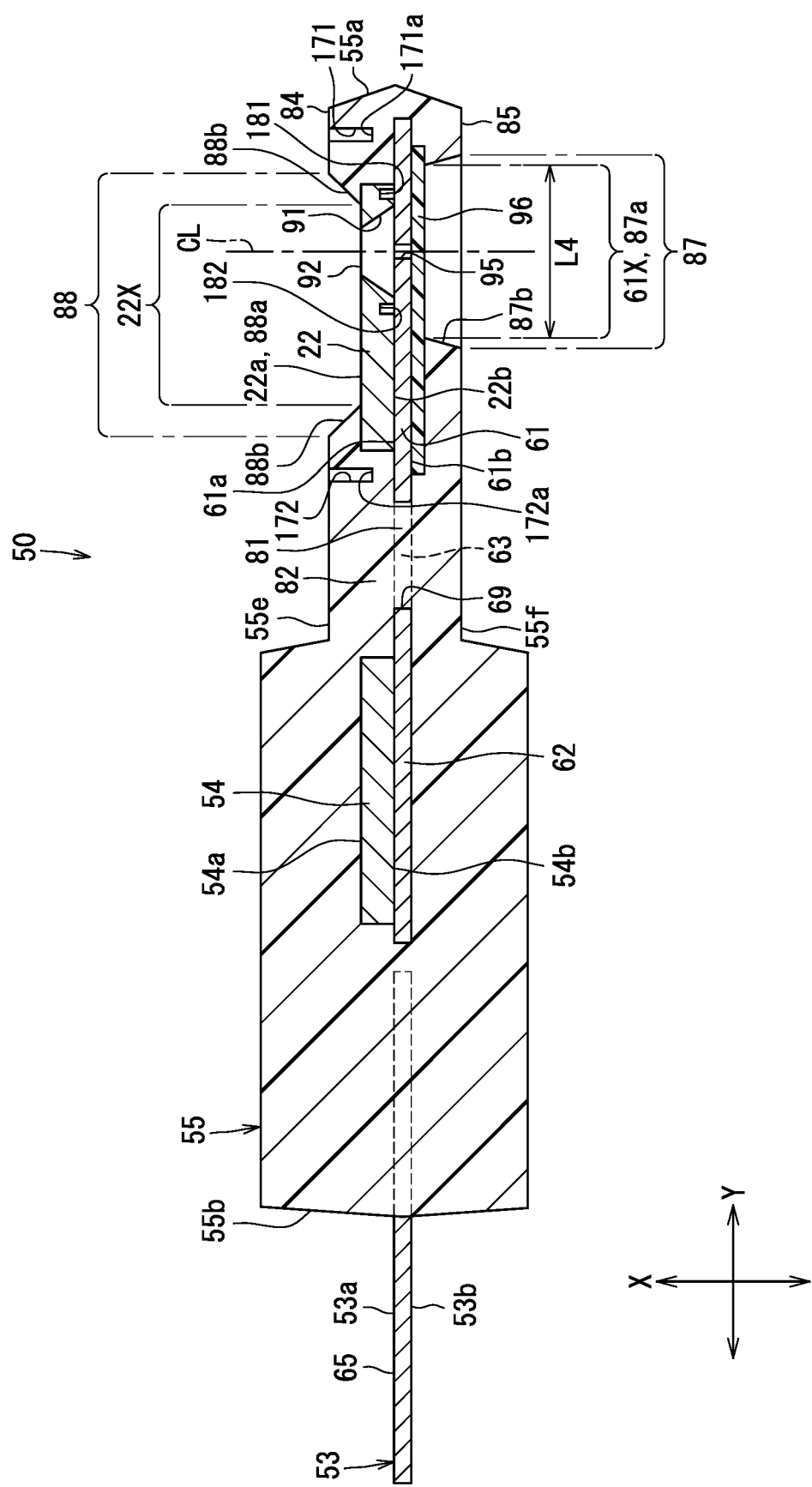
FIG. 8 is a schematic cross-sectional view taken along a line VIII-VIII in FIG. 7.

As shown in FIG. 8, in the SA substrate 53, both the flow rate detection unit 22 and the flow rate processor 54 are mounted on one of the plate surfaces, and the one plate surface on which the flow rate detection unit 22 and the flow rate processor 54 are mounted is referred to as a front surface 53a, and the other plate surface opposite to the front surface 53a is referred to as a back surface 53b. The front surface 53a of the SA substrate 53 includes the front surface 61a of the detection frame 61, the back surface 53b of the SA substrate 53 includes the back surface 61b of the detection frame 61, and the front surface 61a and the back surface 61b extend to be in parallel to each other. Regarding the detection frame 61, the front surface 61a corresponds to the front plate surface, and the back surface 61b corresponds to the back plate surface.

The flow rate detection unit 22 is formed in a plate shape, and for the flow rate detection unit 22, the plate surface on the side opposite to the detection frame 61 is referred to as the front surface 22a, and the plate surface on the side opposite to the front surface 22a is defined as the back surface 22b. Both the front surface 22a and the back surface 22b extend in parallel with each other. In the sensor SA 50, the back surface 22b of the flow rate detection unit 22 is overlapped with the surface 61a of the detection frame 61.

Returning to the description of FIGS. 6 and 7, in the depth direction Z, both side ends of the substrate hole 69 are arranged at positions protruding outward from both the flow rate detection unit 22 and the flow rate processor 54, respectively. In this case, the pair of connection frames 63 are not arranged at positions sandwiched between the flow rate detection unit 22 and the flow rate processor 54, but the connection frames 63 are arranged at positions shifted from the flow rate detection unit 22 and the flow rate processor 54 laterally in each of the width direction X and the depth direction Z.

The detection frame 61, the processor frame 62, and the substrate hole 69 are arranged in the height direction Y, and the center lines of the detection frame 61, the processor frame 62, and the substrate hole 69 coincide with the virtual axis extending in the height direction Y. In the depth direction Z, the flow rate detection unit 22 is arranged at the center position of the detection frame 61, and the flow rate processor 54 is arranged at the center position of the processor frame 62.

In the depth direction Z, the width dimension W1 of the detection frame 61 and the width dimension W2 of the processor frame 62 are the same. Further, the width dimension W3 of the flow rate detection unit 22 is smaller than the width dimension W4 of the flow rate processor 54, and the width dimension W5 of the substrate hole 69 is larger than these width dimensions W3 and W4. The width dimension W5 of the substrate hole 69 corresponds to a distance between the pair of connection frames 63.

In the height direction Y, the length dimension H1 of the substrate hole 69 has a size such that heat is unlikely to be transferred between the detection frame 61 and the processor frame 62. The detection frame 61 has a detection extension unit 68a extending so as to protrude toward the substrate hole 69 side from the flow rate detection unit 22, and the processor frame 62 has an processor extension unit 68b extending so as to protrude toward the frame 61 side from the flow rate processor 54. In this case, the length dimension H1 of the substrate hole 69 is larger than either of the extension dimension H2 of the detection extension unit 68a from the flow rate detection unit 22 or the extension dimension H3 of the processor extension unit 68b from the flow rate processor 54. Further, the length dimension H1 of the substrate hole 69 is larger than the sum of the extension dimensions H2 and H3. Further, in the height direction Y, the substrate hole 69 is arranged at the center of the flow rate detection unit 22 and the flow rate processor 54, and the extension dimension H2 of the detection extension unit 68a and the extension dimension H2 of the processor extension unit 68b are almost the same value.

A part of each of the lead terminals 64 and 65 protrudes from the mold base end surface 55b to the outside of the mold unit 55. In the lead terminals 64 and 65, the portion of the mold unit 55 protruding to the outside extends from the mold base end surface 55b in the height direction Y and is connected to the connector terminal 28a in the internal space 24a of the housing body 24. In this case, the back surface 53b of the SA board 53 includes the back surfaces of the lead terminals 64 and 65, and the back surfaces of the lead terminals 64 and 65 are in contact with the connector terminal 28a.

Of the lead terminals 64 and 65, the ground lead terminal 64 extends from the processor frame 62 and is electrically connected to the ground terminal in the sensor SA 50. In this case, the detection frame 61 and the connection frame 63 are also grounded via the processor frame 62. The ground read terminal 64 corresponds to a support terminal.

The circuit lead terminal 65 is electrically connected to the flow rate processor 54 while being separated from the processor frame 62 inside the mold unit 55. A plurality of ground lead terminals 64 and a plurality of circuit lead terminals 65 are provided. The plurality of circuit lead terminals 65 include a power supply terminal that supplies electric power to the power supply terminal in the sensor SA 50, and a signal terminal that inputs and outputs a signal to the signal terminal in the sensor SA 50.

The sensor SA 50 has a protection chip 71 that protects the flow rate processor 54 from noise. The protection chip 71 is a chip component having a protection circuit including a capacitor, and is provided in a state of bridging the ground lead terminal 64 and the circuit lead terminal 65 inside the mold unit 55.

The SA board 53 has protection frames 66 and 67 to which the protection chip 71 is attached. Of the protection frames 66 and 67, the ground protection frame 66 extends from the processor frame 62. The circuit protection frame 67 is electrically connected to the flow rate processor 54 while being separated from the processor frame 62 inside the mold unit 55. The protection chip 71 is provided in a state of bridging the ground protection frame 66 and the circuit protection frame 67 or the circuit lead terminal 65.

The flow rate processor 54 has a drive circuit such as a digital circuit (see FIG. 11) that performs various processes. The flow rate processor 54 is a rectangular parallelepiped chip component, and the flow rate processor 54 may also be referred to as a circuit chip. It is electrically connected to the flow rate detection unit 22, the circuit lead terminal 65, and the circuit protection frame 67 via a bonding wire 72. The mold unit 55 covers the protection chip 71 and the bonding wire 72 in addition to the flow rate detection unit 22 and the flow rate processor 54, so that the mold unit 55 protects the flow rate detection unit 22, the flow rate processor 54, the protection chip 71 and the bonding wire 72. In this case, the mold unit 55 may also be referred to as a protection body.

The mold unit 55 is a mold resin such as a polymer resin molded by a molding method, and has higher insulation properties and heat insulation properties than the SA substrate 53. The mold unit 55 integrally seals the flow rate processor 54, the protection chip 71, the bonding wire 72, and the like.

As shown in FIG. 8, the mold unit 55 has a frame regulation unit 81 that regulates heat transfer from the processor frame 62 to the detection frame 61. The frame regulation unit 81 is a portion of the mold unit 55 that has entered the substrate hole 69, and is in a state of being filled inside the substrate hole 69. Therefore, the frame regulation unit 81 has the same size and shape as the substrate hole 69. For example, in the depth direction Z, the width dimension of the frame regulation unit 81 is the same as the width dimension W5 of the substrate hole 69. The frame regulation unit 81 is arranged side by side on the connection frame 63 in the depth direction Z. In this case, the frame regulation unit 81 and the connection frame 63 are arranged side by side along the plate surface of the SA substrate 53. The frame regulation unit 81 corresponds to the heat transfer regulation unit.

When the flow rate processor 54 performs various treatments while being energized, heat may be generated in the flow rate processor 54. When this heat is transferred to the flow rate detection unit 22, there may be a concern that the detection accuracy of the flow rate detection unit 22 may decrease. In particular, when the power is turned on, such as when the ignition switch is turned on, the flow rate processor 54 starts to generate heat as the drive of the flow rate processor 54 starts. In this case, since the flow rate processor 54 shifts from the state in which heat is not generated to the state in which heat is generated, the temperature rise of the flow rate processor 54 may tend to increase. Therefore, the detection value of the flow rate detection unit 22 may tend to be unstable until the temperature of the flow rate detection unit 22 stabilizes at a temperature corresponding to the heat transmitted from the flow rate processor 54. As a result, it is difficult to specify the activation of the air flow meter 20 when the power is turned on, and the responsiveness of the flow rate detection unit 22 tends to decrease for a while after the power is turned on.

On the other hand, in the present embodiment, as described above, since the frame regulation unit 81 is provided in the entire substrate hole 69, the frame regulation unit 81 restricts the heat of the flow rate processor 54 from transferring to the flow rate detection unit 22 via the SA substrate 53. Therefore, it is suppressed that the activation characteristic of the air flow meter 20 is deteriorated, and the responsiveness of the flow rate detection unit 22 is less likely to be deteriorated. Further, in addition to the frame regulation unit 81, the mold unit 55 has a direct regulation unit 82 which is a portion inserted between the flow rate processor 54 and the flow rate detection unit 22 in the height direction Y. The direct regulation unit 82 is a portion that regulates the direct transfer of heat from the flow rate processor 54 to the flow rate detection unit 22 without passing through the SA substrate 53.

Figure 9:
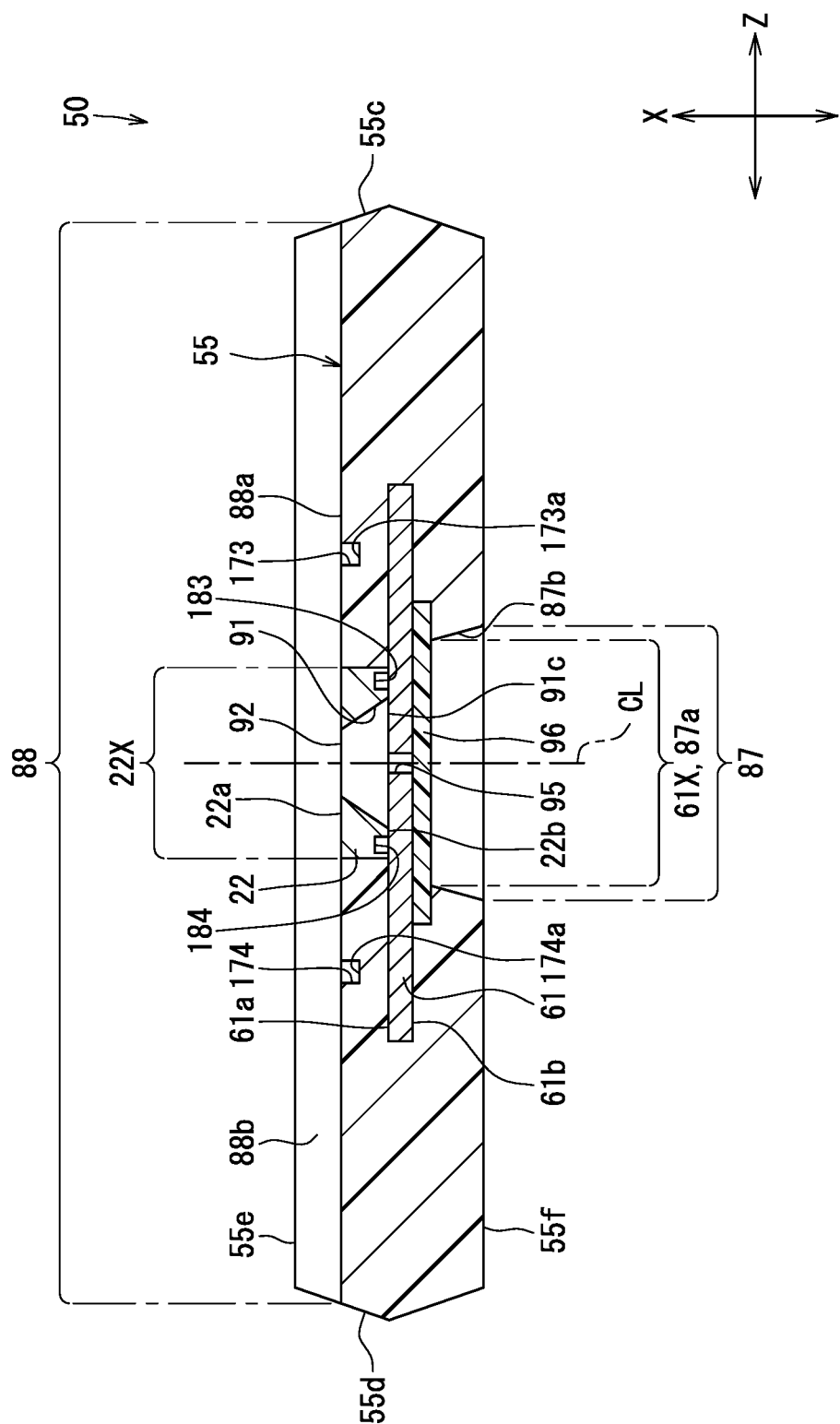
FIG. 9 is a cross-sectional view taken along line IX-IX of FIG. 7.
Figure 10:
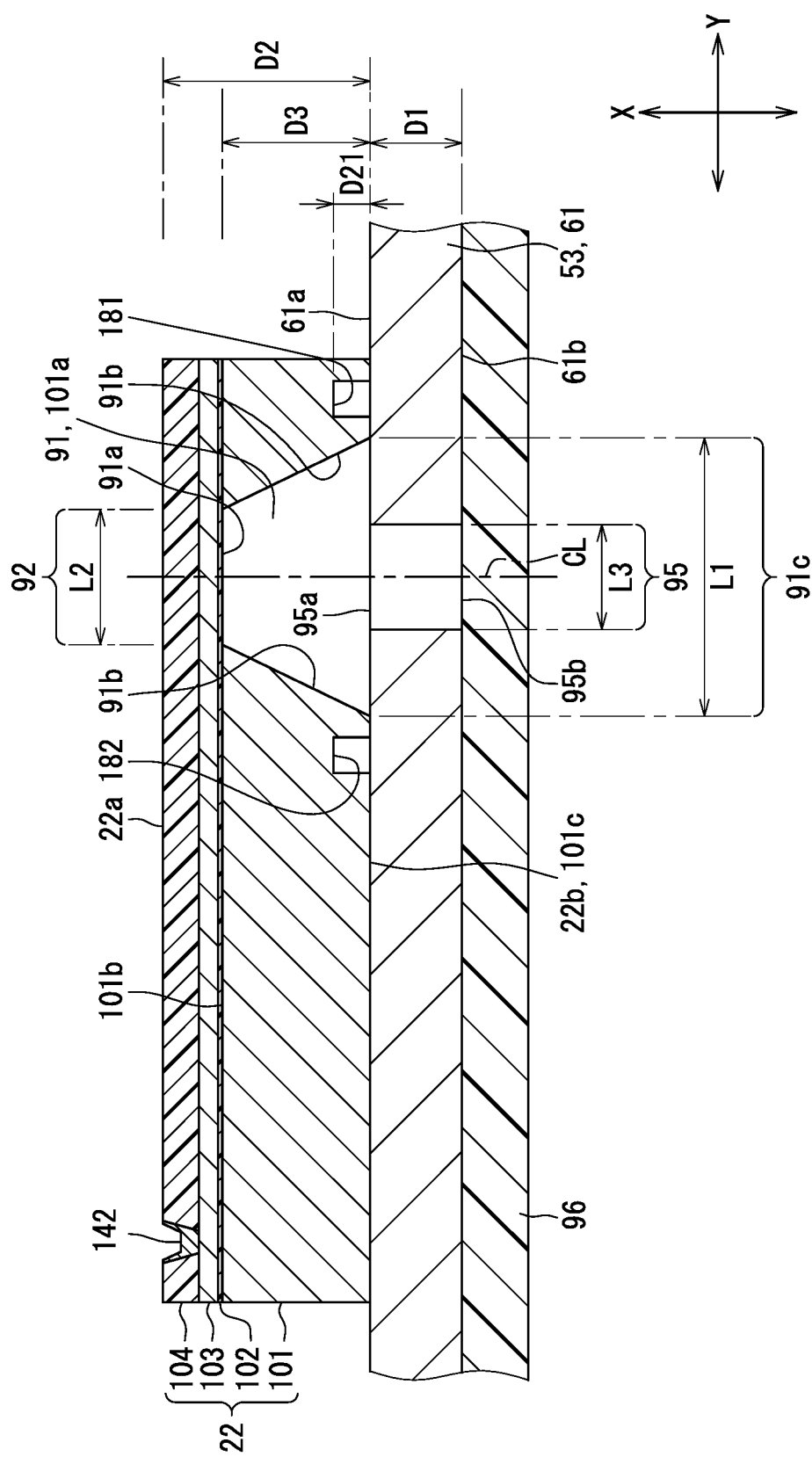
FIG. 10 is an enlarged view of the vicinity of the flow rate detection unit in FIG. 8.

As shown in FIGS. 8 to 10, the flow rate detection unit 22 has a detection recess 91 formed by recessing the back surface 22b thereof and a membrane unit 92 forming the bottom surface 91a of the detection recess 91. The detection recess 91 has a bottom surface 91a facing the detection frame 61 side and an inner wall surface 91b extending from the bottom surface 91a toward the detection frame 61 side. The detection recess 91 has a concave opening 91c, which is an opening that opens the internal space of the detection recess 91 toward the side opposite to the bottom surface 91a, and the concave opening 91c is provided on the back surface 22b of the flow rate detection unit 22. The detection recess 91 is covered with the detection frame 61, and the bottom surface 91a faces the surface 61a of the detection frame 61. The detection recess 91 corresponds to the recess. Further, the internal space of the detection recess 91 is hollow, and the detection recess 91 may also be referred to as a cavity or a gap.

The center line CL of the detection recess 91 extends in the width direction X and is orthogonal to the front surface 22a and the back surface 22b of the flow rate detection unit 22. The detection recess 91 is tapered from the concave opening 91c toward the bottom surface 91a, and the inner wall surface 91b extends straight from the concave opening 91c toward the bottom surface 91a, so that the detection recess 91 is formed in a tapered shape as a whole. The internal space of the detection recess 91 gradually becomes smaller toward the bottom surface 91a in the width direction X, and the detection recess 91 is tapered as a whole. In this case, in the detection recess 91, the cross-sectional area in the direction orthogonal to the center line CL gradually increases from the bottom surface 91a toward the concave opening 91c. The inner wall surface 91b is not parallel to the center line CL, but is inclined with respect to the center line CL because it faces the concave opening 91c side. The detection recess 91 has two sets of a pair of inner wall surfaces 91b facing each other, so that the bottom surface 91a and the concave opening 91c are formed in a rectangular shape. In the detection recess 91, the open area of the concave opening 91c is larger than the area of the bottom surface 91a.

In the inner wall surface 91b, the end portion on the back surface 22b side forms the peripheral edge portion of the concave opening 91c, and the end portion on the front surface 22a side forms the peripheral edge portion on the bottom surface 91a. As shown in FIG. 10, in the present embodiment, the separate distance between the pair of sides facing each other in the peripheral edge of the concave opening 91c is referred to as the opening dimension L1 of the concave opening 91c, and the separation distance between the pair of sides of the peripheral edges of the bottom surface 91a facing each other is referred to as the bottom surface dimension L2. The concave opening 91c and the bottom surface 91a are both square, and the opening dimension L1 and the bottom surface dimension L2 are the same for both the pair of sides arranged in the height direction Y and the pair of sides arranged in the depth direction Z. The opening dimension L1 of the concave opening 91c is larger than the bottom surface dimension L2 of the bottom surface 91a. In FIG. 10, the mold unit 55 is not shown, and the membrane unit 92 is shown thicker than actual size.

The membrane unit 92 is provided on the front side of the detection recess 91 in the width direction X, and is a film-like portion thinned by the detection recess 91 in the flow rate detection unit 22. The surface of the membrane unit 92 is formed by the front surface 22a of the flow rate detection unit 22, and the back surface is formed by the bottom surface 91a of the detection recess 91. In this case, the membrane unit 92 is not arranged between the front surface 22a and the back surface 22b in the flow rate detection unit 22, but is arranged on the front surface 22a. The membrane unit 92 has a plurality of detection elements, and is a sensor unit that detects the flow rate of air in the flow rate detection unit 22.

In a plan view, the shape and size of the membrane unit 92 are the same as the shape and size of the detection recess 91. Specifically, when the separate distance between the pair of sides facing each other in the peripheral edge of the membrane unit 92 is referred to as the membrane dimension, the membrane dimension is the same as the bottom surface dimension L2. Further, the membrane unit 92 has a square shape similar to the detection recess 91, and the membrane dimension is the same for both the pair of sides arranged in the height direction Y and the pair of sides arranged in the depth direction Z.

A detection frame hole 95 communicating with the internal space of the detection recess 91 is provided in a portion of the detection frame 61 that covers the concave opening 91c of the detection recess 91. The detection frame hole 95 is a through hole that penetrates the detection frame 61 in the width direction X, and is a round hole having a circular cross section. The center line of the detection frame hole 95 coincides with the center line CL of the detection recess 91. The detection frame hole 95 has a front opening 95a which is an end portion on the surface 61a side. The boundary between the detection recess 91 and the detection frame hole 95 includes a concave opening 91c and a front opening 95a. The detection frame 61 corresponds to the portion covering the detection recess 91, the detection frame hole 95 corresponds to the communication hole, and the front opening 95a corresponds to the hole opening.

The peripheral edge portion of the front opening 95a is located at a position separated from the peripheral edge portion of the concave opening 91c to the inner peripheral side which is the center line CL side. In this case, the front opening 95a is smaller than the concave opening 91c. Specifically, the inner diameter L3 of the front opening 95a is smaller than the opening size L1 of the concave opening 91c. The inner diameter L3 of the front opening 95a corresponds to the separate distance between the peripheral portions of the front opening 95a that face each other with the center line CL in between and the closest to each other. The center of the front opening 95a is a portion through which the center line CL passes. Further, the thickness of the detection frame hole 95 is uniform in any portion in the width direction X, and the inner diameter of the detection frame hole 95 is the same as the inner diameter L3 of the front opening 95a.

Further, the peripheral edge portion of the front opening 95a is located at a position separated from the peripheral edge portion of the bottom surface 91a of the detection recess 91 toward the inner peripheral side. That is, the peripheral edge portion of the front opening 95a is located at a position spaced apart from the membrane unit 92 on the inner peripheral side. In this case, the front opening 95a is smaller than the bottom surface 91a. Specifically, the inner diameter L3 of the front opening 95a is smaller than the bottom surface dimension L2 of the bottom surface 91a.

When the detection frame hole 95 is formed in the detection frame 61, it is assumed that burrs, which are unnecessary protrusions, may remain on the peripheral edge of the detection frame hole 95. For example, when the detection frame hole 95 is formed by punching or pressing, if the detection frame 61 is punched from the back surface 61b toward the front surface 61a, burrs extending from the front surface 61a may be generated on the peripheral edge of the front opening 95a. If this burr comes into contact with the back surface 22b of the flow rate detection unit 22, there may be a concern that the flow rate detection unit 22 may be damaged or broken, and the detection accuracy of the flow rate detection unit 22 may decrease. On the other hand, in the present embodiment, since the peripheral edge of the front opening 95a is disposed inside the peripheral edge of the concave opening 91c, even if burrs remain on the peripheral edge of the front opening 95a, the burrs are disposed inside the peripheral edge of the concave opening 91c. That is, the burr exists in the internal space of the detection recess 91. Therefore, it is possible to prevent the burr from coming into contact with the back surface 22b of the flow rate detection unit 22 and damaging or breaking the flow rate detection unit 22.

The sensor SA 50 has a filter unit 96 that covers the detection frame hole 95 from the back surface 61b side. The filter unit 96 is a film-like ventilation filter such as a porous film that allows air to pass through, and is superimposed on the back surface 61b of the detection frame 61. The filter unit 96 is a member that removes foreign particles such as dirt, dust, and mote from the air flowing into the detection frame hole 95 and the detection recess 91. The filter unit 96 is smaller than the back surface 61b of the detection frame 61, and is arranged at a position where it does not protrude outward from the back surface 61b. The detection frame hole 95 has a back opening 95b which is an end portion on the back surface 61b side, and the back opening 95b is included in the boundary portion between the detection frame hole 95 and the filter unit 96.

As shown in FIGS. 8 and 9, the mold unit 55 has a front cover unit 84 provided on the front surface 61a side of the detection frame 61 and a back cover unit 85 provided on the back surface 61b side of the detection frame 61. The front cover unit 84 covers the surface 61a of the detection frame 61 together with the flow rate detection unit 22 from the front side in a state where the membrane unit 92 of the flow rate detection unit 22 is exposed on the front side of the sensor SA 50. In this case, the surface cover unit 84 is in a state of being overlapped with each of the surface 61a of the detection frame 61 and the surface 22a of the flow rate detecting unit 22. The front cover unit 84 corresponds to the detection body portion.

The surface 22a of the flow rate detection unit 22 has a surface extension region 22X extending from the membrane unit 92 toward the outer peripheral side. The front extension region 22X is an exposed region exposed on the front side of the sensor SA 50 around the membrane unit 92 on the surface 22a of the flow rate detection unit 22. In this case, the entire surface 22a of the flow rate detection unit 22 is not exposed on the front side of the sensor SA 50, but only a part of the surface 22a, i.e., only the membrane unit 92 and the front extension region 22X are exposed on the front side of the sensor SA 50. The surface extension region 22X has an annular shape between the membrane unit 92 and the surface cover unit 84 by surrounding the peripheral edge portion of the membrane unit 92.

Figure 4:
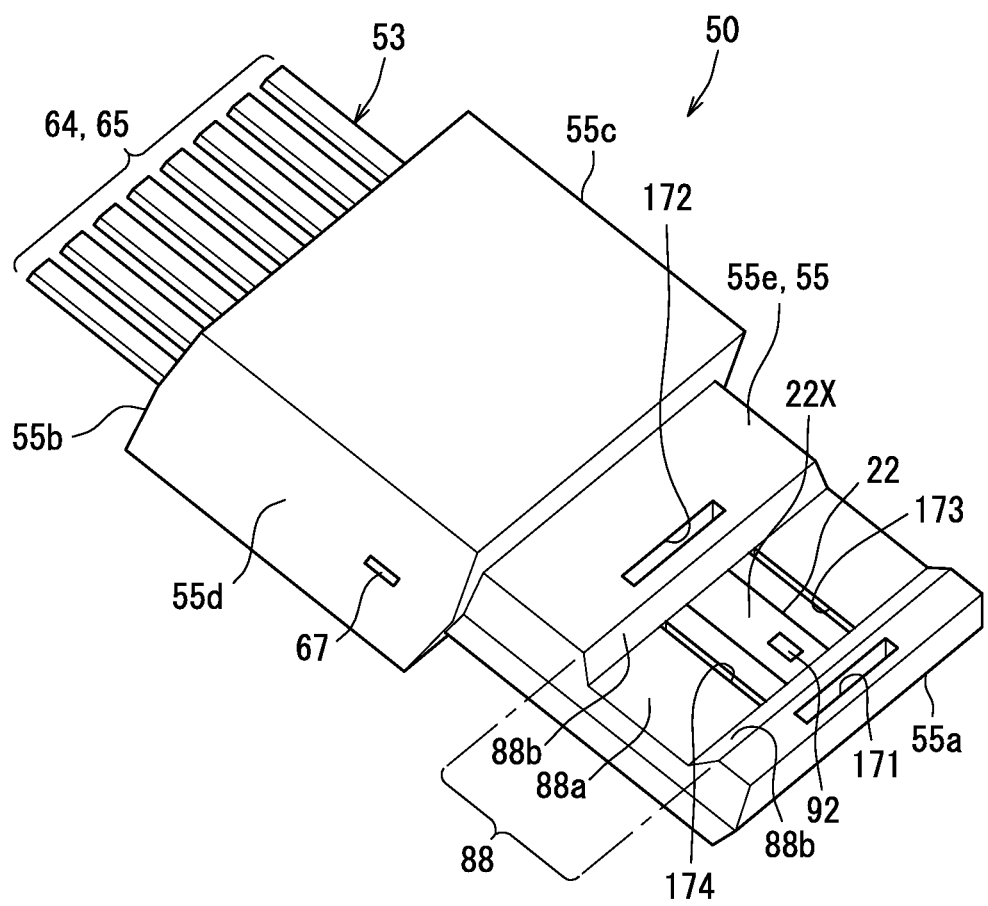
FIG. 4 is a perspective view of the sensor SA as viewed from the front side.

In the mold unit 55, since a part of the front cover unit 84 is thinned, the membrane unit 92 and the front extension region 22X are not covered by the front cover unit 84. Specifically, as shown in FIGS. 4 and 8, the mold unit 55 is provided with a groove-shaped front mold groove 88 extending in the depth direction Z. The front mold groove 88 is a groove formed by denting the surface of the mold unit 55, and extends over the mold upstream surface 55c and the mold downstream surface 55d. The depth dimension of the front mold groove 88 is defined such that the surface 22a of the flow rate detection unit 22 is exposed but the surface 61a of the detection frame 61 is not exposed, and the surface 22a of the flow rate detection unit 22 is included in the bottom surface 88a of the front mold groove 88. That is, the membrane unit 92 and the front extension region 22X are exposed on the bottom surface 88a of the front mold groove 88.

The internal space of the front mold groove 88 gradually becomes smaller toward the bottom surface 88a in the width direction X. The inner peripheral surface of the front mold groove 88 has a pair of inner wall surfaces 88b facing each other with the bottom surface 88a interposed therebetween. These inner wall surfaces 88b are inclined with respect to the width direction X so as to face the side opposite to the flow rate detection unit 22, and have a tapered surface extending straight from the bottom surface 88a. The front extension region 22X is in a state of bridging over a pair of inner wall surfaces 88b.

In the front mold groove 88, the flow rate detection unit 22 is provided at an intermediate position in the depth direction Z. That is, the flow rate detection unit 22 is provided between the mold upstream surface 55c and the mold downstream surface 55d. Further, the sensor SA 50 is installed with respect to the measurement flow passage 32 so that the front mold groove 88 extends in the air flow direction in the measurement flow passage 32. Therefore, the air flowing through the measurement flow passage 32 is rectified by the inner peripheral surface of the front mold groove 88 by the time it reaches the flow rate detection unit 22. Therefore, it is possible to prevent the detection accuracy of the flow rate detection unit 22 from being lowered due to the turbulence of the air flow.

The back cover unit 85 covers the back surface 61b of the detection frame 61 together with the filter unit 96 from the back side in a state where a part of the filter unit 96 is exposed on the back side of the sensor SA 50. In this case, the back cover unit 85 is in a state of being overlapped on the back surface 61b of the detection frame 61 and the back surface of the filter unit 96, respectively. The portion of the filter unit 96 exposed on the back side of the sensor SA 50 includes a portion overlapping the back opening 95b of the detection frame hole 95, and the detection frame hole 95 is opened on the back side of the sensor SA 50 via the filter unit 96. The back cover unit 85 corresponds to the support body portion.

In the present embodiment, even when the detection frame hole 95 is covered by the filter unit 96 but not covered by the back cover unit 85, this state is referred to as "a state in which the detection frame hole 95 is exposed". This also applies to the back extension area 61X, which will be described later, and even when the back extension area 61X is covered by the filter unit 96 but not by the back cover unit 85, this state is referred to as "a state in which the back extension area 61X is exposed".

The back surface 61b of the detection frame 61 has a back extension region 61X extending from the back opening 95b toward the outer peripheral side. The back extension region 61X is an exposed region of the back surface 61b of the detection frame 61 that is exposed on the back side of the sensor SA 50 around the back opening 95b of the detection frame hole 95. In this case, the back surface 61b of the detection frame 61 is not entirely exposed on the back side of the sensor SA 50, but only the detection frame hole 95 and the back extension area 61X of the back surface 61b are exposed on the back surface of the sensor SA 50. The back extension region 61X has an annular shape by surrounding the peripheral edge of the back opening 95b between the back opening 95b and the back cover unit 85 of the detection frame hole 95.

As shown in FIGS. 5 and 8, in the mold unit 55, since the back mold hole 87 is provided in the back cover unit 85, the detection frame hole 95 and the back extension region 61X are not covered by the back cover unit 85. The back mold hole 87 penetrates the back cover unit 85 in the width direction X, and is a round hole larger than the detection frame hole 95. The back mold hole 87 has a front side end unit 87a which is an end portion on the detection frame 61 side, and the peripheral portion of the front side end unit 87a is separated from the back opening 95b of the detection frame hole 95 toward the outer peripheral side. As a result, a back extension region 61X is formed between the peripheral edge of the front end unit 87a and the back opening 95b. In this case, the inner diameter L4 of the front side end unit 87a is larger than the inner diameter of the back opening 95b. In the detection frame hole 95, the inner diameter of the back opening 95b is the same as the inner diameter L3 of the front opening 95a. The back mold hole 87 corresponds to an exposed hole that exposes the detection frame hole 95 and the back extension region 61X, and a heat radiation hole that discharges the heat of the detection frame 61 to the outside.

Further, the peripheral edge portion of the front side end unit 87a is separated from both the bottom surface 91a of the detection recess 91 and the concave opening 91c toward the outer peripheral side. In this case, the inner diameter L4 of the front side end unit 87a is larger than either the bottom surface dimension L2 of the bottom surface 91a (see FIG. 10) or the opening dimension L1 of the concave opening 91c (see FIG. 10).

The front extension region 22X of the flow rate detection unit 22 and the back extension region 61X of the detection frame 61 are arranged in the width direction X. In this case, at least a part of the front extension area 22X and a part of the back extension area 61X overlap each other in the width direction X, and this overlapping part surrounds the center line CL so as to have a ring shape.

The back mold hole 87 is smaller than either the detection frame 61 or the filter unit 96. The mold unit 55 covers the peripheral portions of the detection frame 61 and the filter unit 96. In this case, the mold unit 55 restricts the filter unit 96 from peeling off from the detection frame 61.

The back mold hole 87 gradually becomes smaller toward the detection frame 61 in the width direction X. That is, the back mold hole 87 gradually increases from the front end unit 87a toward the back end portion. The inner peripheral surface 87b of the back mold hole 87 is inclined with respect to the width direction X so as to face the side opposite to the detection frame 61, and is a tapered surface extending straight from the front end unit 87a.

As shown in FIG. 10, the flow rate detection unit 22 includes a detection base material 101 which is a plate-shaped base material, an insulation film 102 having an insulating property, a resistor 103 having a plurality of resistance elements, and a protection film 104 that protects the resistor 103. The detection base material 101 is formed in a plate shape by a semiconductor material such as silicon. The insulation film 102 is superposed on one plate surface of the detection base material 101, the resistor 103 is superposed on the insulation film 102, and the protection film 104 is superposed on the resistor 103, and these insulation film 102, the resistor 103 and the protection film 104 provide the membrane unit 92.

The flow rate detection unit 22 has a base material hole 101a that penetrates the detection base material 101 in the width direction X. In the flow rate detection unit 22, the detection recess 91 is formed by covering the base material hole 101a with the insulation film 102, the resistor 103, and the protection film 104. Further, the portions of the insulation film 102, the resistor 103, and the protection film 104 that cover the base material hole 101a are the membrane unit 92.

In the flow rate detection unit 22, the base material hole 101a is formed by processing a part of the detection base material 101 by wet etching. That is, the detection recess 91 and the membrane unit 92 are formed by wet etching. In this case, in the inner wall surface 91b of the detection recess 91, the crystal plane orientation of the silicon is the <110> plane, and the inner wall surface 91b has a predetermined inclination angle (for example, 54.7 degrees) tilted with respect to the center line CL. The base material hole 101a may be formed by performing a dry etching process on the detection base material 101.

The detection frame hole 95 has a size that does not excessively increase the difficulty of the work load of forming the detection frame hole 95. Specifically, the opening dimension L1 of the front opening 95a is larger than the thickness dimension D1 of the detection frame 61 in the width direction X. On the other hand, the opening dimension L1 is smaller than the thickness dimension D2 of the flow rate detection unit 22 in the width direction X. Further, the opening dimension L1 is smaller than the thickness dimension D3 of the detection base material 101 in the width direction X.

Next, the electrical configuration of the sensor SA 50 will be described with reference to FIGS. 11 to 13 and the like. The sensor SA 50 has a flow rate detection circuit 110 that detects the flow rate of air, and the flow rate detection circuit 110 provides a thermal flow rate detection unit 22.

Figure 11:
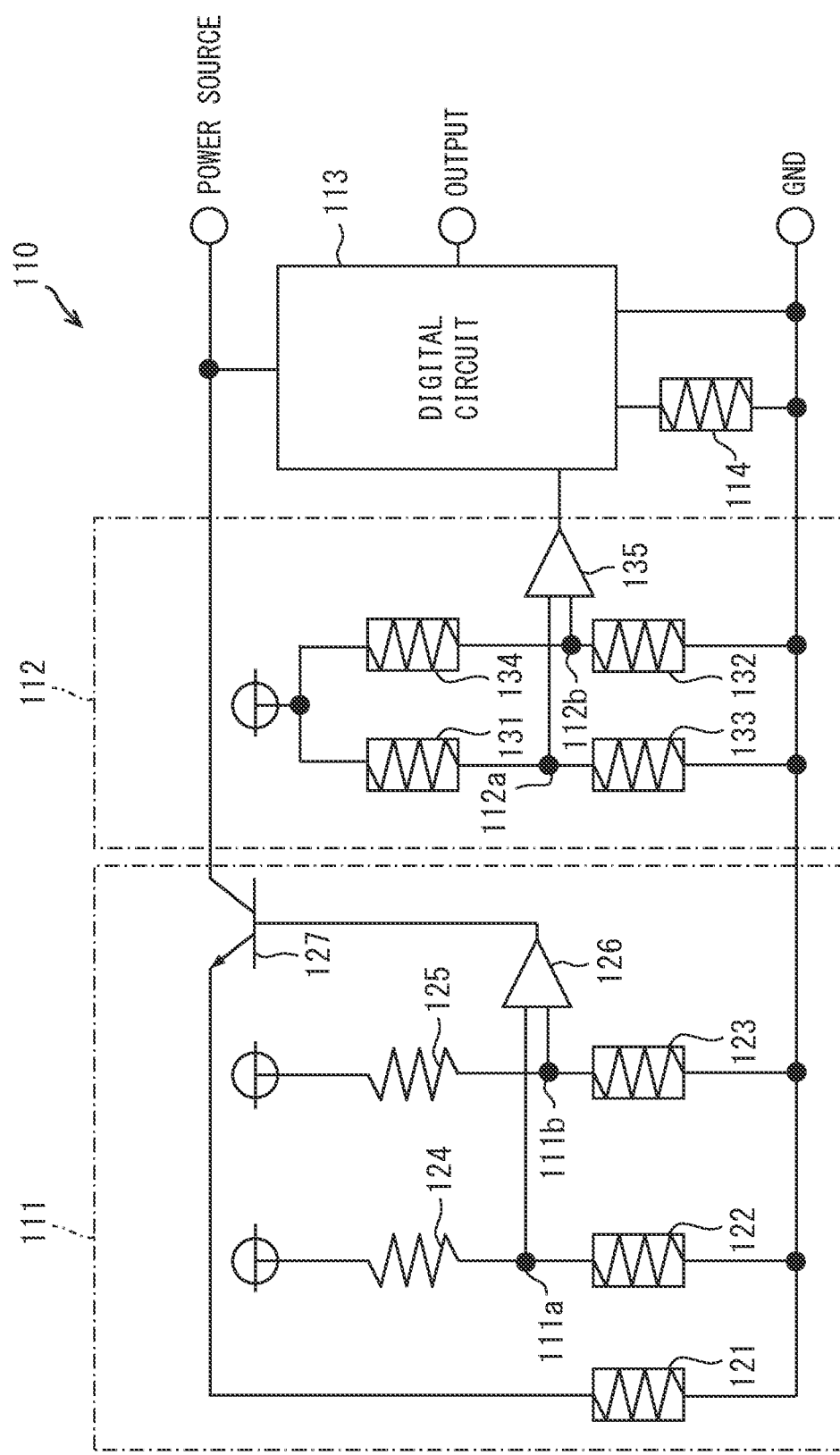
FIG. 11 is a circuit diagram showing a configuration of a flow rate detection circuit.

As shown in FIG. 11, the flow rate detection circuit 110 includes a heater control bridge 111 that controls the heater temperature, a flow rate detection bridge 112 that detects the flow rate according to the temperature of the air, and a digital circuit 113 that performs various processes. The heater control bridge 111, the flow rate detection bridge 112, and the digital circuit 113 each include a plurality of circuit elements such as resistance elements and switching elements.

The heater control bridge 111 is connected to the power supply terminal and the ground terminal in the flow rate detection circuit 110. The heater control bridge 111 includes a heater resistor 121 that generates heat when energized, a heater temperature resistor 122 that detects the temperature of the heater resistor 121, and a first air temperature resistor 123 that detects the temperature of the air flowing through the measurement flow path 32. Further, the heater control bridge 111 has a first control resistor 124 connected in series with the heater temperature resistor 122 and a second control resistor 125 connected in series with the first air temperature resistor 123.

The heater control bridge 111 includes an operational amplifier 126 as a comparison element for comparing potentials and a transistor 127 as a switching element for opening and closing an energization path. The operational amplifier 126 is connected to the first connection point 111a disposed between the heater temperature resistor 122 and the first control resistor 124, and is also connected to the connection point 111b disposed between the second air temperature resistor 123 and the second control resistor 125. The operational amplifier 126 is a comparison unit that compares the potential of the first connection point 111a with the potential of the second connection point 111b. The transistor 127 is connected to the output terminal of the operational amplifier 126, and operates according to the output of the operational amplifier 126. In the heater control bridge 111, the transistor 127 operates so that the temperature of the heater resistor 121 becomes a target temperature higher than the temperature of air by a predetermined temperature.

In the heater control bridge 111, when the temperature of the heater resistor 121 is lower than the target temperature, the resistance value of the heater temperature resistor 122 becomes smaller and the potential difference between the connection points 111a and 111b becomes larger, so that the operational amplifier 126 controls the transistor 127 to turn on. In this case, the temperature of the heater resistor 121 rises as the heater resistor 121 is energized. When the temperature of the heater resistor 121 rises to the target temperature, the resistance value of the heater temperature resistor 122 increases and the potential difference between the connection points 111a and 111b decreases, so that the operational amplifier 126 controls the transistor 127 to turn off. In this case, the temperature of the heater resistor 121 is lowered by stopping the energization of the heater resistor 121. In this way, in the heater control bridge 111, the temperature of the heater resistor 121 is maintained at the target temperature.

The flow rate detection bridge 112 is connected to the signal terminal and the ground terminal in the flow rate detection circuit 110. The flow rate detection bridge 112 has upstream resistors 131 and 132 that detect the air temperature on the upstream side of the heater resistor 121 in the measurement flow passage 32, and downstream resistors 133 and 134 that detect the air temperature on the downstream side of the heater resistor 121 in the measurement flow passage 32. The upstream resistors 131 and 132 and the downstream resistors 133 and 134 are connected in series one by one. In this case, the first upstream resistor 131 is connected to the ground terminal via the first downstream resistor 133, and the second downstream resistor 134 is connected to the ground terminal via the second upstream resistor 132.

The flow rate detection bridge 112 has an operational amplifier 135 as a comparison element for comparing potentials. The operational amplifier 135 is connected to the first connection point 112a between the first upstream resistor 131 and the first downstream resistor 133, and is also connected to the connection point 112b between the second upstream resistor 132 and the second downstream resistor 134. The operational amplifier 135 is a comparison unit that compares the potential of the first connection point 112a with the potential of the second connection point 112b. The output terminal of the operational amplifier 135 is connected to the digital circuit 113, and the comparison result of the potentials of the connection points 112a and 112b is input to the digital circuit 113.

When there is no air flow in the measurement flow passage 32, in the flow rate detection bridge 112, the heat of the heater resistor 121 is similarly transferred to both the upstream and downstream, and the resistance values of the upstream resistors 131 and 132 and the resistance values of the downstream resistors 133, 134 have almost the same resistance value. In this case, since the potential difference between the connection points 112a and 112b is small, the comparison result of the operational amplifier 135 is input to the digital circuit 113.

When a forward flow of air from the measurement inlet 35 to the measurement outlet 36 occurs in the measurement flow passage 32, the heat of the heater resistor 121 in the flow rate detection bridge 112 is easily transmitted to the downstream resistors 133 and 134 than to the upstream resistors 131 and 132 because the forward flow serves as a medium. In this case, the potential difference between the connection points 112a and 112b becomes a value corresponding to both the air direction of forward flow and the air flow rate, and this value is input to the digital circuit 113 as a comparison result of the operational amplifier 135.

On the other hand, when a backflow in the opposite direction to the forward flow occurs in the measurement flow passage 32, the heat of the heater resistor 121 is more likely to be transferred to the upstream resistors 131 and 132 than the downstream resistors 133 and 134 because the backflow serves as a medium. In this case, the potential difference between the connection points 112a and 112b becomes a value corresponding to both the air direction of backflow and the air flow rate, and this value is input to the digital circuit 113 as a comparison result of the operational amplifier 135.

The flow rate detection circuit 110 has a second air temperature resistor 114 that detects the temperature of the air flowing through the measurement flow passage 32, and the second air temperature resistor 114 is connected to the digital circuit 113. The digital circuit 113 calculates the flow rate of air flowing through the measurement flow passage 32 and the intake passage 12 by using the comparison result of the operational amplifier 135 and the potential of the second air temperature resistor 114, and outputs the information including the calculation result to the output terminal.

A detection element such as a heater resistor 121 included in the flow rate detection circuit 110 is included in the flow rate detection unit 22 and the flow rate processor 54. For example, the flow rate detection unit 22 includes resistors 114, 121 to 125, 131 to 134 and connection points 111a, 111b, 112a, 112b. In the flow rate detection unit 22, the resistor 103 has a plurality of resistors 114, 121 to 125, 131 to 134 as a plurality of resistance elements. The flow rate processor 54 includes a digital circuit 113, operational amplifiers 126 and 135, and a transistor 127.

As described above, since the digital circuit 113 has a large number of circuit elements, it is considered that heat is likely to be generated when the digital circuit 113 is driven by performing various processes. Further, it is considered that the operational amplifiers 126 and 135 and the transistor 127 are also likely to generate heat as they operate. Therefore, it is assumed that the flow rate processor 54 having the digital circuit 113, the operational amplifiers 126, 135, and the transistor 127 generates heat when processing the detection result input from the flow rate detection unit 22.

Figure 12:
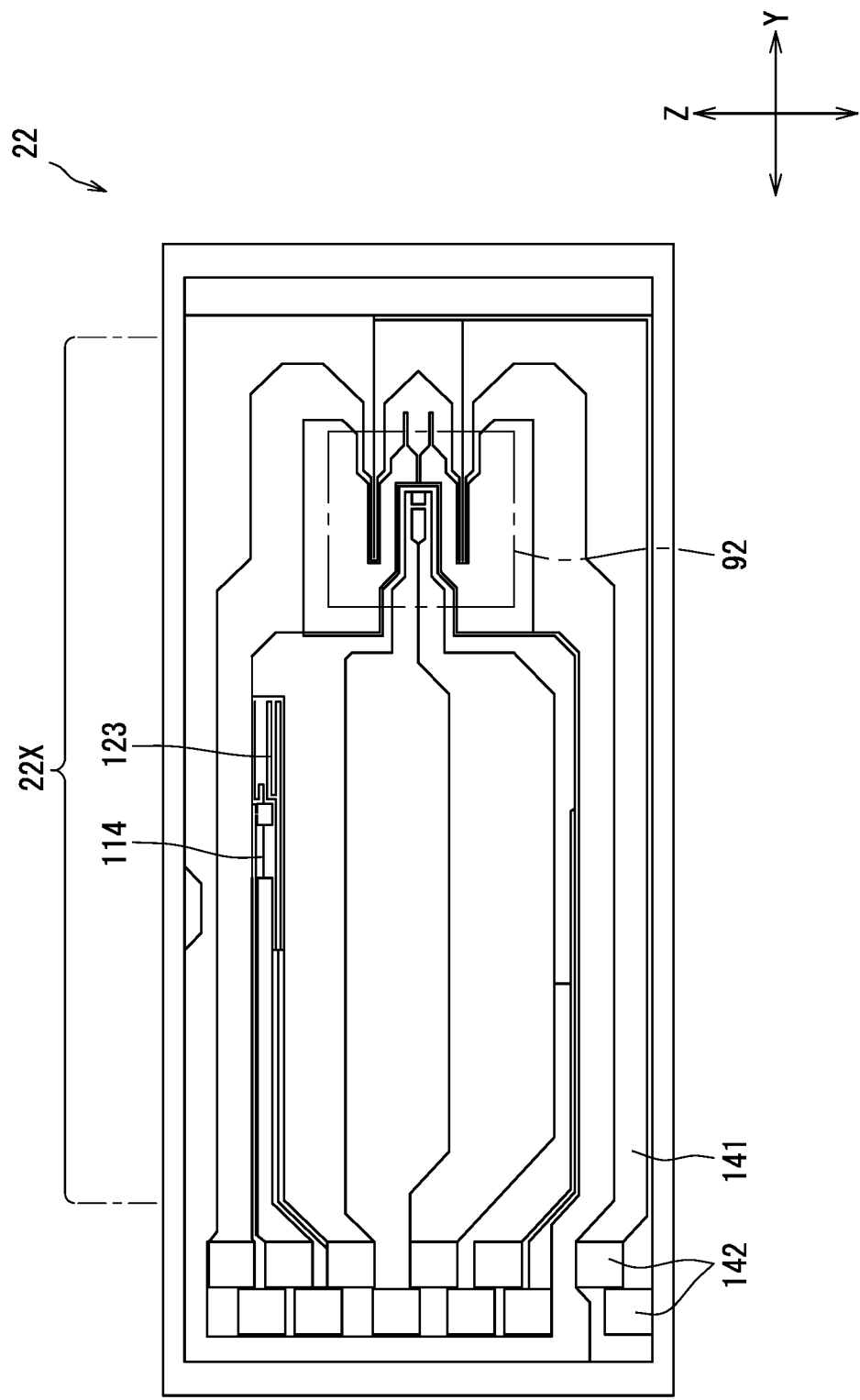
FIG. 12 is a plan view showing the positional relationship between the air temperature resistor and the membrane in the flow rate detection unit.
Figure 13:
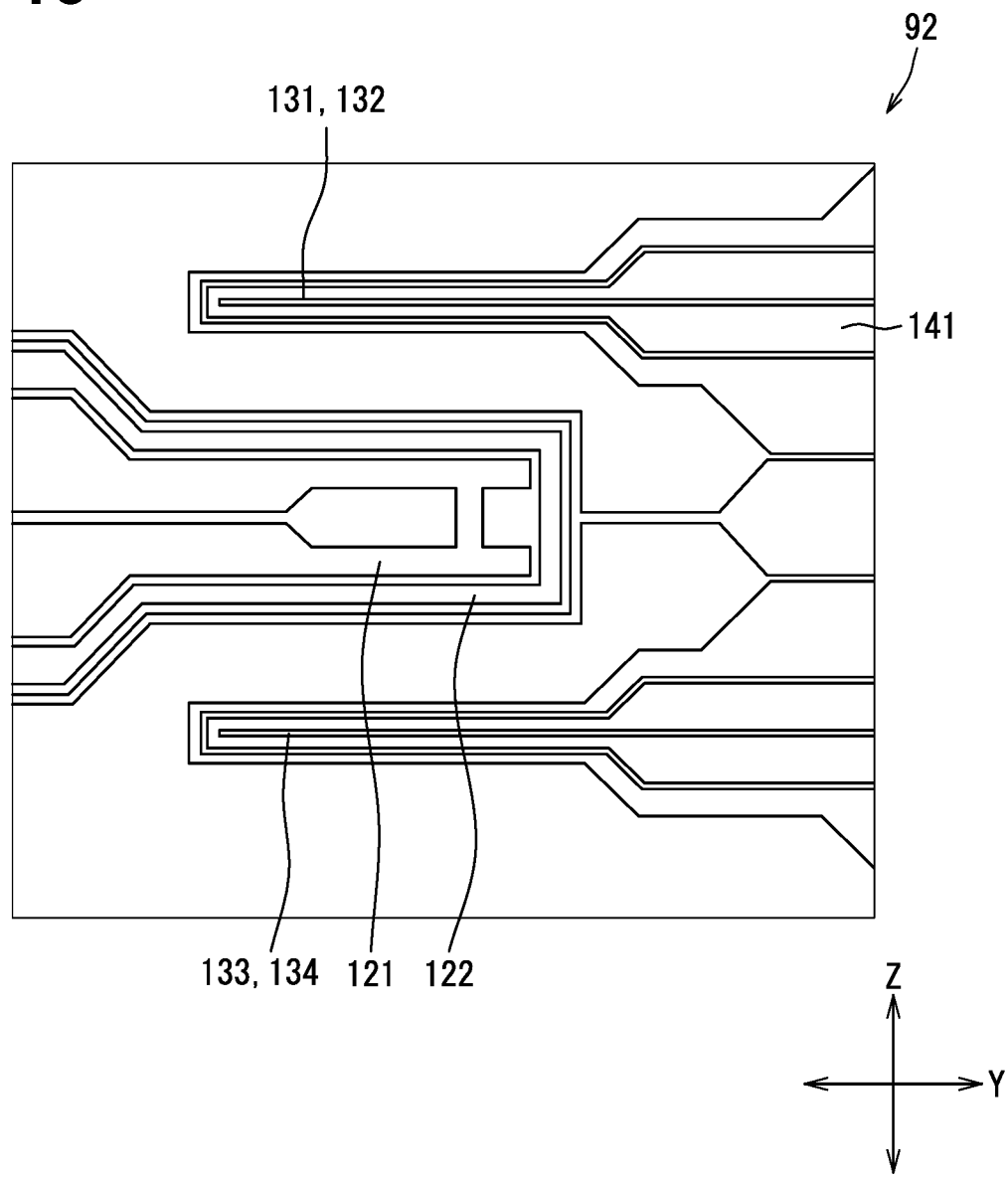
FIG. 13 is an enlarged view of the periphery of the membrane in FIG. 12.

As shown in FIGS. 12 and 13, the flow rate detection unit 22 includes a plurality of resistance elements such as a heater resistor 121, a wiring pattern 141 connected to these resistance elements, and a plurality of electrode units 142 connected to the wiring pattern 141. A plurality of resistance elements are provided in at least either one of the membrane unit 92 or the surface extension region 22X in the flow rate detection unit 22.

As shown in FIG. 13, the membrane unit 92 is provided with a heater resistor 121, a heater temperature resistor 122, upstream resistors 131 and 132, and downstream resistors 133 and 134. The heater resistor 121 is arranged at the center or a position close to the center of the membrane unit 92, and the heater temperature resistor 122 is arranged at a position close to the heater resistor 121. The heater temperature resistor 122 is an indirectly heated resistor that detects the temperature of the heater resistor 121 and disposed beside the heater resistor 121. The upstream resistors 131 and 132 are arranged on the mold upstream surface 55c side of the heater resistor 121 in the depth direction Z, and the downstream resistors 133 and 134 are arranged on the mold downstream surface 55d side of the heater resistor 121. In this case, the heater resistor 121 is arranged between the upstream resistors 131 and 132 and the downstream resistors 133 and 134 in the depth direction Z.

Since the membrane unit 92 is thinned as described above, it is difficult for heat to be transferred to the membrane unit 92. Therefore, when heat is generated by the heater resistor 121, it is difficult to transfer the heat to the upstream resistors 131 and 132 and the downstream resistors 133 and 134 via the constituent parts such as the detection base material 101 for constituting the flow rate detection unit 22. In this case, the resistance values of the upstream resistors 131 and 132 and the downstream resistors 133 and 134 do not change due to the heat transmitted through the constituent parts of the flow rate detection unit 22, but change due to the heat transmitted through the air. Therefore, it is possible to prevent the detection accuracy of the flow rate detection unit 22 from being lowered by the heat of the heater resistor 121.

As described above, since the internal space of the detection recess 91 is open to the outside of the sensor SA 50 through the detection frame hole 95 and the back mold hole 87, the membrane unit 92 is less likely to be deformed by the pressure difference between the inside and the outside of the detection recess 91. When the membrane unit 92 is deformed, the positional relationship between the heater resistance 121 and the upstream resistors 131, 132 and the positional relationship between the heater resistance 121 and the downstream resistors 133, 134 change, and the relationship between the air flow rate and the resistance values of the resistors 131 to 134 changes, so that the detection accuracy of the detection unit 22 may decrease. On the other hand, in the present embodiment, since the membrane unit 92 is unlikely to be deformed, the positional relationship between the heater resistance 121 and the resistors 131 to 134 and the relationship between the air flow rate and the resistance values of the resistors 131 to 134 do not easily change, and as a result, the detection accuracy of the flow rate detection unit 22 can be improved.

As shown in FIG. 12, air temperature resistors 114 and 123 are arranged in the front extension region 22X. These air temperature resistors 114 and 123 are sufficiently separated from the heater resistor 121 by being arranged in the front extension region 22X. Therefore, the air temperature resistors 114 and 123 can accurately detect the temperature of the air flowing through the measurement flow passage 32 regardless of the heat generated by the heater resistor 121.

In the present embodiment, the air temperature resistors 114 and 123 are arranged between the membrane unit 92 and the flow rate processor 54 in the height direction Y, and the heat generated by the flow rate processor 54 is more easily transferred to the temperature resistance 114 and 123 than to the membrane unit 92. When the heat generated by the flow rate processor 54 is transmitted to the flow rate detection unit 22, there is a concern that the temperature of the air temperature resistors 114 and 123 may rise in the front extension region 22X regardless of the flow rate and temperature of the air. In this case, the accuracy of detecting the air flow rate by the flow rate detection circuit 110 may be lowered. For example, when the temperature of the first air temperature resistor 123 rises, the potential of the second connection point 111b in the heater control bridge 111 changes, and the temperature of the heater resistor 121 may deviate from the target temperature. Further, when the temperature of the second air temperature resistor 114 rises, the calculation result of the air flow rate output from the digital circuit 113 may change. On the other hand, in the present embodiment, since the frame regulation unit 81 is provided, it is difficult for heat to be transferred from the flow rate processor 54 to the air temperature resistors 114 and 123, so that the detection accuracy of the flow rate detection circuit 110 Is less likely to decrease.

Although not shown, the control resistors 124 and 125 are also arranged at positions sufficiently separated from the heater resistor 121 in the flow rate detection unit 22. In this case, since the resistance values of the control resistors 124 and 125 does not easily change with the heat generated by the heater resistor 121, it is possible to suppress a decrease in the accuracy of temperature control of the heater resistor 121 by the heater control bridge 111. The control resistors 124 and 125 are arranged in the surface extension region 22X in the same manner as the air temperature resistors 114 and 123, for example.

Bonding wires 72 are connected to each of the plurality of electrode units 142. These electrode units 142 are arranged at positions covered by the mold unit 55 in the flow rate detection unit 22, whereby the bonding wire 72 is protected by the mold unit 55. In this case, each electrode unit 142 is arranged at a position different from that of the membrane unit 92 and the surface extension region 22X in the flow rate detection unit 22.

Here, as a method of manufacturing the air flow meter 20, a method of manufacturing the sensor SA 50 will be described with reference to FIGS. 14 to 24 and the like. The method of manufacturing the air flow meter 20 corresponds to a method of manufacturing the physical quantity measurement device.

First, a step of manufacturing the flow rate detection unit 22 is performed. In this step, the insulation film 102, the resistor 103, and the protection film 104 are formed on the detection base material 101, and the base material hole 101a is formed on the detection base material 101 by wet etching to form the detection recess 91. Further, the flow rate detection unit 22 is manufactured by forming the electrode unit 142.

Figure 14:
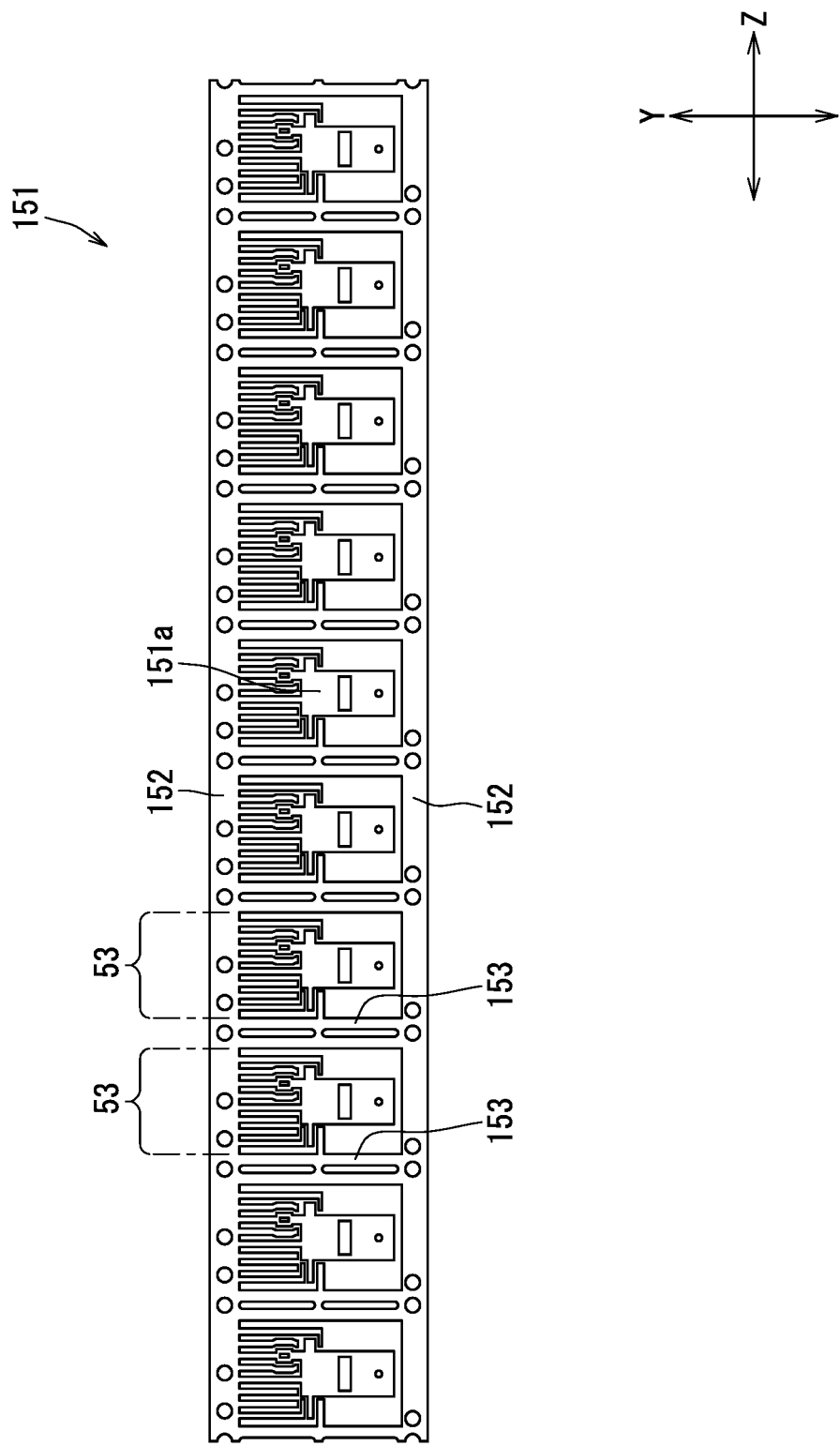
FIG. 14 is a plan view of the molded base.
Figure 15:
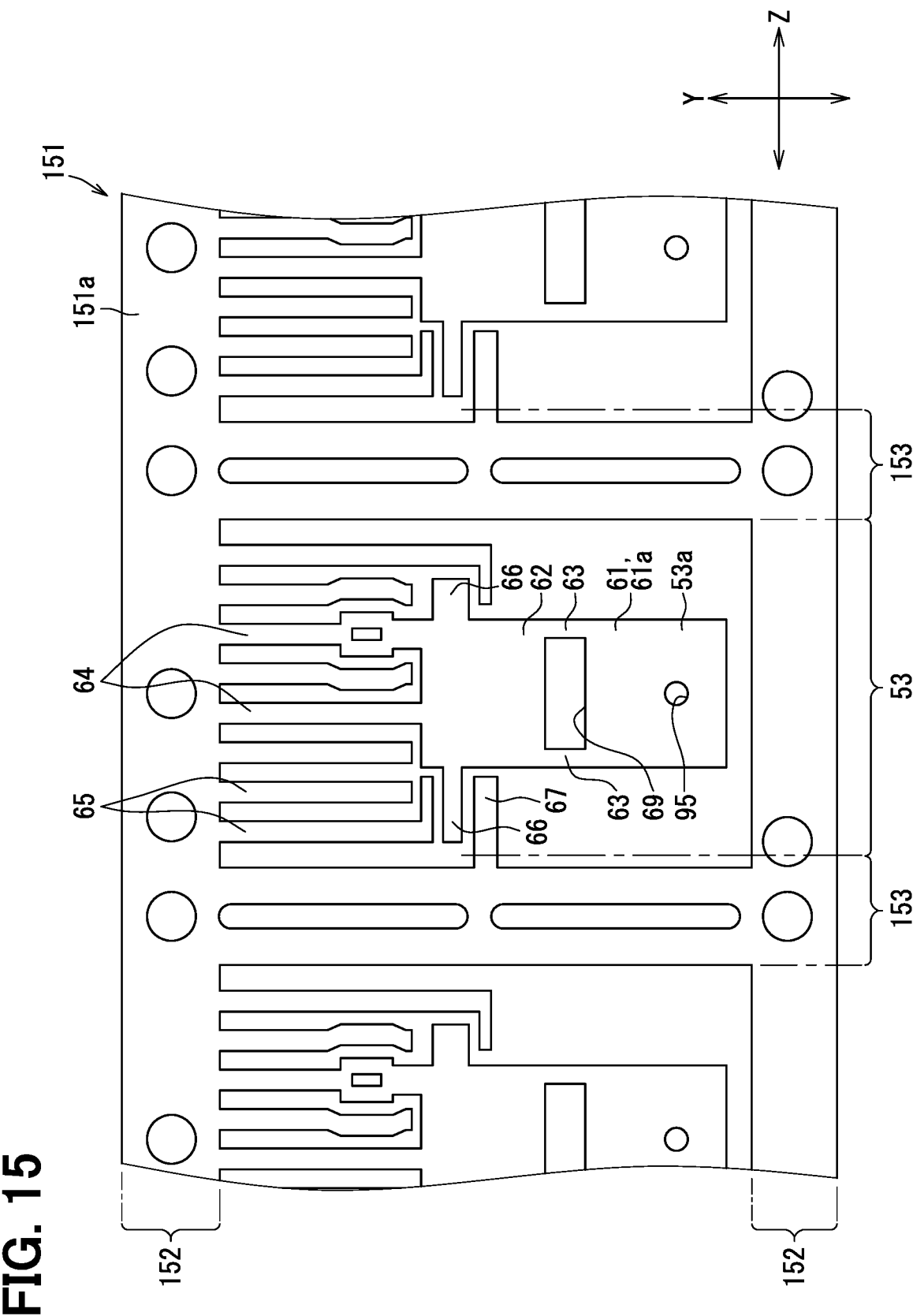
FIG. 15 is an enlarged view of the periphery of the SA substrate in FIG. 14.

In addition, a step of molding the base material 151 is performed. In this step, as shown in FIGS. 14 and 15, the base material 151 having a plurality of SA substrates 53 is molded by punching or pressing the conductive plate material. The punching process is performed by punching a tool such as a punching tool from one plate surface of the plate material toward the other plate surface. In the base material 151, the plate surface on the side where the punched piece is extruded by being punched by the tool is referred to as the punched surface 151a, and the plate surface on the side where the tool is pressed and punched is referred to as the punching surface 151b (see FIG. 18). In this case, in view of the direction in which the plate material is punched, it is considered that burrs associated with the punching process tend to remain on the punched surface 151a of the base material 151 and hardly remain on the punching surface 151b. In the SA substrate 53, the front surface 53a is included in the punched surface 151a, and the back surface 53b is included in the punching surface 151b. Therefore, on the surface 53a of the SA substrate 53, burrs tend to remain on the peripheral edge of the front opening 95a of the detection frame hole 95 and the peripheral edge of the lead terminals 64 and 65.

The base material 151 has a pair of bridging leads 152 bridged over a plurality of SA substrates 53, and a connecting lead 153 connecting the bridging leads 152. In the SA board 53, the lead terminals 64 and 65 are in a state of being connected to the bridging lead 152, and the circuit protection frame 67 is in a state of being connected to the connecting lead 153. In this case, the detection frame 61 and the connection frame 63 are connected to the bridging lead 152 via the ground lead terminal 64. Therefore, it is not necessary to provide the base material 151 with hanging leads for connecting the detection frame 61 and the connection frame 63 to the bridging lead 152 and the connecting lead 153.

Figure 16:
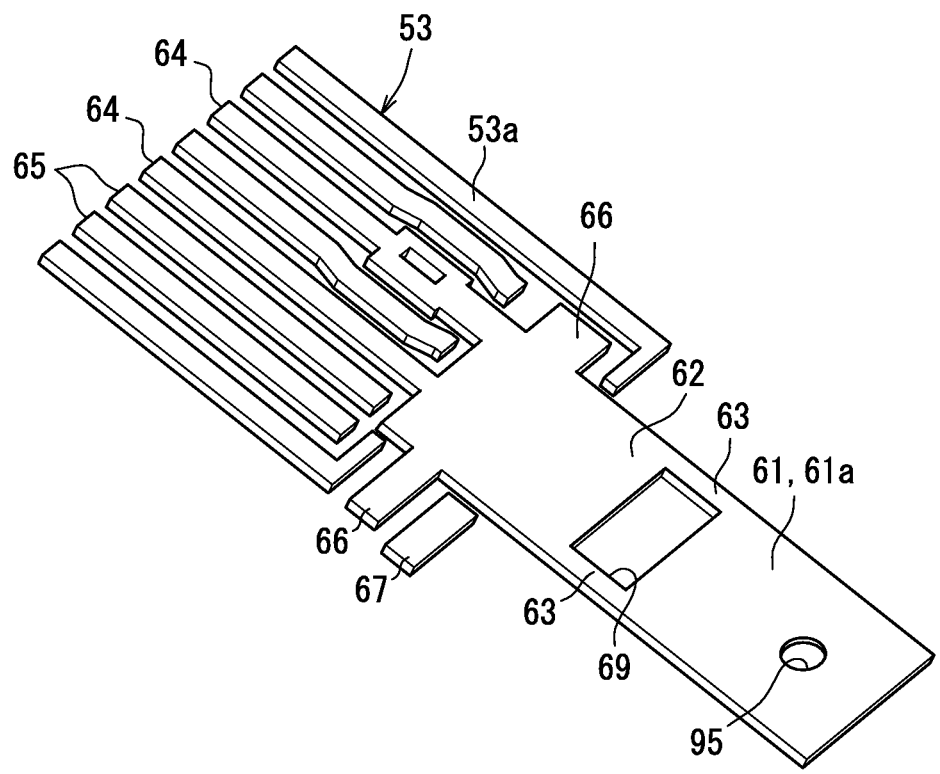
FIG. 16 is a perspective view of the SA substrate as viewed from the front side.

As shown in FIG. 16, when the drawing of the bridging lead 152 and the connecting lead 153 in the base material 151 is omitted, the SA substrate 53 at the stage of molding the base material 151 is in a state where the ground lead terminal 64 and the like are spaced apart from the detection frame 61 and the like.

Figure 17:
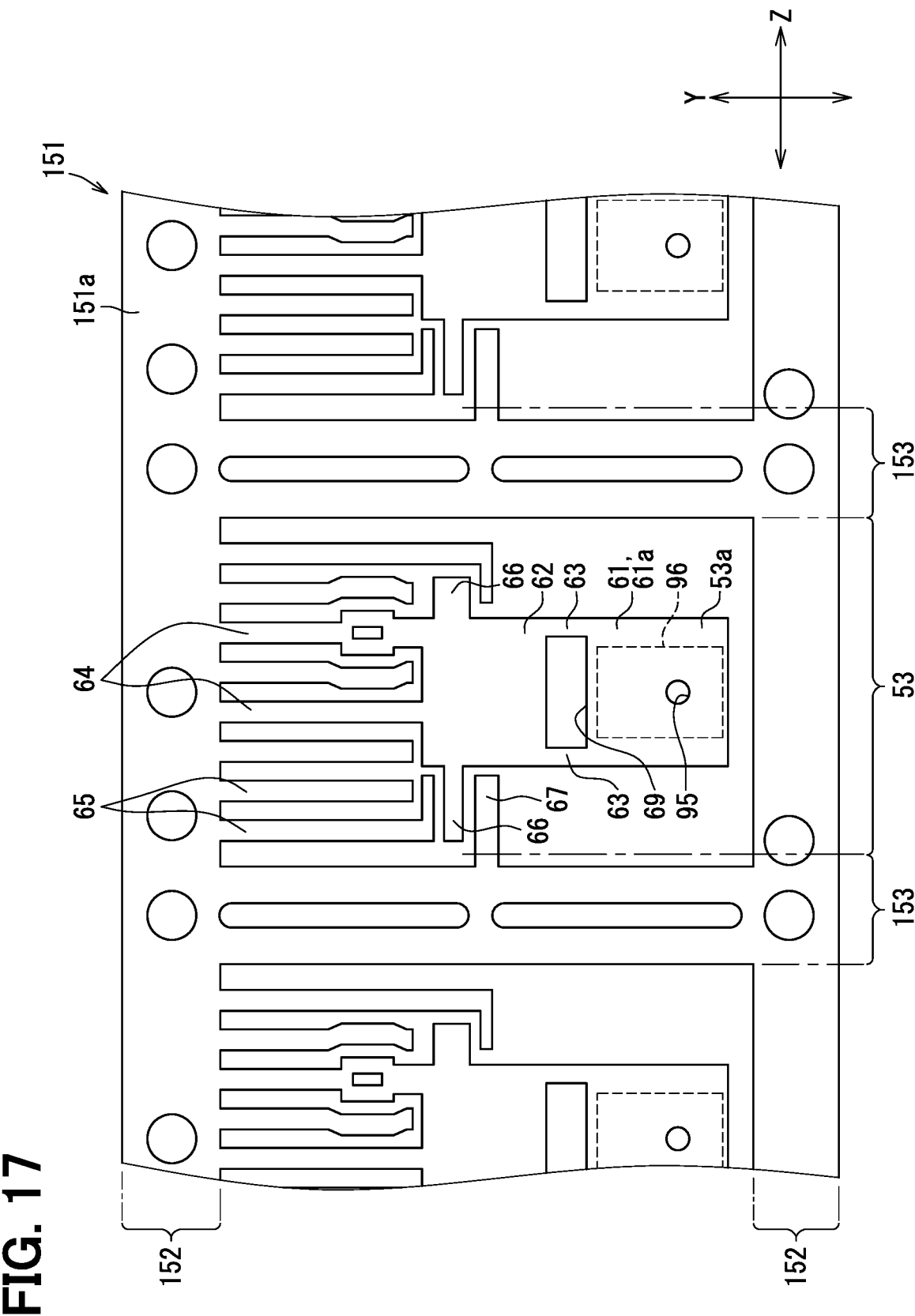
FIG. 17 is a plan view of a base in a state where a filter is attached to an SA substrate as viewed from the front side.
Figure 18:
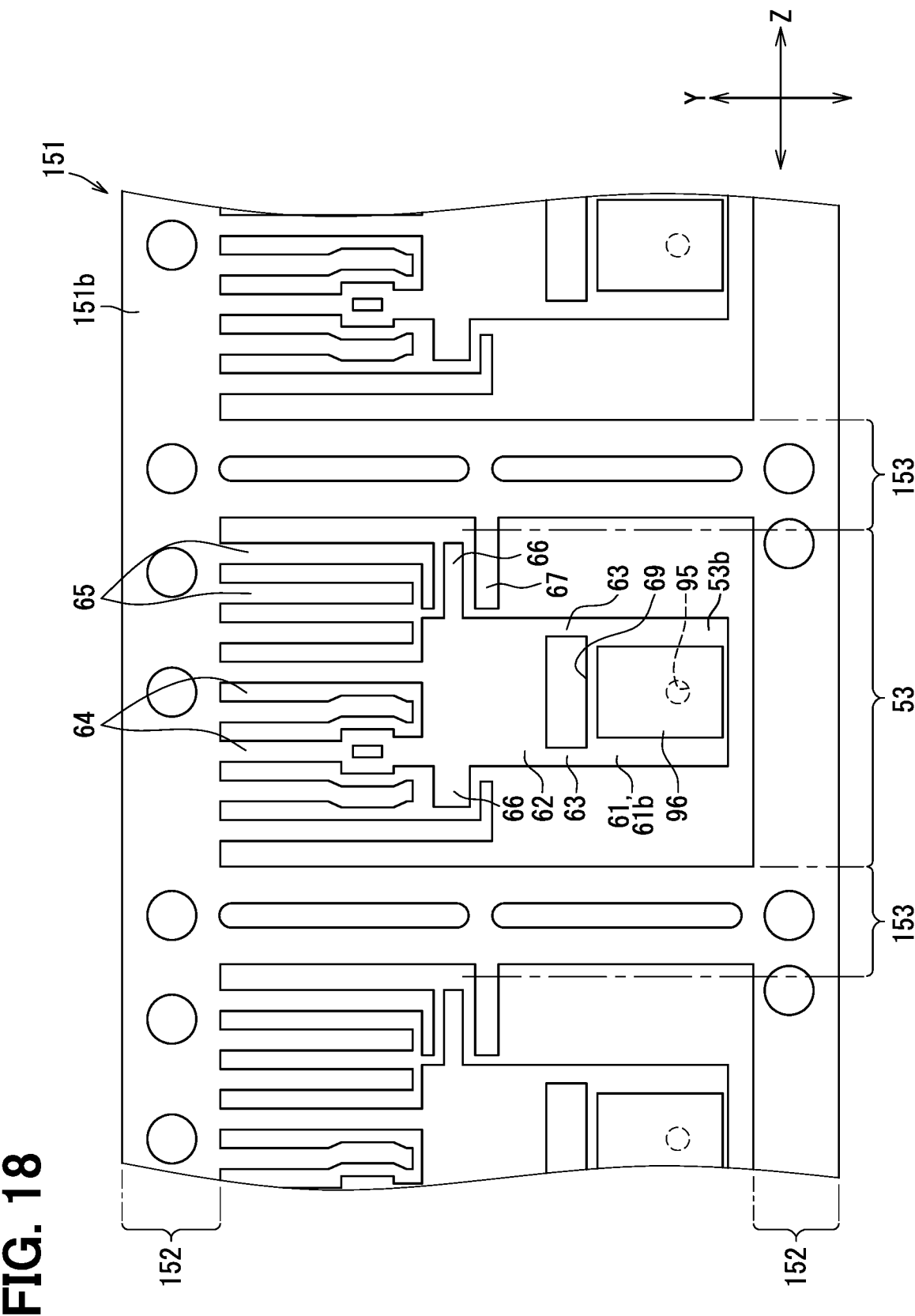
FIG. 18 is a plan view of a base in a state where a filter unit is attached to an SA substrate as viewed from the back side.

Next, a step of attaching the filter unit 96 to the punching surface 151b of the base material 151 is performed. In this step, as shown in FIGS. 17 to 19, a filter unit 96 is attached to the back surface 53b of each SA substrate 53 in the base material 151. Here, the filter unit 96 is attached to the back surface 61b of the detection frame 61 using an adhesive or the like so that the filter unit 96 covers the detection frame hole 95. By attaching the filter unit 96 to the punching surface 151b in this way, it is less likely that the filter unit 96 is damaged by the burrs remaining on the punched surface 151a. For example, unlike the present embodiment, in the configuration in which the filter unit 96 is attached to the punched surface 151a, the filter unit 96 is damaged by the burrs remaining on the punched surface 151a, and the foreign particle removing performance of the filter unit 96 may deteriorate.

Figure 20:
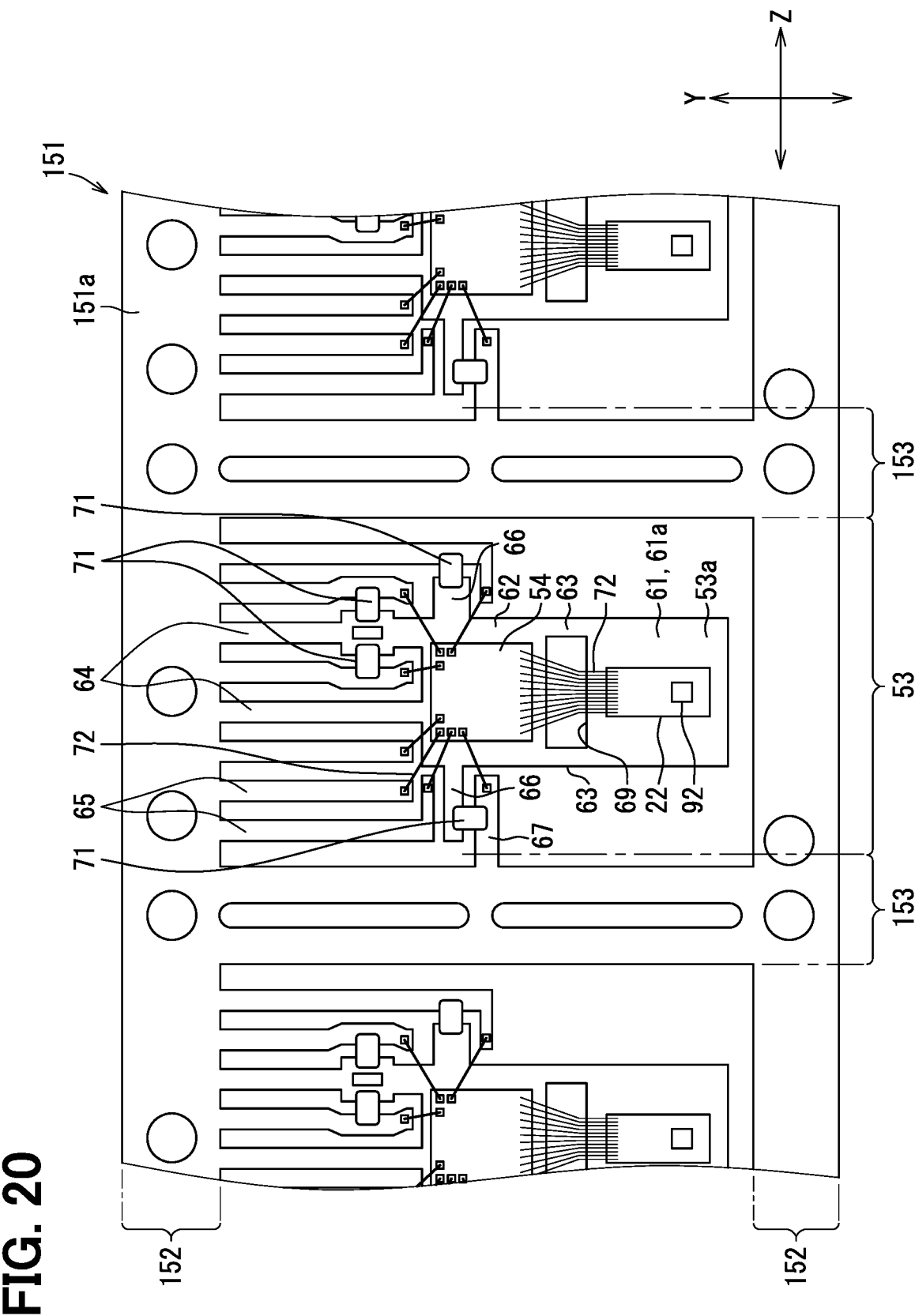
FIG. 20 is a plan view of a base in a state where a chip component is attached to an SA substrate as viewed from the front side.
Figure 21:
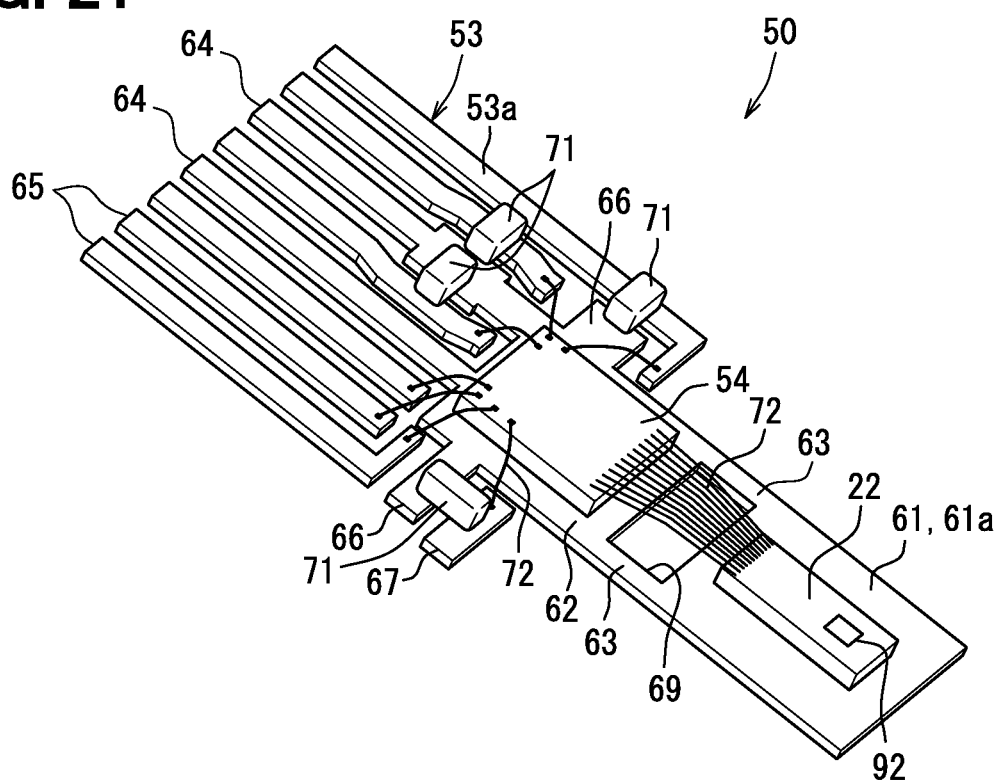
FIG. 21 is a perspective view of an SA substrate in a state where a chip component is attached, as viewed from the front side.

Further, a step of attaching a chip component such as a flow rate detection unit 22 to the punched surface 151a of the base material 151 is performed. In this step, as shown in FIGS. 20 and 21, chip components such as a flow rate detection unit 22, a flow rate processor 54, and a protection chip 71 are mounted on each of the SA substrates 53 in the base material 151. Then, by performing wire bonding to these chip components and the SA substrate 53, the bonding wire 72 is connected to the flow rate detection unit 22, the flow rate processor 54, the circuit lead terminal 65, the circuit protection frame 67, and the like.

Here, when the flow rate detection unit 22 is attached to the punched surface 151a, there is a concern that the flow rate detection unit 22 may be damaged by the burrs remaining on the punched surface 151a. Specifically, there is a concern that burrs remaining on the peripheral edge of the front opening 95a of the detection frame 61 may come into contact with the back surface 22b of the flow rate detection unit 22. On the other hand, as described above, the front opening 95a is sufficiently smaller than the concave opening 91c so as to arrange the peripheral edge of the front opening 95a of the detection frame 61 at a position separated from the peripheral edge of the concave opening 91c of the flow rate detection unit 22 inwardly. Therefore, even if burrs remain on the peripheral edge of the front opening 95a of the detection frame 61, the flow rate detection unit 22 is attached to the detection frame 61 so that the front opening 95a is arranged inside the peripheral edge of the concave opening 91c. As a result, damage to the flow rate detection unit 22 due to burrs can be avoided.

Figure 22:
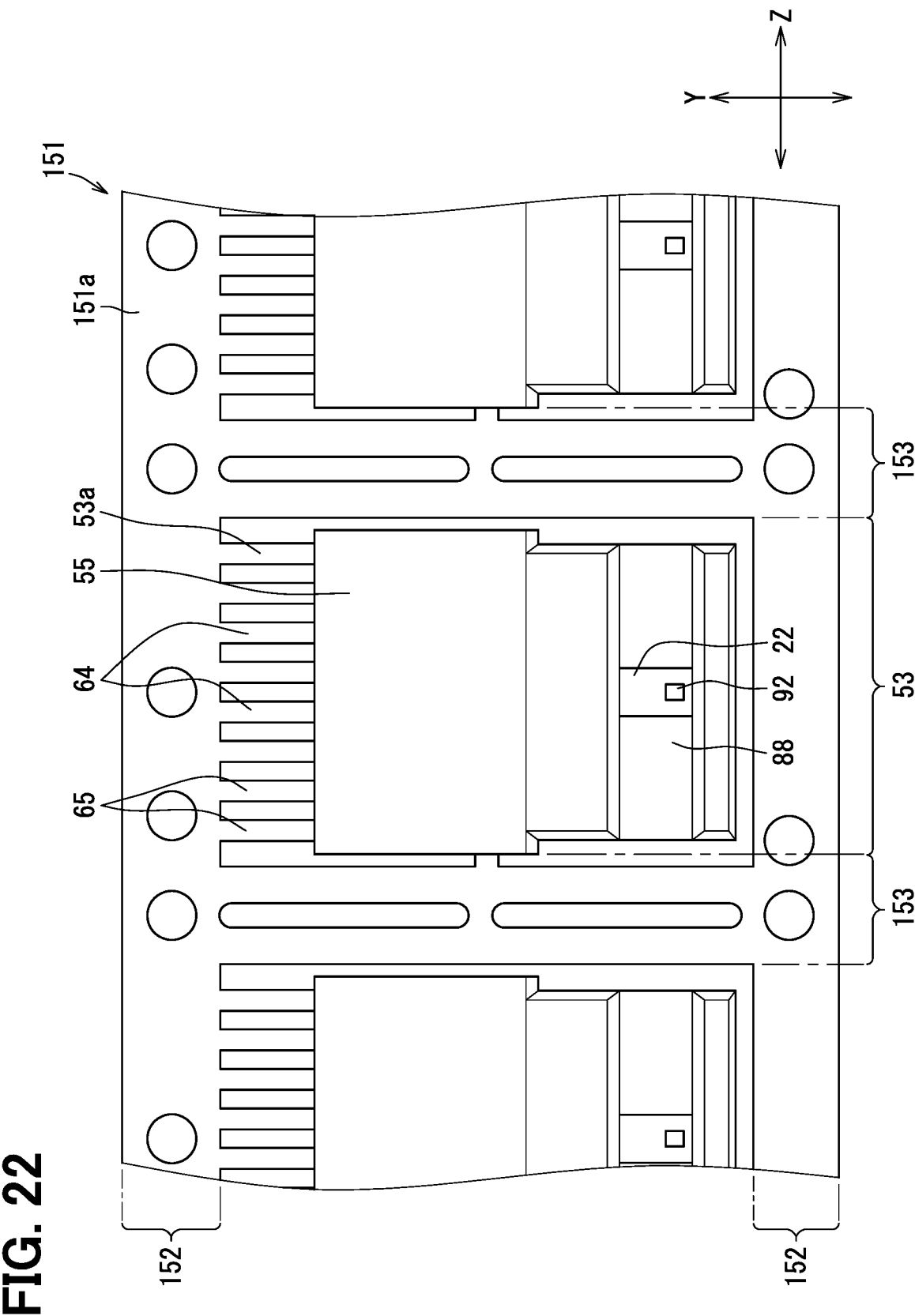
FIG. 22 is a plan view of a base in a state where a mold unit is attached to an SA substrate as viewed from the front side.

Subsequently, a step of attaching the mold portion 55 to the base material 151 is performed. This step can also be referred to as a molding step of molding the mold portion 55. In this step, as shown in FIG. 22, a mold unit 55 is attached to each of the SA substrates 53 in the base material 151 so as to cover the flow rate detection unit 22, the flow rate processor 54, the protection chip 71, the bonding wire 72, and the filter unit 96. Further, in this step, the mold device 160 is mounted on each SA substrate 53 of the base material 151, and the mold unit 55 is resin-molded by the mold device 160.

Figure 23:
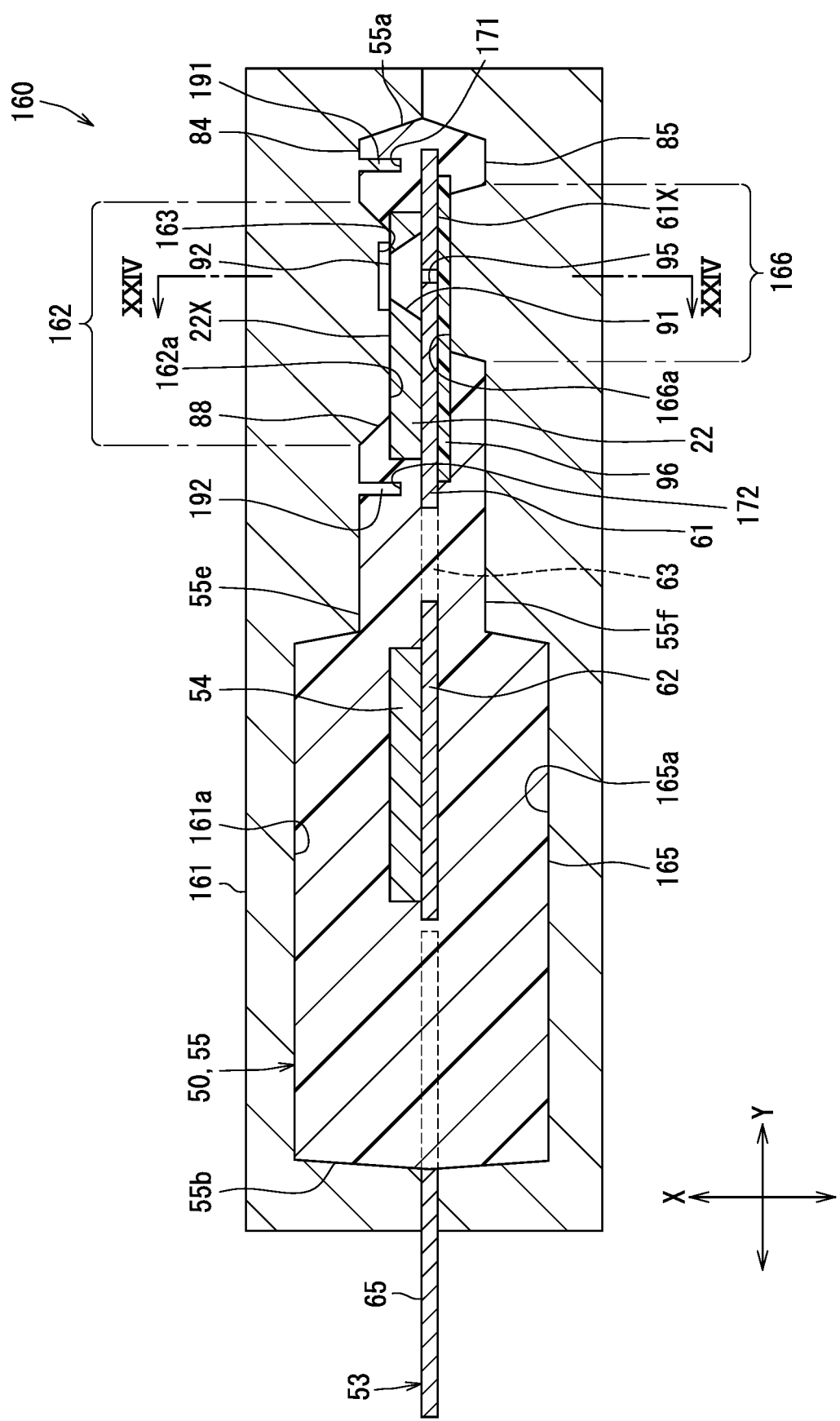
FIG. 23 is a vertical cross-sectional view of a structure of a mold device.
Figure 24:
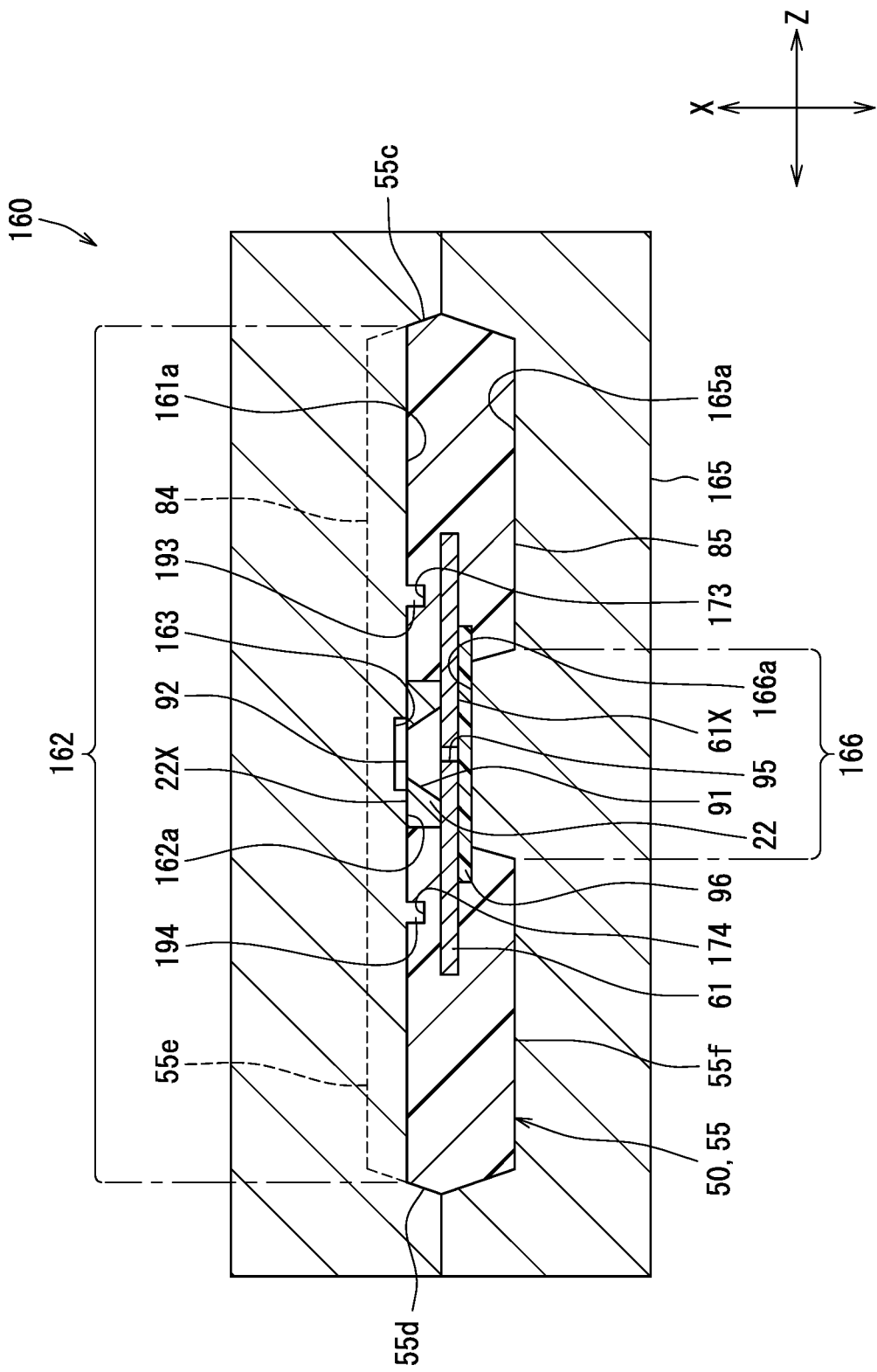
FIG. 24 is a cross-sectional view taken along a line XXIV-XXIV of FIG. 23.

As shown in FIGS. 23 and 24, the mold device 160 has a front mold unit 161 for molding the front cover unit 84 of the mold unit 55 and a back mold unit 165 for molding the back cover unit 85 of the mold portion 55. Regarding the outer peripheral surface of the mold unit 55, when the surface on the front cover unit 84 side is referred to as the front surface 55e and the surface on the back cover unit 85 side is referred to as the back surface 55f, the front mold unit 161 includes a front mold recess 161a for molding the surface 55e of the mold unit 55. Further, the back mold unit 165 has a back mold recess 165a for molding the back surface 55f of the mold unit 55.

The front mold unit 161 has a groove molding unit 162 for molding the front mold groove 88 in the mold unit 55. The groove molding unit 162 is a protruding portion that projects so that the bottom surface of the surface mold recess 161a expands. The groove molding unit 162 is gradually tapered toward the tip surface 162a thereof, and is tapered as a whole. When the mold device 160 is mounted on the SA substrate 53, the tip surface 162a of the groove molding unit 162 is in a state of pressing the front extension region 22X of the flow rate detection unit 22. The groove molding unit 162 is a portion where the membrane unit 92 and the surface extension region 22X are exposed by contacting with the surface extension region 22X, and corresponds to the surface exposure molding portion.

The groove molding unit 162 is provided with an avoidance recess 163 that prevents the groove molding unit 162 from coming into contact with the membrane unit 92 while the mold device 160 is mounted on the SA substrate 53. The avoidance recess 163 is formed by denting the tip surface 162a of the groove molding unit 162, and the open end of the avoidance recess 163 is larger than the membrane unit 92. When the mold device 160 is mounted on the SA substrate 53, the peripheral edge of the open end of the avoidance recess 163 is separated from the membrane unit 92 on the outer peripheral side. Further, the tip surface 162a of the groove molding unit 162 has an annular shape since the surface 162a surrounds the peripheral edge portion of the avoidance recess 163.

The back mold unit 165 has a hole molding unit 166 for molding the back mold hole 87 in the mold unit 55. The hole molding unit 166 is a protruding portion that projects so that the bottom surface of the back surface mold recess 165a expands. The hole molding unit 166 is gradually tapered toward the tip surface 166a thereof, and is tapered as a whole. When the mold device 160 is mounted on the SA substrate 53, the tip surface 166a of the hole mold unit 166 is in a state of pressing the back extension region 61X via the filter unit 96. The hole molding portion 166 is a portion that exposes the detection frame hole 95 and the back extension region 61X through the filter unit 96 by coming into contact with the filter unit 96, and corresponds to the back exposure molding portion.

In the state where the back mold unit 165 is mounted on the SA substrate 53, the tip surface 166a of the hole molding unit 166 is in contact with the portion of the filter unit 96 that overlaps the back extension region 61X of the detection frame 61. In the present embodiment, this state is also referred to as a state in which the tip surface 166a of the hole molding unit 166 is in contact with the back extension region 61X via the filter unit 96.

In the molding process of the mold unit 55, the mold device 160 is assembled so that the SA substrate 53 of the base material 151 is sandwiched between the front mold unit 161 and the back mold unit 165, and the mold device 160 is mounted on the base material 151 by performing mold clamping. Then, the molten resin is injected into the internal space of the mold device 160 from the injection port formed in the mold device 160 and filled. The internal space of the mold device 160 is formed by the internal spaces of the front mold recess 161a and the back mold recess 165a. The mold device 160 has a plurality of front mold recesses 161a and back mold recesses 165a, and the mold device 160 can mold a plurality of mold units 55.

When the mold device 160 is mounted on the SA substrate 53, the tip surface 162a of the groove molding unit 162 of the front mold unit 161 is overlapped with the front extension region 22X, and the tip surface 166a of the hole molding unit 166 of the back mold unit 165 is overlapped with the back extension region 61X via the filter unit 96. In this state, the groove molding unit 162 and the hole molding unit 166 are in a state of pressing the flow rate detection unit 22 and the detection frame 61 in a direction approaching each other. Therefore, when the molten resin is injected into the mold device 160, it is possible to restrict the molten resin from penetrating into an unintended portion. Specifically, it is possible to restrict the molten resin from penetrating between the front end surface 162a of the groove molding unit 162 and the front extension region 22X, between the front end surface 166a of the hole molding unit 166 and the back extension region 61X, and between the back surface 22b of the flow rate detection portion 22 and the surface 61a of the detection frame 61.

Further, since the avoidance recess 163 is formed on the tip surface 162a of the groove molding unit 162, the tip surface 162a does not come into contact with the membrane unit 92 even when the groove molding unit 162 is pressed against the front extension region 22X. Therefore, it is less likely that the membrane unit 92 is pressed by the groove molding unit 162 and deformed. Moreover, in the groove molding unit 162 of the surface mold unit 161, the tip surface 162a thereof has a ring shape so as to surround the avoidance recess 163. Therefore, the molten resin does not penetrate into the avoidance recess 163 through between the front end surface 162a of the groove molding unit 162 and the back extension region 61X.

Further, since each of the front extension region 22X and the back extension region 61X is as large as possible, the pressure applied from the groove molding unit 162 and the hole molding unit 166 to the front extension region 22X and the back extension region 61X is easily dispersed in these extension regions 22X and 61X. For example, the smaller the front extension region 22X, the more difficult it is for the pressure applied from the groove molding unit 162 to the front extension region 22X to be dispersed, and there is a concern that the flow rate detection unit 22 may be deformed or damaged. Similarly, the smaller the back extending region 61X, the more difficult it is for the pressure applied from the hole molding unit 166 to the back extending region 61X to be dispersed, and there is a concern that the detection frame 61 and the filter unit 96 may be deformed or damaged.

In the surface mold unit 161, the groove molding unit 162 can be displaced in the width direction X with respect to other portions, and the pressure of the groove molding unit 162 pressed against the front extension region 22X can be adjusted. For this reason, under a condition that the molten resin is restricted to penetrate between the tip surface 162a of the groove molding unit 162 and the surface extension region 22X, the groove molding unit 162 can be pressed against the front extension region 22X with a pressure that does not cause the flow rate detection unit 22 to be deformed or damaged by the pressure from the groove molding unit 162.

Further, the mold device 160 is mounted on the base material 151 in a state where the mold filter made of fluoro-resin or the like is attached to the inner peripheral surface of the surface mold recess 161a. With this mold filter, it is possible to suppress that the pressure applied from the groove molding unit 162 to the front extension region 22X and the pressure applied from the hole molding unit 166 to the back extension region 61X vary from product to product.

After the molten resin filled inside the mold device 160 is cured, the mold device 160 is disassembled to remove the front mold unit 161 and the back mold unit 165 from the base material 151 and the mold unit 55. Then, as shown in FIG. 22, in the base material 151, the plurality of sensors SA 50 are connected by the bridging lead 152 and the connecting lead 153.

Next, a step of removing the sensor SA 50 from the leads 152 and 153 is performed. In this process, tie bar cutting is performed. Here, the lead terminals 64 and 65 are separated from the bridging lead 152, and the circuit protection frame 67 is separated from the connecting lead 153. Therefore, as shown in FIGS. 4 and 5, the cut surface of the circuit protection frame 67 is exposed to the side of the sensor SA 50 at the mold downstream surface 55d. The cut surface of the circuit protection frame 67 may be coated with resin or the like.

After the sensor SA 50 is completed, the sensor SA 50 is installed in the internal space 24a of the molded housing 21. Then, the lead terminals 64 and 65 of the sensor SA 50 are connected to the connector terminals 28a. In this case, the back surfaces of the lead terminals 64 and 65 are brought into contact with the connector terminals 28a. As described above, the back surfaces of the lead terminals 64 and 65 are formed by the punching surface 151b of the base material 151. Therefore, even if burrs remain on the peripheral edges of the lead terminals 64 and 65 on the punching surface 151a, it is less likely that the burrs come into contact with the connector terminal 28a. In this case, it is possible to prevent a burr from being sandwiched between the lead terminals 64 and 65 and the connector terminal 28a and from causing insufficient contact between the lead terminals 64 and 65 and the connector terminal 28a.

Countermeasures Against Deformation

In the present embodiment, when the membrane unit 92 of the flow rate detection unit 22 is deformed in the sensor SA 50, the resistors 121, 122, 131 to 134 may be deformed, and the resistance values of these resistors 121, 122, 131 to 134 may be unintentionally changed. When the membrane unit 92 is deformed, the resistance values of the resistors 121, 122, 131 to 134 change according to the gauge ratio of the resistors 121, 122, 131 to 134. In this case, there is a concern that the flow rate characteristics indicating the relationship between the air flow rate and the detected value of the flow rate detection unit 22 may change, and the detection accuracy of the flow rate detection unit 22 and the measurement accuracy of the air flow meter 20 may decrease. The membrane unit 92 corresponds to the sensor unit, and the resistors 121, 122, 131 to 134 of the membrane unit 92 correspond to the detection element.

Examples of the case where the membrane unit 92 is deformed include the case where the flow rate detection unit 22 is deformed and the case where the mold unit 55 is deformed. When the temperature of the intake air flowing through the intake passage 12 or the ambient temperature around the air flow meter 20 changes, the temperature of the mold unit 55 may also change and the unit 55 may be deformed. When stress is applied to the flow rate detection unit 22 due to the deformation of the mold unit 55, the detection base material 101 of the flow rate detection unit 22 may be deformed and the membrane unit 92 may be also deformed.

Deformation of the membrane unit 92 is likely to occur because the linear expansion coefficients of the components constituting the sensor SA 50 are different. Specifically, in the sensor SA 50, the coefficient of linear expansion differs between the mold unit 55 and the flow rate detection unit 22. Therefore, when the mold unit 55 is deformed due to the temperature change of the mold unit 55, the deformation mode differs between the mold unit 55 and the flow rate detection unit 22, and stress is applied from the mold unit 55 to the flow rate detection unit 22. As a result, the flow rate detection unit 22 is deformed. Here, the coefficient of linear expansion of the detection base material 101 is referred to as the coefficient of linear expansion of the flow rate detection unit 22.

Further, in the flow rate detection unit 22, the coefficient of linear expansion differs between the detection base material 101 and the membrane unit 92. Therefore, when the detection base material 101 is deformed, such as when stress is applied to the detection base material 101 from the mold unit 55 or when the temperature of the detection base material 101 changes, the deformation mode between the detection base material 101 and the membrane portion 92 tends to be different. In this case, the resistors 121, 122, 131 to 134 are deformed by applying stress from the detection base material 101 to the membrane unit 92. The stress generated by the temperature change can also be referred to as thermal stress.

In the manufacturing process of the air flow meter 20, the mold unit 55 is unintentionally deformed due to the temperature change when the molten resin is cured to manufacture the mold unit 55, and the resistors 121, 122, 131 to 134 may be deformed. If the state in which the resistors 121, 122, 131 to 134 are deformed during the manufacturing process of the mold unit 55 becomes the standard state for the air flow meter 20, the air flow meter 20 in a state with low measurement accuracy would be shipped and put on the market. On the other hand, the manufacturing process of the air flow meter 20 includes an adjusting step of adjusting the detected value of the flow rate detection unit 22. Therefore, even if the detection accuracy of the flow rate detection unit 22 deteriorates due to the temperature change during manufacturing the mold unit 55, the detection accuracy of the flow rate detection unit 22 can be improved by adjusting the detection value of the flow rate detection unit 22 according to the true value in the adjustment step.

Here, even when the adjustment process is performed, if the mold unit 55 is deformed due to a temperature change in the air flow meter 20 after being mounted on the vehicle, the resistors 121, 122, 131 to 134 may be easily deformed with respect to the standard state of the air flow meter 20. Therefore, although it is possible to improve the detection accuracy of the flow rate detection unit 22 at the time of shipment by performing the adjustment step, the detection accuracy of the flow rate detection unit 22 may deteriorate due to the temperature change when the unit 22 is mounted on the vehicle after shipment.

Figure 25:
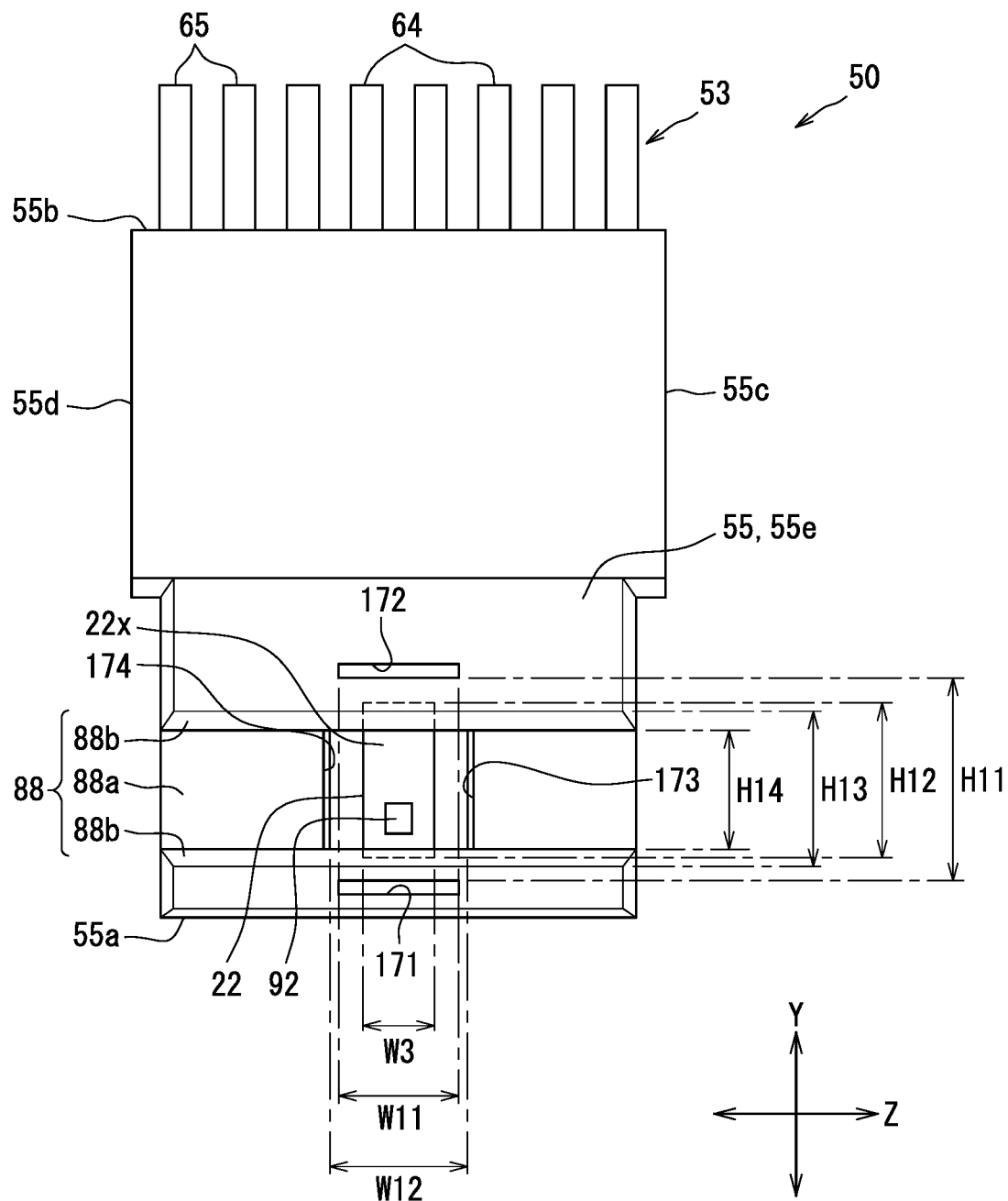
FIG. 25 is a perspective view of the sensor SA as viewed from the front side.

Therefore, in the present embodiment, as shown in FIGS. 4 and 25, mold recesses 171 to 174 are provided in the mold unit 55 of the sensor SA 50. The mold recesses 171 to 174 are recesses provided on the front surface 55e of the outer surface of the mold unit 55, and are recessed in the mold unit 55 toward the back surface 55f. The mold recesses 171 to 174 are stress reduction portions that reduce the stress applied from the mold unit 55 to the flow rate detection unit 22 as the mold unit 55 is deformed. The reduction of stress by the mold recesses 171 to 174 also relieves the stress transmitted from the mold unit 55 to the flow rate detection unit 22 toward the mold recesses 171 to 174, and the mold recesses 171 to 174 can also be referred to as stress relief portions. The mold unit 55 protects the flow rate detection unit 22, and corresponds to a protection body. Further, the mold recesses 171 to 174 correspond to the body recesses.

The molded unit 55 is formed in a plate shape as a whole. When the direction in which the front surface 55e and the back surface 55f of the mold unit 55 are aligned is referred to as the thickness direction of the mold unit 55, the width direction X is this thickness direction. The mold recesses 171 to 174 have a depth because they extend from the front surface 55e toward the back surface 55f, and the width direction X is the depth direction of the mold recesses 171 to 174. When the height direction Y and the depth direction Z are referred to as orthogonal directions orthogonal to the width direction X, the mold recesses 171 to 174 are provided at positions separated from the flow rate detection unit 22 in the orthogonal directions. The mold recesses 171 to 174 extend in a groove shape along the peripheral edge of the flow rate detection unit 22, respectively, and are separated from each other to form four independent groove portions.

Of the mold recesses 171 to 174, the tip side mold recess 171 is provided at a position separated from the flow rate detection unit 22 toward the mold tip surface 55a, and the base end side mold recess 172 is provided at a position separated from the flow rate detection unit 22 to the mold base end surface 55b. In this case, the flow rate detection unit 22 is provided between the mold recesses 171 and 172 in the height direction Y. Both the mold recesses 171 and 172 extend in the depth direction Z along the peripheral edge of the flow rate detection unit 22.

The tip side mold recess 171 is separated from the front mold groove 88 toward the mold tip surface 55a side, and the base end side mold recess 172 is separated from the front mold groove 88 toward the mold base end surface 55b side. In this case, the front mold groove 88 is provided between the mold recesses 171 and 172 in the height direction Y. The mold recesses 171 and 172 are provided in the front cover unit 84 and extend in parallel with the front mold groove 88.

Of the mold recesses 171 to 174, the upstream mold recess 173 is provided at a position separated from the flow rate detection unit 22 on the mold upstream surface 55c side, and the downstream mold recess 174 is located at a position separated from the flow rate detection unit 22 on the mold downstream surface 55d side. In this case, the flow rate detection unit 22 is provided between the mold recesses 173 and 174 in the depth direction Z. The mold recesses 173 and 174 extend in the height direction Y along the peripheral edge of the flow rate detection unit 22, and are orthogonal to the mold recesses 171 and 172 and the front mold groove 88.

The mold recesses 173 and 174 are all provided in the front mold groove 88. The bottom surface 88a and the inner wall surface 88b of the front mold groove 88 are included in the surface 55e of the mold unit 55, and the openings of the mold recesses 173 and 174 are provided in the bottom surface 88a. The mold recesses 173 and 174 are in a state of being bridged over a pair of inner wall surfaces 88b in the height direction Y.

As shown in FIG. 25, in the height direction Y, the separation distance H11 of the mold recesses 171 and 172 is larger than any one of the length dimension H12 of the flow rate detection unit 22 or the maximum value H13 of the separation distance between the pair of inner wall surfaces 88b. In the depth direction Z, the length dimension of the tip side mold recess 171 and the length dimension of the base end side mold recess 172 are the same length dimension W11. The length dimension W11 is smaller than the separation distance W12 of the mold recesses 173 and 174, and is larger than the width dimension W3 of the flow rate detection unit 22. The depth direction Z corresponds to the specific direction, and the width dimension W3 corresponds to the length dimension of the physical quantity detection unit.

In the height direction Y, the length dimension of the upstream mold recess 173 and the length dimension of the downstream mold recess 174 are the same length dimension H14. The length dimension H14 is the same as the length dimension of the front extension region 22X in the height direction Y. Further, the length dimension H14 is smaller than the length dimension H12 of the flow rate detection unit 22 and the separation distance H11 of the mold recesses 171 and 172.

As shown in FIGS. 8, 9, 26, and 27, the mold recesses 171 to 174 have a rectangular cross section and have bottom surfaces 171a to 174a extending in the orthogonal direction. The bottom surfaces 171a to 174a are all provided side by side on the flow rate detection unit 22 in the orthogonal direction. The tip end side mold recess 171 and the base end side mold recess 172 are arranged side by side with the flow rate detection unit 22 in the height direction Y, and the bottom surfaces 171a and 172a of these mold recesses 171 and 172 are arranged between the detection frame 61 and the surfaces 55e in the width direction X. The upstream mold recess 173 and the downstream mold recess 174 are arranged side by side with the flow rate detection unit 22 in the depth direction Z, and the bottom surfaces 173a and 174a of these mold recesses 173 and 174 are arranged between the bottom surface 88a and the detection frame 61 in the width direction X. As described above, the bottom surfaces 171a to 174a of the mold recesses 171 to 174 are arranged between the front surface 22a and the back surface 22b of the flow rate detection unit 22 in the width direction X.

The flow rate processor 54 has a front surface 54a facing the front surface 55e side of the mold unit 55 and a back surface 54b opposite to the front surface 54a. The mold recesses 171 to 174 are provided at positions separated from the flow rate processor 54 in addition to the flow rate detection unit 22 in the height direction Y and the depth direction Z. Further, the bottom surfaces 171a to 174a of the mold recesses 171 to 174 are arranged between the front surface 54a and the back surface 54b of the flow rate processor 54 in the width direction X.

The detection frame 61 supports the flow rate detection unit 22 in a state of being mounted on the surface 61a as a plate surface, and corresponds to the detection support unit. The detection frame 61 has a mounting unit 61c on which the flow rate detection unit 22 is mounted, and a mounting extension unit 61d extending in the orthogonal direction from the mounting unit 61c. The mounting unit 61c faces the flow rate detection unit 22 in the width direction X, and is a portion of the detection frame 61 that overlaps the flow rate detection unit 22 in the width direction X. The mounting extension portion 61d is a portion of the detection frame 61 that protrudes from the peripheral edge portion of the flow rate detection unit 22 in the height direction Y or the depth direction Z. The mounting extension unit 61d corresponds to the extension portion.

The mold recesses 171 to 174 are provided at positions facing the mounting extension portion 61d in the width direction X, and are separated from the detection frame 61 toward the surface 55e. In this case, the mold recesses 171 to 174 are arranged between the peripheral edge of the detection frame 61 and the flow rate detection unit 22 in the height direction Y and the depth direction Z.

Figure 26:
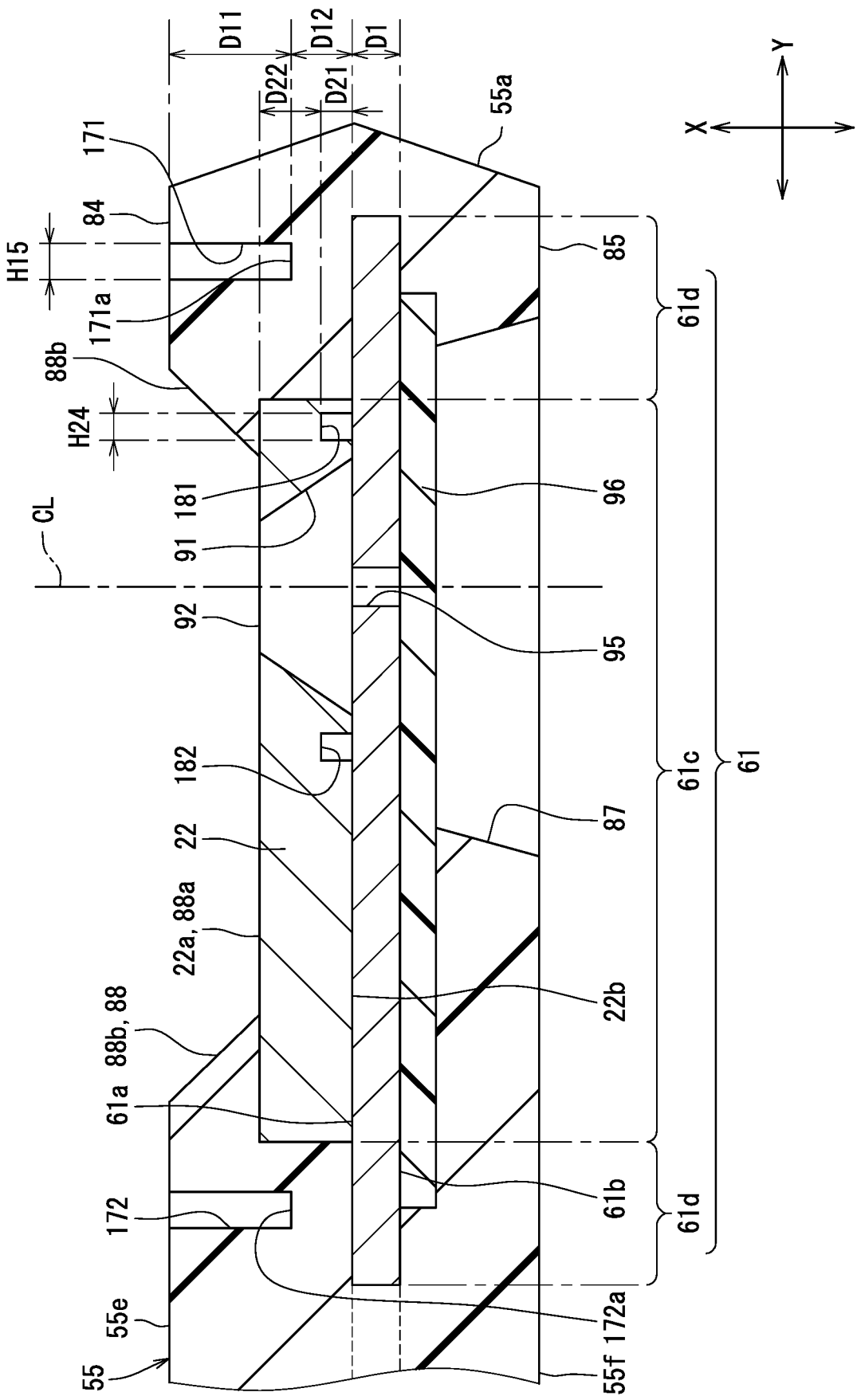
FIG. 26 is an enlarged view of the vicinity of the flow rate detection unit in FIG. 8.

As shown in FIG. 26, in the width direction X, the depth dimension of the tip end side mold recess 171 and the depth dimension of the proximal end side mold recess 172 are the same depth dimension D11. This depth dimension D11 is larger than the separation distance D12 between the mold recesses 171 and 172 and the mounting extension portion 61d. The separation distance D12 is larger than the thickness dimension D1 of the detection frame 61.

In the height direction Y, the width dimension of the tip end side mold recess 171 and the width dimension of the proximal end side mold recess 172 are the same width dimension H15. This width dimension H15 is smaller than the separation distance D12. Further, the width dimension H15 is smaller than the separation distance between the mold recesses 171 and 172 and the flow rate detection unit 22 and the separation distance between the mold recesses 171 and 172 and the front mold groove 88 in the height direction Y.

Figure 27:
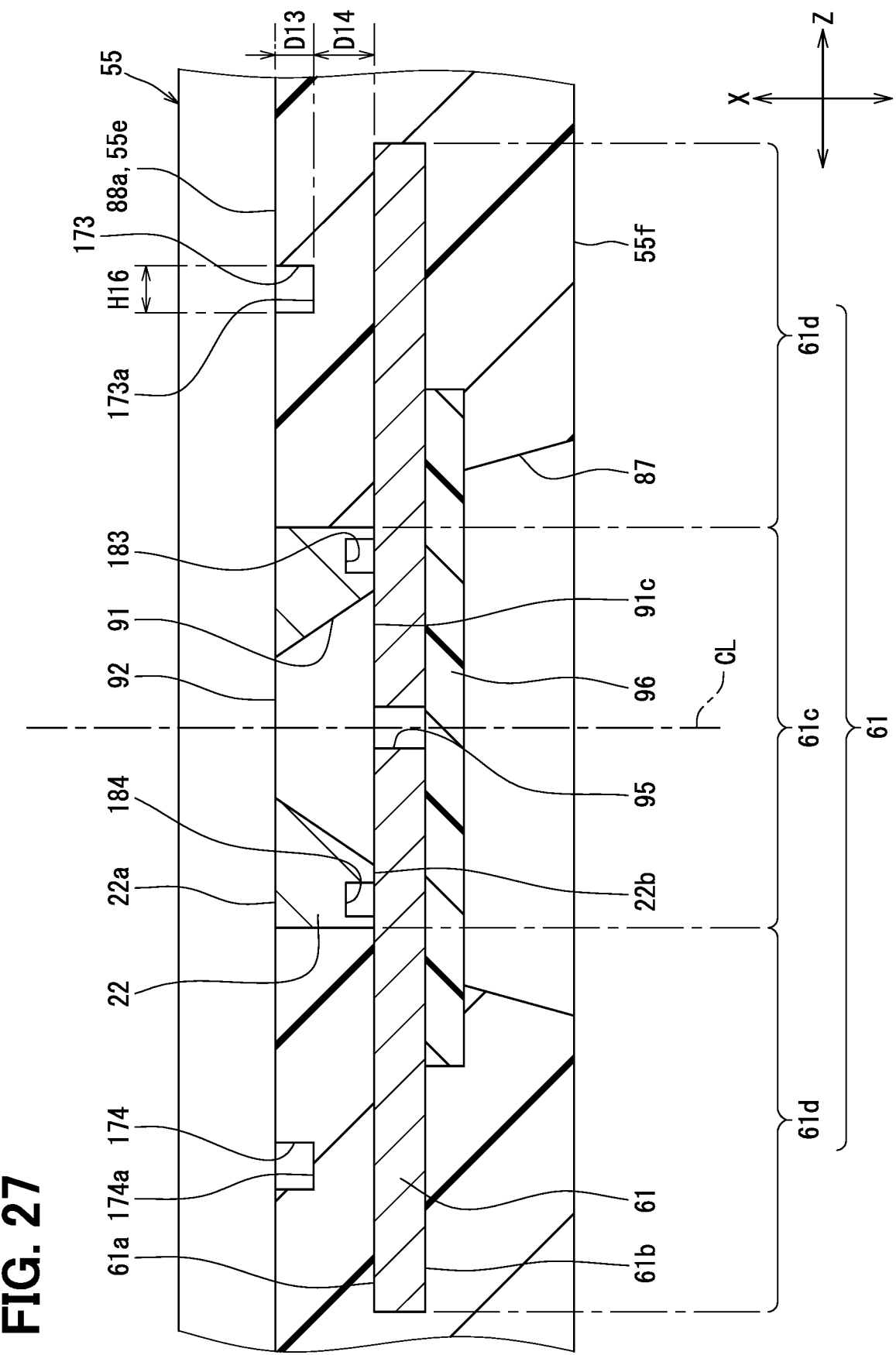
FIG. 27 is an enlarged view of the vicinity of the flow rate detection unit in FIG. 9.

As shown in FIG. 27, in the width direction X, the depth dimension of the upstream mold recess 173 and the depth dimension of the downstream mold recess 174 are the same depth dimension D13. The depth dimension D13 is smaller than the separation distance D14 between the mold recesses 173 and 174 and the mounting extension unit 61d and the depth dimension D11 of the mold recesses 171 and 172. Further, the separation distance D14 is larger than the thickness dimension D1 of the detection frame 61, and is the same as the separation distance D12 between the mold recesses 171 and 172 and the mounting extension unit 61d.

In the height direction Y, the width dimension of the upstream mold recess 173 and the width dimension of the downstream mold recess 174 are the same width dimension H16. This width dimension H16 is smaller than the separation distance D14. Further, the width dimension H16 is smaller than the separation distance between the mold recesses 173 and 174 and the flow rate detection unit 22 and the width dimension H15 of the mold recesses 171 and 172 in the height direction Y.

Figure 28:
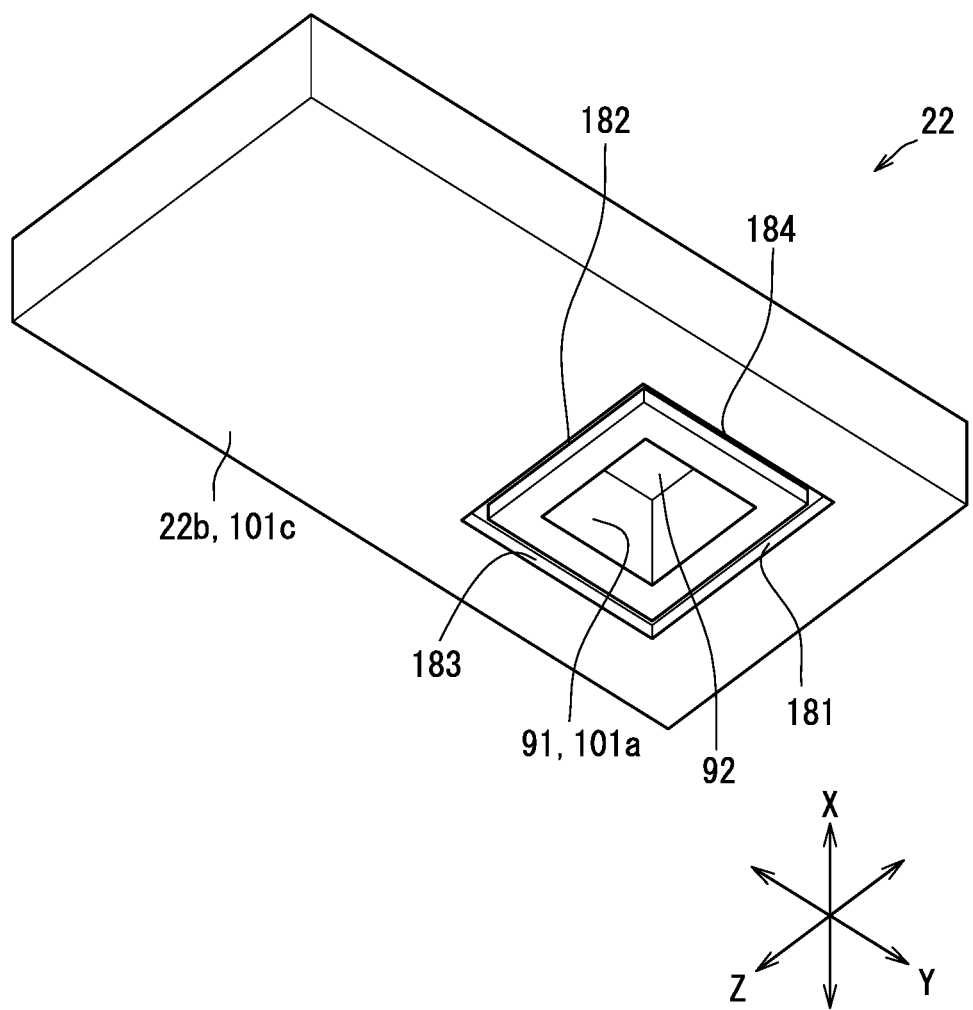
FIG. 28 is a perspective view of the flow rate detection unit as viewed from the back side.
Figure 29:
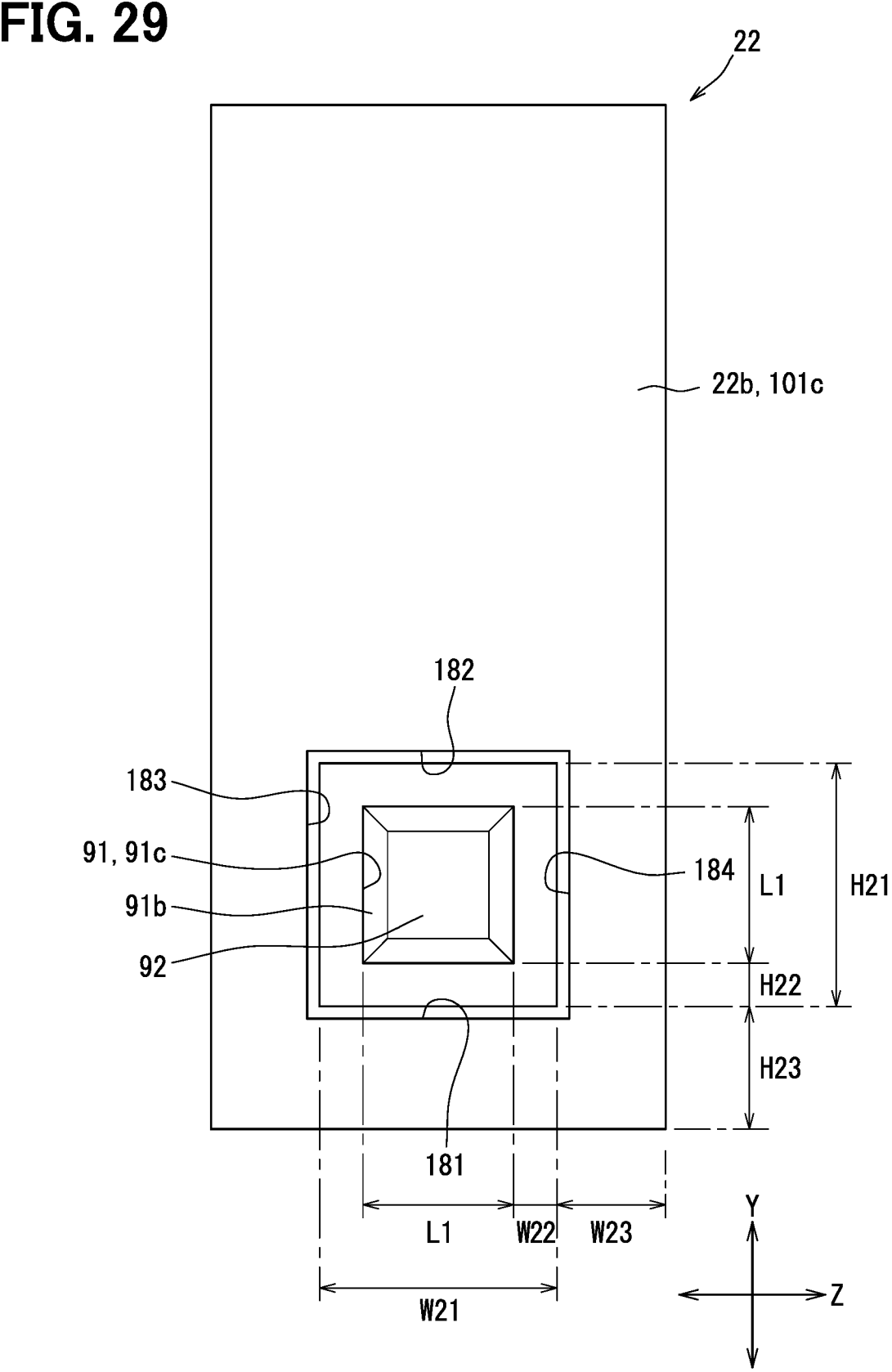
FIG. 29 is a plan view of the flow rate detection unit as viewed from the back side.

In the present embodiment, as shown in FIGS. 10, 28, and 29, the base material recesses 181 to 184 are provided in the detection base material 101 of the flow rate detection unit 22. The outer surface of the detection base material 101 has a front surface 101b which is a surface on the membrane portion 92 side and a back surface 101c on the side opposite to the surface 101b in the width direction X. The base material recesses 181 to 184 are recesses provided on the back surface 101c of the outer surface of the detection base material 101, and are recessed toward the surface 101b in the detection base material 101. The base material recesses 181 to 184 are stress reducing portions that reduce the stress applied from the detection base material 101 to the membrane unit 92 as the detection base material 101 is deformed. The reduction of stress by the base material recesses 181 to 184 also relieves the stress transmitted from the detection base material 101 to the membrane unit 92 toward the base material recesses 181, and the base material recesses 181 to 184 can also be referred to as stress relief portions.

The back surface 101c of the detection base material 101 faces the mounting unit 61c of the detection frame 61 and corresponds to the facing surface. The base material recesses 181 to 184 face the mounting unit 61c of the detection frame 61 in the width direction X, and are covered by the mounting unit 61c. The detection base material 101 supports the resistors 121, 122, 131 to 134 by supporting the membrane unit 92, and corresponds to the base portion. Further, the base material recesses 181 to 184 correspond to the base recesses, the front surface 22a of the flow rate detection unit 22 corresponds to the first plate surface, the back surface 22b corresponds to the second plate surface, and the detection recesses 91 correspond to the plate surface recesses.

The base material recesses 181 to 184 have a depth because they extend from the back surface 101c toward the front surface 101b, and the width direction X is the depth direction of the base material recesses 181 to 184. When the direction in which the front surface 101b and the back surface 101c are aligned is referred to as the thickness direction of the detection base material 101, the width direction X is the thickness direction. The base material recesses 181 to 184 are provided at positions separated in the orthogonal direction from the base material hole 101a for forming the detection recess 91. The base material recesses 181 to 184 all extend in a groove shape along the peripheral edge of the detection recess 91, and are connected to each other to form one continuous rectangular frame-shaped groove. Further, the base material recesses 181 to 184 extend along the peripheral edge of the detection base material 101. That is, the base material recesses 181 to 184 extend along the long side and the short side of the back surface 101c.

As shown in FIG. 8, of the base material recesses 181 to 184, the tip side base material recess 181 is provided at a position separated from the detection recess 91 toward the mold tip surface 55a side, and the base end side base material recess 182 is provided at a position separated from the detection recess 91 on the mold base end surface 55b side. In this case, the detection recess 91 is provided between the base material recesses 181, 182 in the height direction Y. The base material recesses 181, 182 all extend in the depth direction Z along the peripheral edge of the detection recess 91.

As shown in FIG. 9, of the base material recesses 181 to 184, the upstream base material recess 183 is provided at a position separated from the detection recess 91 toward the mold upstream surface 55c side, and the downstream base material recess 184 is provided at a position separated from the detection recess 91 on the mold downstream surface 55d side. In this case, the detection recess 91 is provided between the base material recesses 183 and 184 in the depth direction Z. The base material recesses 183 and 184 all extend in the height direction Y along the peripheral edge of the detection recess 91 and are orthogonal to the base material recesses 181 and 182.

As shown in FIG. 29, in the height direction Y, the separation distance H21 of the base material recesses 181 and 182 is larger than the opening dimension L1 of the concave opening 91c. Further, in the height direction Y, the separation distance between the tip end side base material recess 181 and the detection recess 91 and the separation distance between the base end side base material recess 182 and the detection recess 91 are the same separation distance H22. The separation distance H22 is smaller than the separation distance H23 between the base material recesses 181 and 182 and the short side of the back surface 101c in the height direction Y. The detection recess 91 is arranged at a position closer to the other one of the pair of short sides of the back surface 101c than one of the pair of short sides.

In the depth direction Z, the separation distance W21 of the base material recesses 183 and 184 is larger than the opening dimension L1 of the concave opening 91c. Further, in the depth direction Z, the separation distance between the upstream base material recess 183 and the detection recess 91 and the separation distance between the downstream base material recess 184 and the detection recess 91 are the same separation distance W22. The separation distance W22 is smaller than the separation distance W23 between the base material recesses 183 and 184 and the long side of the back surface 101c in the depth direction Z. The detection recess 91 is arranged at an intermediate position between the pair of long sides of the back surface 101c.

As shown in FIGS. 10, 26, and 27, the base material recesses 181 to 184 are provided at positions separated from the front surface 22a to the back surface 22b side in the flow rate detection unit 22. The base material recesses 181 to 184 have a rectangular cross section, and each has a bottom surface extending in the orthogonal direction. In the width direction X, the depth dimensions of the base material recesses 181 to 184 are the same depth dimensions D21. The depth dimension D21 is smaller than the thickness dimension D2 of the flow rate detection unit 22, the thickness dimension D3 of the detection base material 101, and a half of the thickness dimension D3. In this case, the depth dimension D21 is smaller than the separation distance D22 between the base material recesses 181, 182 and the surface 22a. The width dimensions of the base material recesses 181 to 184 are the same width dimensions H24. The width dimension H24 is substantially the same as the depth dimension D21 of the base material recesses 181 to 184.

In the manufacturing process of the sensor SA 50, the base material recesses 181 to 184 are formed in the process of manufacturing the flow rate detection unit 22. In this step, the base material recesses 181 to 184 are formed in the detection base material 101 by dry etching. Then, the flow rate detection unit 22 is mounted on the detection frame 61 so that the base material recesses 181 to 184 are covered by the detection frame 61. The base material recesses 181 to 184 may be formed in the detection base material 101 by wet etching. Here, when the wet etching process is performed, the inner wall surface of the base material recesses 181 to 184 is inclined by a predetermined inclination angle (for example, 54.7 degrees) with respect to the center line CL.

Further, in the manufacturing process of the sensor SA 50, the mold recesses 171 to 174 are formed in the molding process of the mold unit 55. As shown in FIGS. 23 and 24, the mold device 160 has concave molding units 191 to 194 for molding mold recesses 171 to 174 in the mold unit 55. The concave molding units 191 to 194 are provided in the surface mold unit 161 and are rectangular protrusions in which the bottom surface of the surface mold recess 161*a* protrudes so as to swell.

As shown in FIG. 23, the first concave molding unit 191 for molding the tip end side mold recess 171 and the second concave molding unit 192 for molding the base end side mold recess 172 are aligned in the height direction Y, and any of them is also provided at a position deviated from the groove molding unit 162 in the height direction Y. In this case, a groove molding unit 162 is provided between these concave molding units 191 and 192. As shown in FIG. 24, the third concave molding unit 193 for molding the upstream mold recess 173 and the fourth concave molding unit 194 for molding the downstream mold recess 174 protrude from the groove molding unit 162 and are arranged at a position shifted from the avoidance recess 163 in the depth direction Z. In this case, the avoidance recess 163 is provided between the concave molding units 193 and 194 in the depth direction Z.

In the molding process of the mold unit 55, after the molten resin is injected into the internal space of the mold device 160, the molten resin is cured to form mold recesses 171 to 174 in the mold unit 55.

According to the present embodiment described so far, since the mold recesses 171 to 174 are provided on the surface 55*e* of the mold portion 55, the mold recesses 171 to 174 are easily deformed when the mold unit 55 is deformed due to a temperature change or the like. Here, the deformation of the peripheral portion of the mold recesses 171 to 174 including the mold recesses 171 to 174 in the mold portion 55 is referred to as the deformation of the mold recesses 171 to 174. In this case, the stress generated by the deformation of the mold unit 55 is used for the deformation of the mold recesses 171 to 174, so that the stress applied to the flow rate detection unit 22 is easily reduced. In other words, since the stress generated in the mold unit 55 relieves from the mold recesses 171 to 174, it is possible to avoid that the relieved stress is used for deformation of the flow rate detection unit 22. Therefore, even when the coefficient of linear expansion differs between the mold unit 55 and the detection base material 101 of the flow rate detection unit 22, it is possible to prevent the flow rate detection unit 22 from being deformed due to the deformation of the mold unit 55.

Here, in the mold unit 55, the peripheral portion of the mold recesses 171 to 174 may become a fragile portion in which the strength of the mold unit 55 is lowered and easily deformed because the thickness dimension and the cross-sectional area are reduced by the amount of the mold recesses 171 to 174. Different from the present embodiment, for example, in a configuration in which the mold recesses 171 to 174 and the flow rate detection unit 22 are arranged in the width direction X, the flow rate detection unit 22 is arranged in the fragile portion of the mold unit 55. On the other hand, in the present embodiment, the mold recesses 171 to 174 are provided at positions separated from the flow rate detection unit 22 in the height direction Y and the depth direction Z. In this configuration, in the mold portion 55, since the flow rate detection unit 22 is arranged at a position separated from the fragile portion generated by the mold recesses 171 to 174, a configuration is realized such that the fragile portion is easily deformed in an independent state from the flow rate detection unit 22.

As described above, by positively deforming the mold recesses 171 to 174 in the mold unit 55, it is possible to realize a configuration in which the flow rate detection unit 22, the membrane unit 92, and the resistors 121, 122, 131 to 134 are not easily deformed. In this configuration, since the resistors 121, 122, 131 to 134 are not easily deformed, it is unlikely that the resistance values of these resistors 121, 122, 131 to 134 are unintentionally changed. Therefore, the operation accuracy of the flow rate detection circuit 110 and the detection accuracy of the flow rate detection unit 22 are unlikely to decrease. As described above, even if the mold unit 55 is deformed, the reduction of the detection accuracy of the flow rate detection unit 22 is suppressed by the mold recesses 171 to 174, so that the measurement accuracy of the air flow meter 20 can be improved.

According to the present embodiment, the mold recesses 171 to 174 are provided on the surface 55*e* of the mold unit 55 together with the membrane unit 92 of the flow rate detection unit 22. In this configuration, the mold recesses 171 to 174 are disposed at positions shifted from the resistors 121, 122, 131 to 134 of the membrane unit 92 in the height direction Y and the depth direction Z, while the mold recesses 171 to 174 are disposed at positions near the resistors 121, 122, 131 to 122, 131-134 as close as possible. Therefore, in the mold unit 55, a possibility for deforming the portion between the mold recesses 171 to 174 and the membrane unit 92, and for deforming the membrane unit 92 and the resistors 121, 122, 131 to 134 in accordance with the deformation of the portion is reduced.

Further, since the mold unit 55 has a plate shape as a whole, the surface 55*e* has an area larger than the mold tip surface 55*a*, the mold base end surface 55*b*, the mold upstream surface 55*c*, and the mold downstream surface 55*d*. Therefore, for example, the degree of freedom in the installation position of the mold recesses 171 to 174 is increased as compared with the configuration in which the mold recesses 171 to 174 are provided on the mold tip surface 55*a*, the mold base end surface 55*b*, the mold upstream surface 55*c*, and the mold downstream surface 55*d*.

According to the present embodiment, in the width direction X, the bottom surfaces 171*a* to 174*a* of the mold recesses 171 to 174 are provided between the front surface 22*a* and the back surface 22*b* of the flow rate detection unit 22. As a result, the depth dimensions D11 and D13 of the mold recesses 171 to 174 can be set to appropriate values without being too large or too small. Therefore, it is possible to suppress both the stress being transmitted to the flow rate detection unit 22 due to the deformation of the mold unit 55 and the insufficient strength of the mold unit 55.

According to the present embodiment, the mold recesses 171 to 174 are groove portions extending along the peripheral edge portion of the flow rate detection unit 22. Therefore, the stress generated by the deformation of the mold unit 55 can be suppressed from being transmitted to the flow rate detection unit 22 by the groove-shaped mold recesses 171 to 174 in a wide range as much as possible.

According to the present embodiment, the length dimension W11 of the mold recesses 171 and 172 is larger than the width dimension W3 of the flow rate detection unit 22 in the depth direction Z. In this configuration, the stress generated by the deformation of the mold unit 55 can be reliably suppressed by the mold recesses 171 to 174 from being transmitted in the depth direction Z and being transmitted to the flow rate detection unit 22.

According to the present embodiment, the mold recesses 171 to 174 face the mounting extension unit 61*d* of the detection frame 61 in the width direction X. In this configuration, even if the peripheral portions of the mold recesses 171 to 174 in the mold unit 55 are fragile portions, the fragile portions are reinforced by the mounting extension unit 61*d*. Therefore, in the sensor SA 50, the insufficient strength of the peripheral portions of the mold recesses 171 to 174 can be improved by the mounting extension unit 61d.

According to the present embodiment, the mold recesses 171 to 174 are provided at positions separated from the flow rate processor 54 in the height direction Y and the depth direction Z. In this configuration, in the mold portion 55, since the flow rate processor 54 is arranged at a position away from the fragile portions around the mold recesses 171 to 174, the fragile portion is positively independent from the flow rate processor 54, so that a positively deformable configuration can be realized. In this way, by positively deforming the mold recesses 171 to 174 in the mold unit 55, it is possible to realize a configuration in which the flow rate processor 54 is not easily deformed. Therefore, it is possible to restrict the reduction of the operation accuracy of the flow rate processor 54 caused by the deformation of the flow rate processor 54 due to the stress applied from the mold unit 55 to the flow rate processor 54 according to the deformation of the mold unit 55. Therefore, the operation accuracy of the flow rate processor 54 can be improved, and as a result, the measurement accuracy of the air flow meter 20 can be improved.

According to the present embodiment, since the base material recesses 181 to 184 are provided on the back surface 101c of the detection base material 101 of the flow rate detection unit 22, the base material recesses 181 to 184 are easily deformed when the flow rate detection unit 22 is deformed due to the deformation of the mold unit 55. Here, the deformation of the peripheral portion of the base material recesses 181 to 184 including the base material recesses 181 to 184 in the detection base material 101 is referred to as the deformation of the base material recesses 181 to 184. In this case, the stress generated by the deformation of the detection base material 101 is used for the deformation of the base material recesses 181 to 184, so that the stress applied to the membrane unit 92 and the resistors 121, 122, 131 to 134 can be easily reduced. In other words, the stress generated in the detection base material 101 is relieved from the base material recesses 181 to 184 to avoid the relief stress from being used for deformation of the membrane unit 92 and the resistors 121, 122, 131 to 134. Therefore, even if the coefficient of linear expansion differs between the detection base material 101 and the membrane unit 92, it is possible to suppress the deformation of the resistors 121, 122, 131 to 134 due to the deformation of the detection base material 101.

Here, in the detection base material 101, the peripheral portion of the base material recesses 181 to 184 may be the fragile portion that is easily deformed due to a decrease of reduction of the strength of the detection base material 101 since the thickness dimension and the cross-sectional area of the detection base material 101 are decreased by the thickness of the base material recesses 181 to 184. Different from the present embodiment, for example, in a configuration in which the base material recesses 181 to 184 and the membrane unit 92 are arranged in the width direction X, the membrane unit 92 is arranged in the fragile portion of the detection base material 101. Therefore, it is assumed that the membrane unit 92 may be unintentionally deformed as the base material recesses 181 to 184 are deformed. On the other hand, in the present embodiment, the base material recesses 181 to 184 are provided at positions separated from the membrane unit 92 and the resistors 121, 122, 131 to 134 in the height direction Y and the depth direction Z. In this configuration, in the detection base material 101, the membrane unit 92 and the resistors 121, 122, 131 to 134 are arranged at positions separated from the fragile portion generated by the base material recesses 181 to 184. Therefore, it is possible to realize a configuration in which the fragile portion is positively deformed in a state of being independent from the membrane portion 92 and the resistors 121, 122, 131 to 134.

As described above, by positively deforming the base material recesses 181 to 184 in the detection base material 101, it is possible to realize a configuration in which the membrane unit 92 and the resistors 121, 122, 131 to 134 are not easily deformed. In this case, since it is unlikely that the resistance values of the resistors 121, 122, 131 to 134 change unintentionally, the measurement accuracy of the air flow meter 20 can be improved as described above.

According to this embodiment, the base material recesses 181 to 184 are closed by the detection frame 61 on which the detection base material 101 is mounted. Therefore, it is possible to prevent the molten resin from flowing into the base material recesses 181 to 184 when the mold unit 55 is molded.

According to the present embodiment, the base material recesses 181 to 184 are groove portions extending along the peripheral edge portion of the detection base material 101. Therefore, the stress generated by the deformation of the detection base material 101 can be suppressed from being transmitted to the resistors 121, 122, 131 to 134 by the groove-shaped base material recesses 181 to 184 in a wide range as much as possible.

According to the present embodiment, in the flow rate detection unit 22, base material recesses 181 to 184 are provided on the back surface 22b together with the detection recess 91. In this configuration, different from the configuration in which the base material recesses 181 to 184 are provided on the surface 22a together with the membrane unit 92, it is possible to avoid that the air flow reaching the membrane unit 92 is disturbed by the base material recesses 181 to 184. In a configuration in which both the base material recesses 181 to 184 and the membrane unit 92 are provided on the surface 22a of the flow rate detection unit 22, it is considered that the separation distance between the base material recesses 181 to 184 and the membrane unit 92 may be insufficient. In this case, there is a concern that the turbulent airflow in the base material recesses 181 to 184 reaches the membrane unit 92 in a turbulent state, and the operation accuracy of the resistors 121, 122, 131 to 134 in the membrane unit 92 deteriorates. On the other hand, in the present embodiment, as described above, the flow of air reaching the membrane unit 92 is not disturbed by the base material recesses 181 to 184, so that the operation accuracy of the resistors 121, 122, 131 to 134 can be enhanced.

Further, since the detection base material 101 has a plate shape, the area of the back surface 101c is larger than the area of each peripheral end surface of the detection base material 101. Therefore, for example, the degree of freedom in the installation position of the base material recesses 181 to 184 can be increased as compared with the configuration in which the base material recesses 181 to 184 are provided on the peripheral end surface of the detection base material 101.

Second Embodiment

In the second embodiment, a surface forming portion for forming a continuous surface on the outer surface of the mold unit 55 is provided inside the mold recesses 171 to 174. In the present embodiment, differences from the first embodiment will be mainly described.

Figure 30:
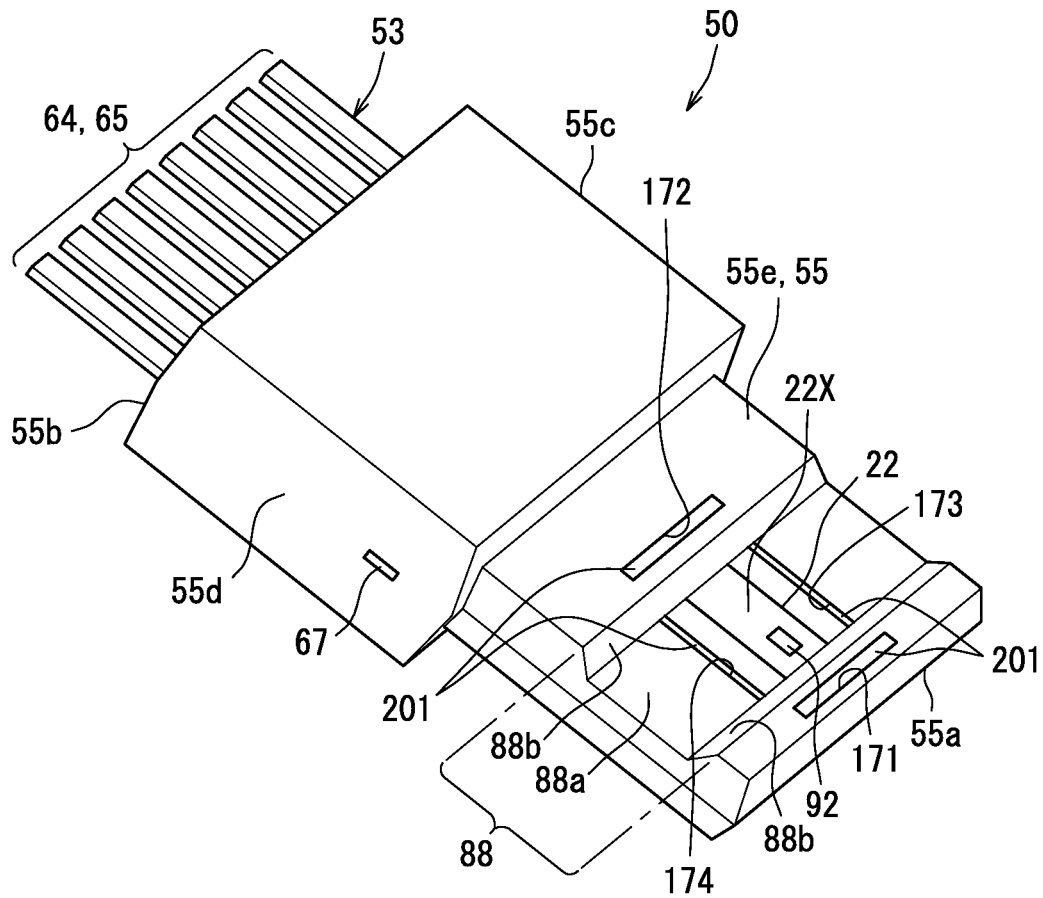
FIG. 30 is a perspective view of the sensor SA in the second embodiment as viewed from the front side.
Figure 31:
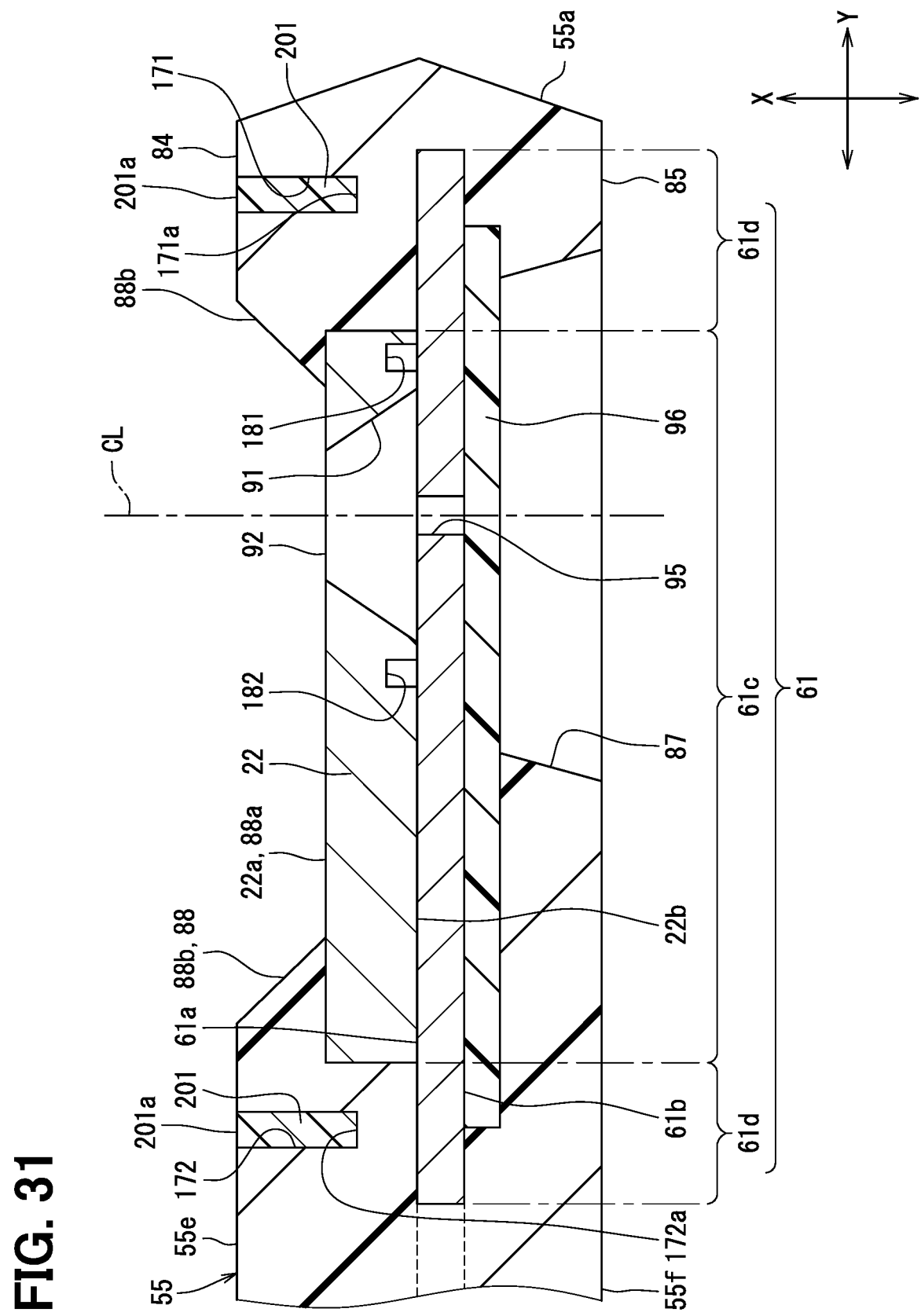
FIG. 31 is a cross-sectional view of the periphery of the flow rate detection unit in the sensor SA.
Figure 32:
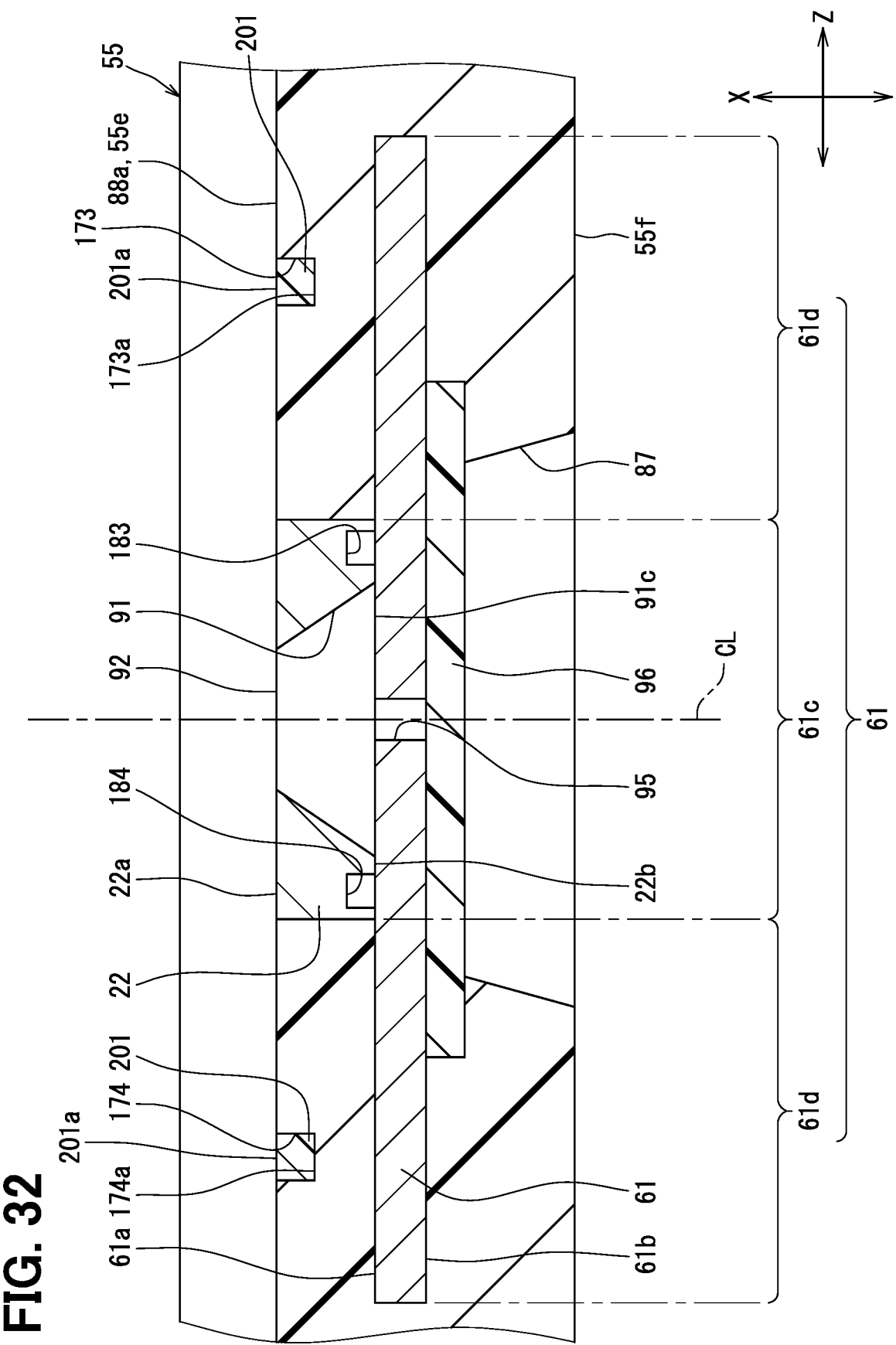
FIG. 32 is a cross-sectional view of the periphery of the flow rate detection unit in the sensor SA.

As shown in FIGS. 30 to 32, a buffer member 201 as a surface forming portion is provided inside the mold recesses 171 to 174. The buffer member 201 has flexibility and can be deformed according to the deformation of the mold portion 55. The buffer member 201 is made of a resin material or the like, and is softer than the mold unit 55. The buffer member 201 forms a continuous surface 201a continuous with the surface 55e of the mold unit 55 without any step. The continuous surface 201a and the surface 55e are disposed on the same plane. The mold recesses 171 to 174 are filled with the buffer member 201. The buffer member 201 is in close contact with the inner peripheral surfaces of the mold recesses 171 to 174 so as not to separate from the mold recesses 171 to 174. Inside the mold recesses 171 to 174, a space such as a gap may exist even when the buffer member 201 is provided.

According to this embodiment, the continuous surface 201a formed by the buffer members 201 provided inside the mold recesses 171 to 174 and the surface 55e of the mold unit 55 are disposed on the same plane. In this configuration, when the air flowing along the surface 55e passes through the mold recesses 171 to 174, the air easily flows along the continuous surface 201a, so that the air enters and exits the inside of the mold recesses 171 to 174. This can prevent the airflow from being disturbed. In this case, it is unlikely that the air flow reaching the membrane unit 92 is disturbed by the mold recesses 171 to 174. Therefore, the operating accuracy of the resistors 121, 122, 131 to 134 of the membrane unit 92 can be improved, and as a result, the detection accuracy of the flow rate detection unit 22 can be improved.

Third Embodiment

In the third embodiment, the processor mold recess 205 extending along the peripheral edge of the flow rate processor 54 is provided as the body recess in the mold unit 55. In the present embodiment, differences from the first embodiment will be mainly described.

Figure 33:
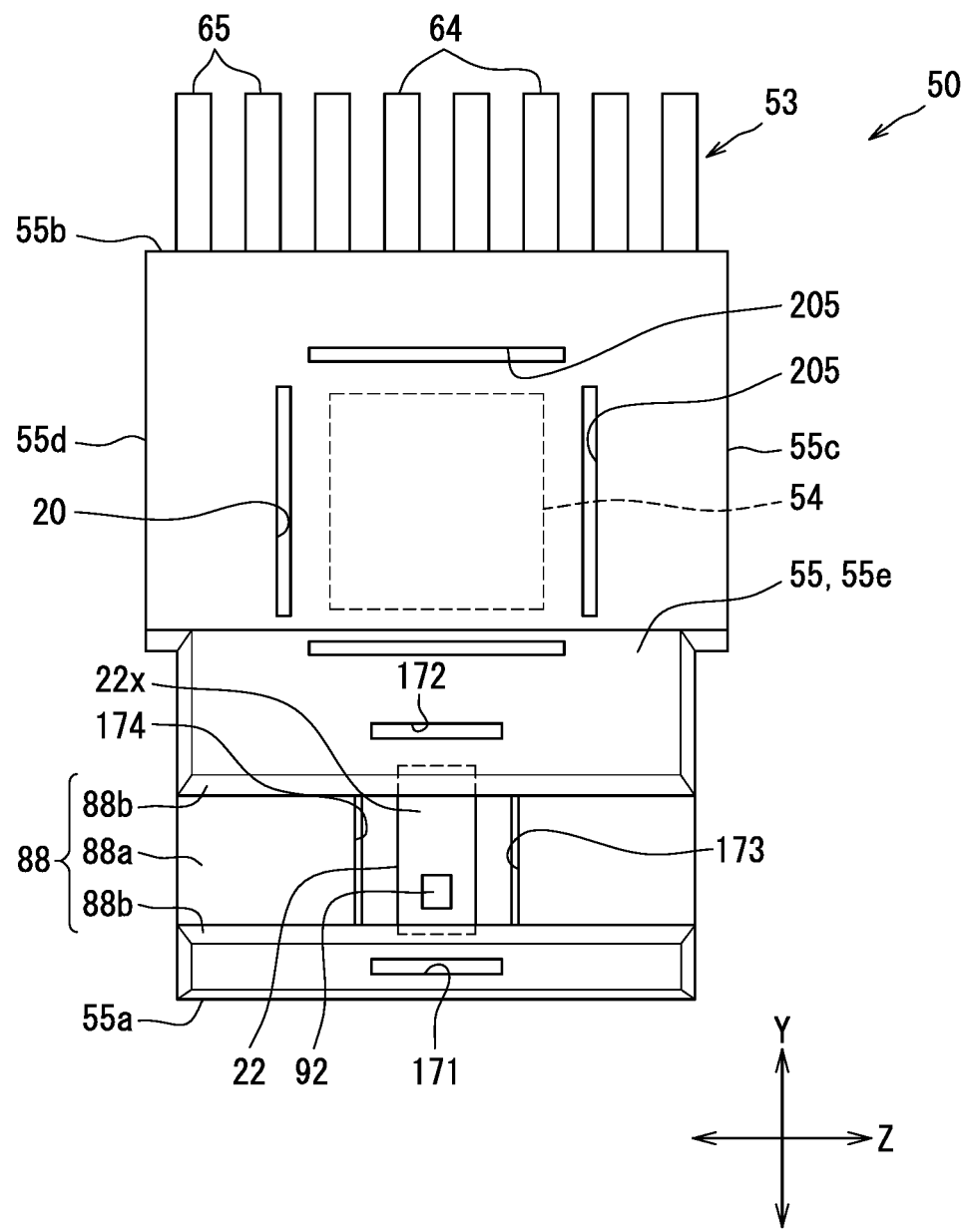
FIG. 33 is a perspective view of the sensor SA in the third embodiment as viewed from the front side.
Figure 34:
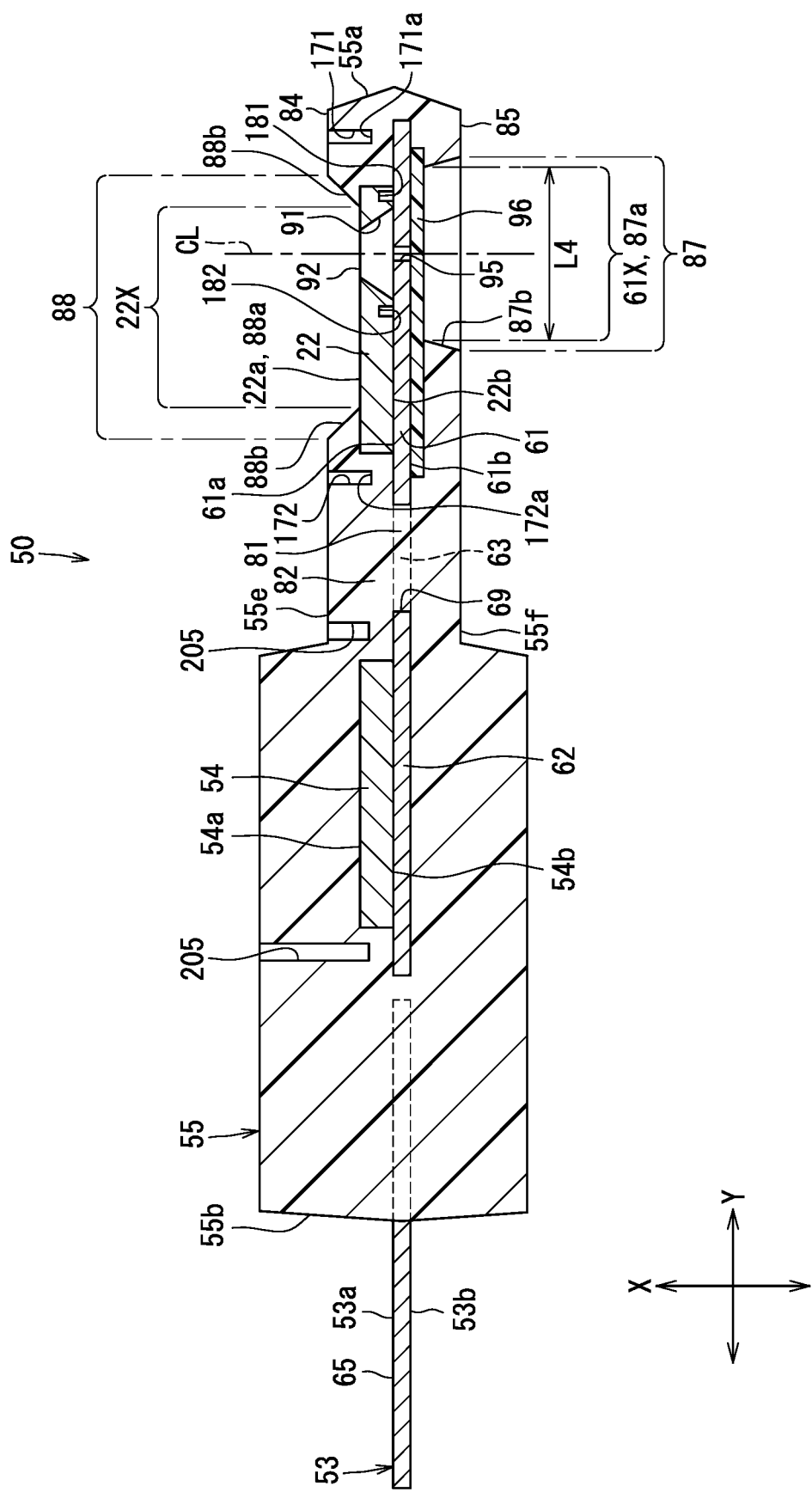
FIG. 34 is a vertical cross-sectional view of the sensor SA.

As shown in FIGS. 33 and 34, the mold unit 55 is provided with a processor mold recess 205 in addition to the mold recesses 171 to 174. In this case, the mold recesses 171 to 174 extending along the circumference of the flow rate detection unit 22 can also be referred to as a detection mold recess. A plurality of processor mold recesses 205 are provided so as to be separated from each other. The bottom surface of the processor mold recess 205 is provided between the front surface 54a and the back surface 54b of the flow rate processor 54 in the width direction X, similarly to the bottom surfaces 171a to 174a of the mold recesses 171 to 174. The processor mold recess 205 is arranged at a position closer to the flow rate processor 54 than the peripheral edge of the surface 55e of the mold portion 55 or the flow rate detection unit 22 in the height direction Y and the depth direction Z. The processor mold recess 205 is provided between the flow rate processor 54 and the flow rate detection unit 22, between the flow rate processor 54 and the mold base end surface 55b, between the flow rate processor 54 and the mold upstream surface 55c, and between the flow rate processor 54 and the mold downstream surface mold 55d, respectively.

According to the present embodiment, the processor mold recess 205 is provided at a position closer to the flow rate processor 54 than the flow rate detection unit 22. In this configuration, the stress generated by the deformation of the mold unit 55 is used for the deformation of the processor mold recess 205, so that the stress applied from the mold unit 55 to the flow rate processor 54 can be easily reduced. In other words, since the stress generated in the mold unit 55 relieves from the processor mold recess 205, it is possible to avoid that the relieved stress is used for deformation of the flow rate processor 54. Further, since the processor mold recess 205 is deformed with the deformation of the mold unit 55, not only the stress applied to the flow rate processor 54 but also the stress applied to the flow rate detection unit 22 can be reduced.

Fourth Embodiment

In the first embodiment, the cross-sectional area of the detection recess 91 gradually increases from the bottom surface 91a toward the concave opening 91c in the width direction X, but in the fourth embodiment, the cross-sectional area of the detection recess 91 is not gradually increasing toward the concave opening 91c. Specifically, the cross-sectional area of the detection recess 91 is made uniform in the width direction X. In the present embodiment, differences from the first embodiment will be mainly described.

Figure 35:
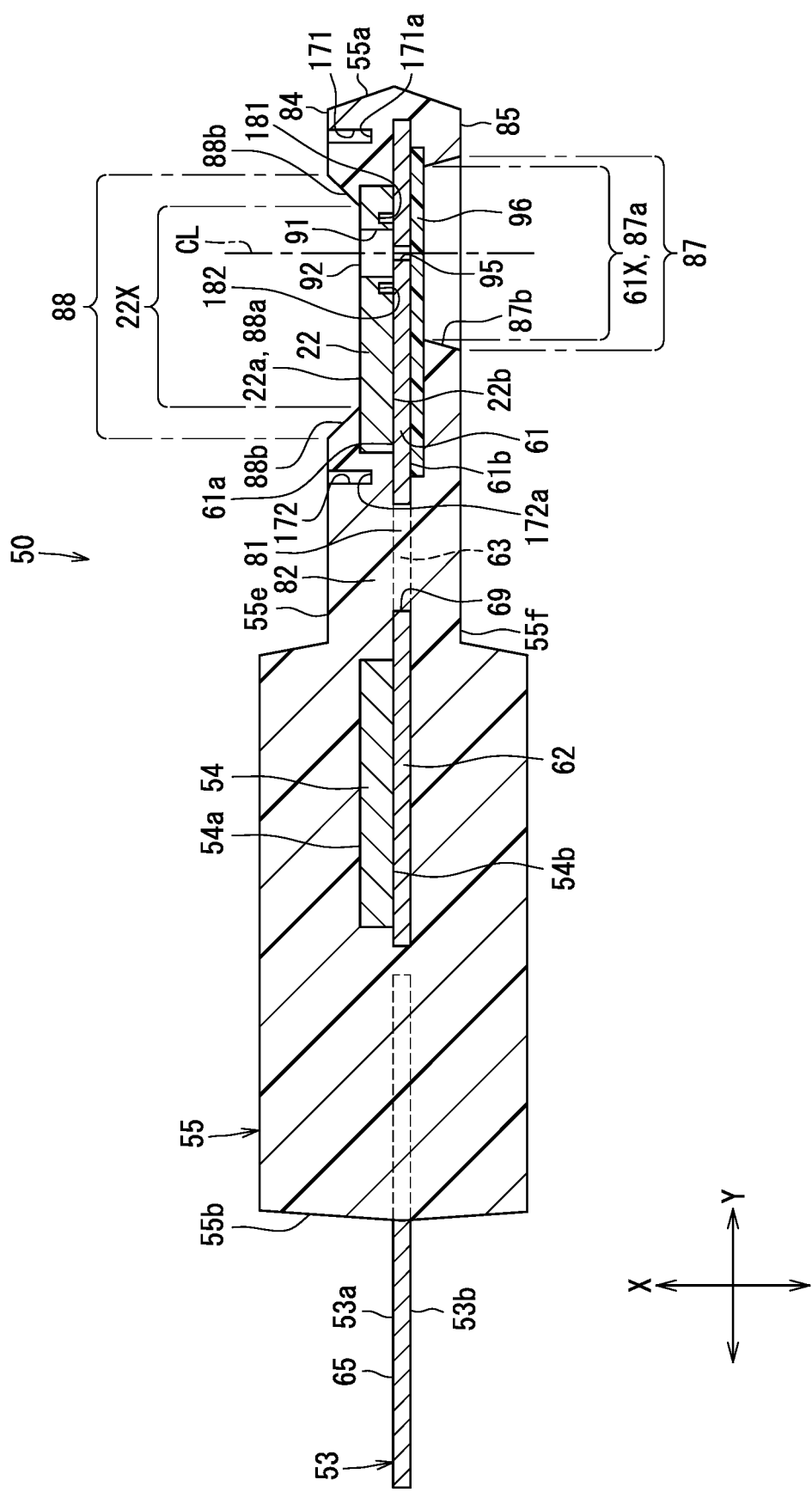
FIG. 35 is a vertical cross-sectional view of the sensor SA according to the fourth embodiment.

As shown in FIG. 35, the inner wall surface 91b of the detection recess 91 extends parallel to the center line CL from the bottom surface 91a toward the concave opening 91c. In the detection recess 91, the area of the bottom surface 91a and the open area of the concave opening 91c are the same because the cross-sectional area in the direction orthogonal to the center line CL is uniform in the width direction X. In the detection base material 101 of the flow rate detection unit 22, the thickness of the base material hole 101a forming the detection recess 91 is uniform in the width direction X. Even in this case, the front opening 95a of the detection frame hole 95 is separated inward from any of the concave openings 91c of the detection recess 91 and the peripheral edge of the bottom surface 91a.

In the present embodiment, in the flow rate detection unit 22, the base material hole 101a is formed by processing a part of the detection base material 101 by dry etching. That is, the detection recess 91 and the membrane unit 92 are formed by dry etching. In this case, in the detection recess 91, the concave opening 91c is not larger than the membrane unit 92. Even though the concave opening 91c is larger than the membrane unit 92, the concave opening 91c is only slightly larger than the membrane unit 92.

Fifth Embodiment

In the fifth embodiment, an intermediate plate is provided between the flow rate detection unit 22 or the flow rate processor 54 and the SA substrate 53. In the present embodiment, differences from the first embodiment will be mainly described.

Figure 36:
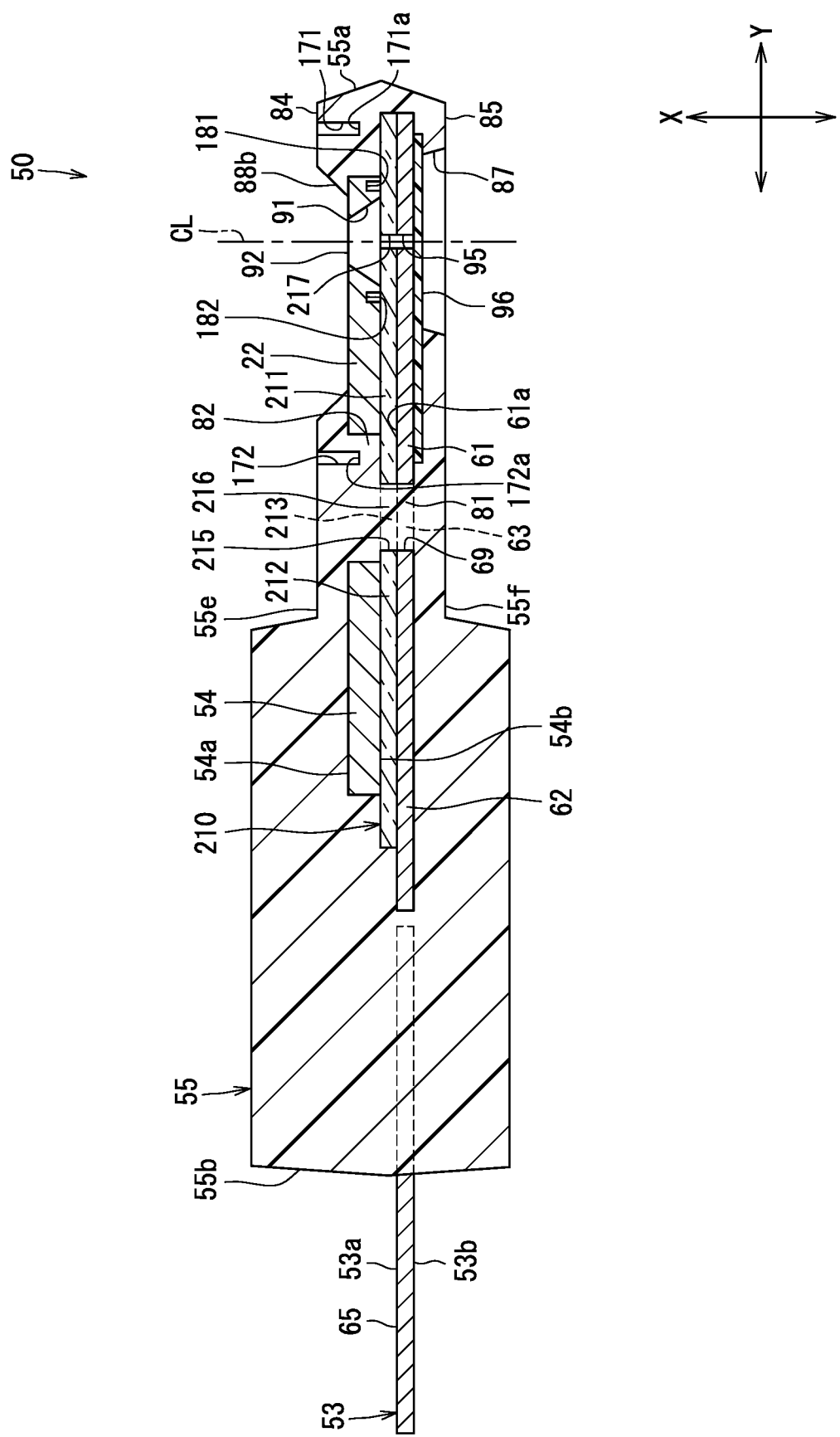
FIG. 36 is a vertical cross-sectional view of the sensor SA according to the fifth embodiment.

As shown in FIG. 36, the sensor SA 50 has an intermediate plate 210. The intermediate plate 210 is formed in a plate shape by a glass plate or the like, and has an insulating property. The intermediate plate 210 is attached to the SA substrate 53, and the back surface of the intermediate plate 210 is overlapped with the front surface 53a of the SA substrate 53. The intermediate plate 210 is in a state of bridging between the detection frame 61 and the processor frame 62 over the connection frame 63 and the substrate hole 69 in the height direction Y. The intermediate plate 210 has a detection plate unit 211 overlapped with the detection frame 61, a processor plate unit 212 overlapped with the processor frame 62, and a connection plate unit 213 overlapped with the connection frame 63.

In the intermediate plate 210, the flow rate detection unit 22 is attached to the surface of the detection plate unit 211, and the flow rate processor 54 is attached to the surface of the processor plate unit 212. In this case, the flow rate detection unit 22 is fixed to the detection frame 61 via the detection plate unit 211, and the flow rate processor 54 is fixed to the processor frame 62 via the processor plate unit 212.

In the present embodiment, unlike the first embodiment, the substrate hole 69 of the SA substrate 53 protrudes outside the flow rate detection unit 22 in the depth direction Z, while it does not protrude outside the flow rate processor 54. In this case, the width dimension W5 (see FIG. 7) of the substrate hole 69 in the depth direction Z is larger than the width dimension W3 (see FIG. 7) of the flow rate detection unit 22, while it is smaller than the width dimension W4 (see FIG. 7) of the flow rate processing unit 54. Even in this case, the frame restriction unit 81 is still provided between the detection frame 61 and the processor frame 62.

The intermediate plate 210 is provided with an intermediate plate hole 215 that communicates with the substrate hole 69. The intermediate plate hole 215 has the same size and shape as the substrate hole 69 in a plan view, and the peripheral edge portion of the intermediate plate hole 215 overlaps the peripheral edge portion of the substrate hole 69 in the width direction X. In this case, the width dimension of the intermediate plate hole 215 in the depth direction Z is the same as the width dimension W5 of the substrate hole 69. Further, a pair of connection plate units 213 are provided with an intermediate plate hole 215 interposed therebetween in the depth direction Z.

In addition to the frame restriction unit 81, the mold unit 55 has a plate restriction unit 216 that regulates heat transfer from the processor plate unit 212 to the detection plate unit 211. The plate restriction unit 216 is a portion of the mold portion 55 that enters the intermediate plate hole 215, and is in a state of being embedded inside the intermediate plate hole 215. Therefore, the plate restriction unit 216 has the same size and shape as the intermediate plate hole 215. The plate restriction unit 216 is arranged side by side with the connection plate portion 213 in the depth direction Z. In this case, the plate restriction unit 216 and the connection plate unit 213 are arranged side by side along the plate surface of the intermediate plate 210. Further, the plate restriction unit 216 is arranged between the frame restriction unit 81 and the direct restriction unit 82 in the width direction X.

In this embodiment, the SA substrate 53 and the intermediate plate 210 form a support plate portion. The detection frame 61 and the detection plate unit 211 form a detection support portion, the processor frame 62 and the processor plate unit 212 form a processor support portion, and the connection frame 63 and the connection plate unit 213 form a connection support portion. The frame restriction unit 81 and the plate restriction unit 216 constitute the heat transfer restriction unit.

The intermediate plate 210 has a detection plate hole 217 that penetrates the detection plate unit 211. The detection plate hole 217 is provided between the detection recess 91 and the detection frame hole 95 in the width direction X, and communicates the detection recess 91 with the detection frame hole 95. Therefore, the air that has passed through the filter unit 96 and reached the detection frame hole 95 will flow into the detection recess 91 by further passing through the detection plate hole 217. The detection plate hole 217 has the same shape and size as the detection frame hole 95 in a plan view. The center line of the detection plate hole 217 coincides with the center line CL of the detection recess 91.

Other Embodiments

Although a plurality of embodiments according to the present disclosure have been described above, the present disclosure is not construed as being limited to the abovementioned embodiments, and can be applied to various embodiments and combinations within a scope not departing from the spirit of the present disclosure.

Figure 37:
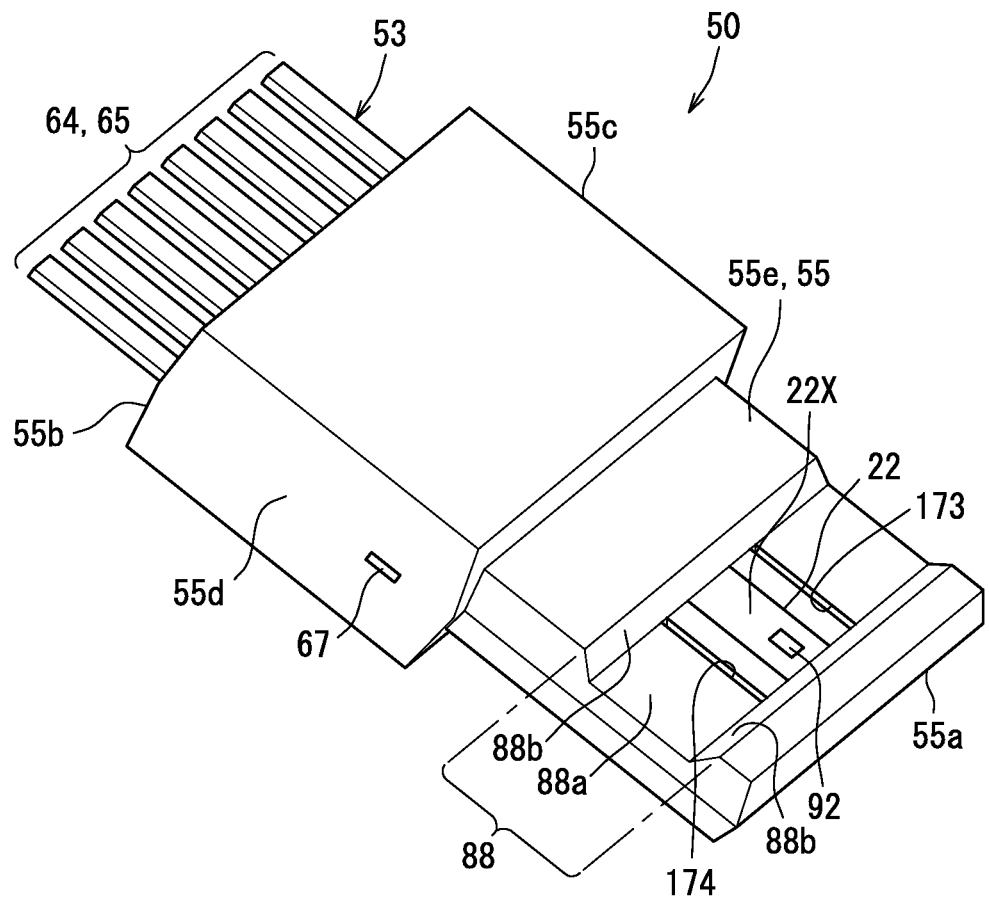
FIG. 37 is a perspective view of the sensor SA in modification 1 as viewed from the front side.

As a first modification, at least one mold recess as a body recess may be provided in the mold unit 55. For example, as shown in FIG. 37, the mold unit 55 is provided with the upstream mold recess 173 and the downstream mold recess 174, but is not provided with the tip end side mold recess 171 and the base end side mold recess 172. In this configuration, in the mold unit 55, the mold recess is provided only inside the front mold groove 88 but not outside thereof. The mold recess may be provided only outside the front mold groove 88.

One mold recess may be provided so as to extend between the inside and the outside of the front mold groove 88. For example, the mold recess is provided at a position where the mold recess crosses over the inner peripheral surface 87b of the front mold groove 88 in the height direction Y. Further, the groove portion as the mold recess may extend in a direction inclined in the height direction Y or the depth direction Z. Further, the mold portion 55 may not be provided with the front mold groove 88.

In the first embodiment, the mold recesses 171 to 174 may be connected to each other to form one rectangular frame-shaped groove. Similarly, in the third embodiment, the processor mold recess 205 may be formed into one rectangular frame-shaped groove portion by connecting a plurality of groove portions to each other.

As a second modification, the body recesses such as the mold recesses 171 to 174 may be provided on at least one of a plurality of surfaces of the outer surface of the mold unit 55. Even when the body recess is provided on each of surfaces, it is sufficient that the body recess may be separated from the flow rate detection unit 22 in the height direction Y and the depth direction Z. For example, the mold recesses 171 to 174 are provided on at least one of the front surface 55e and the back surface 55f of the mold unit 55. As described above, even in the configuration in which the mold recesses 171 to 174 are provided on the back surface 55f, the mold recesses 171 to 174 are provided at positions separated from the back mold hole 87 in the height direction Y and the depth direction Z. Thus, deformation of the flow rate detection unit 22 and the membrane unit 92 can be suppressed.

Similarly, the base recesses such as the base material recesses 181 to 184 may be provided on at least one of a plurality of surfaces of the outer surface of the detection base material 101. Even when the base recess is provided on each of surfaces, it is sufficient that the base recess may be separated from the membrane unit 92 in the height direction Y and the depth direction Z. For example, the base material recesses 181 to 184 are provided on at least one of the front surface 101b and the back surface 101c. As described above, even in the configuration in which the base material recesses 181 to 184 are provided on the surface 101b, the base material recesses 181 to 184 are provided at positions separated from the membrane unit 92 in the height direction Y and the depth direction Z. Thus, deformation of resistors 121, 122, 131 to 134 can be suppressed. Further, in this configuration, it is preferable that the base material recesses 181 to 184 may be provided at positions separated from the resistors 123 to 125, the wiring pattern 141, and the electrode unit 142 in the height direction Y and the depth direction Z. As a result, it is possible to prevent the operating accuracy of the resistors 123 to 125, the wiring pattern 141, and the electrode unit 142 from being lowered by the base material recesses 181 to 184.

As a third modification, the body recesses such as the mold recesses 171 to 174 may extend from the peripheral edge of one surface on which the mold recesses are provided. For example, the tip-side mold recess 171 is configured to bridge between the mold upstream surface 55c and the mold downstream surface 55d in the mold unit 55. In this configuration, the tip-side mold recess 171 extends from the peripheral edge of the surface 55e of the mold unit 55.

Similarly, the base recesses such as the base material recesses 181 to 184 may extend from the peripheral edge of one surface on which the base material recesses 181 to 184 are provided. For example, the tip-side base material recess 181 is configured to bridge between a pair of end surfaces facing each other with the surface 101b sandwiched therebetween in the detection base material 101. In this configuration, the tip-side base material recess 181 extends from the peripheral edge of the surface 101b of the detection base material 101.

As a fourth modification, the shapes and sizes of the mold recesses 171 to 174 may not be limited to the configurations disclosed in each of the above embodiments. For example, the mold recesses 171 to 174 may not have a rectangular cross section. Examples of the cross-sectional shape of the mold recesses 171 to 174 include a triangular shape, a trapezoidal shape, and a semicircular shape. Further, the shapes and sizes of the body recesses such as the mold recesses 171 to 174 may be different from each other.

Similarly, the shapes and sizes of the base material recesses 181 to 184 may not be limited to the configurations disclosed in the above embodiments. For example, the base material recesses 181 to 184 may not have a rectangular cross section. Examples of the cross-sectional shape of the base material recesses 181 to 184 include a triangular shape, a trapezoidal shape, and a semicircular shape. Further, the shapes and sizes of the base recesses such as the base material recesses 181 to 184 may be different from each other.

As a fifth modification, the body recesses such as the mold recesses 171 to 174 may penetrate the mold unit 55 in the width direction X. For example, the mold recesses 171 to 174 are formed as through holes penetrating the surface covering unit 84 of the mold unit 55. In this configuration, the mold recesses 171 to 174 reach the detection frame 61. Therefore, as in the second embodiment, it is preferable that the buffer member 201 as the surface forming portion is provided inside the mold recesses 171 to 174, so that the detection frame 61 is not exposed to the outside through the mold recesses 171 to 174.

As a sixth modification, the body recesses such as the mold recesses 171 to 174 may not extend along the peripheral edge of the surface 22a of the flow rate detection unit 22. For example, the upstream mold recesses 173 provided side by side on the long side of the surface 22a of the flow rate detection unit 22 may extend in a direction orthogonal to the long side of the surface 22a. That is, in the depth direction Z, the upstream mold recesses 173 provided side by side in the flow rate detection unit 22 may extend not in the height direction Y but in the depth direction Z. Further, the mold recesses 171 to 174 may not extend in a groove shape.

Similarly, the mold recesses such as the base metal recesses 181 to 184 may not extend along the peripheral edge of the membrane unit 92. For example, in the depth direction Z, the upstream base material recesses 183 provided side by side in the membrane unit 92 may extend in the depth direction Z instead of the height direction Y. Further, the base metal recesses 181 to 184 may not extend in a groove shape.

As a seventh modification, the body recess may have a shallow shape so as not to reach the flow rate detection unit 22 in the width direction X, or may have a deep shape so as to exceed the flow rate detection unit 22. For example, the bottom surfaces 171a and 172a of the tip end side mold recess 171 and the base end side mold recess 172 are provided between the surface 55e of the mold unit 55 and the surface 22a of the flow rate detection unit 22 in the width direction X. Further, the bottom surfaces 171a to 174a of the mold recesses 171 to 174 are provided between the back surface 55f of the mold portion 55 and the back surface 22b of the flow rate detection unit 22 in the width direction X.

As an eighth modification, the body recesses such as the mold recesses 171 to 174 may not be aligned with the detection frame 61 in the width direction X. For example, the upstream mold recess 173 is provided at a position shifted in the height direction Y with respect to the mounting extension unit 61d of the detection frame 61.

As a ninth modification, the coefficients of thermal expansion of the mold unit 55 and the detection base material 101 may be the same. Further, the coefficients of thermal expansion of the detection base material 101 and the resistor 103 may be the same. As described above, even if the coefficients of thermal expansion are not different, stress may be applied to the flow rate detection unit 22 and the resistors 121, 122, 131 to 134 when the mold unit 55 is deformed due to a temperature change. Further, a case where the mold unit 55 and the flow rate detection unit 22 are deformed includes a case where an external force is applied to the mold unit 55 and the flow rate detection unit 22 in addition to the case where the temperature of the mold unit 55 and the flow rate detection unit 22 changes.

As a tenth modification, the sensor SA 50 may include at least only one of body recesses such as mold recesses 171 to 174 provided in a protection body such as a mold unit 5, and the mold recesses such as the base material recesses 181 to 184 provided in a base portion such as a detection base material 101.

As an eleventh modification, the size of the back mold hole 87 may not be gradually reduced toward the detection frame 61 in the width direction X. For example, the back mold hole 87 is configured to have a uniform thickness at any portion in the width direction X. Further, the back mold hole 87 may not be a round hole. For example, the front end portion 87a of the back mold hole 87 has a rectangular or elliptical shape.

As a twelfth modification, in each of the above embodiments, the front mold groove 88 is formed in the mold unit 55, alternatively the membrane unit 92 of the flow rate detection unit 22 and the front extension area 22X may be exposed on the front side of the sensor SA 50 by forming a hole penetrating the front cover unit 84. Further, in each of the above embodiments, the back mold hole 87 is formed in the back cover unit 85, alternatively a groove communicating with the back opening 95b of the detection frame hole 95 may be formed in the mold unit 55.

As a thirteen modification, the sensor SA 50 may have a physical quantity detection unit that detects a physical quantity different from the flow rate for a fluid such as intake air. Examples of the physical quantity detection unit include a detection unit that detects temperature, a detection unit that detects humidity, and a detection unit that detects pressure.

These detection units may be provided in the measurement flow passage 32 or the overpass flow passage 31 inside the housing 21, or may be provided in the intake passage 12 outside the housing 21. In this case, the sensor SA 50 has a physical quantity processor into which the detection result of the physical quantity detected by the physical quantity detection unit is input.

Although the present disclosure has been described in accordance with the examples, it is understood that the present disclosure is not limited to such examples or structures. The present disclosure also includes various modifications and modifications within an equivalent range. In addition, various combinations and forms, and other combinations and forms including only one element, more, or less than them are also included in the scope and concept of the present disclosure.

What is claimed is:

1. A physical quantity measurement device for measuring a physical quantity of a fluid, the physical quantity measurement device comprising:
   a measurement flow passage through which the fluid flows;
   a physical quantity detector having a plate shape, detecting the physical quantity of the fluid by a detection element in the measurement flow passage, and including the detection element for detecting the physical quantity of the fluid;
   a protection body that protects the physical quantity detector; and
   a body recess arranged on an outer surface of the protection body at a position spaced apart from the physical quantity detector in an orthogonal direction which is orthogonal to a thickness direction of the physical quantity detector;
   wherein the body recess, including its ends, extends in a longitudinal direction, the longitudinal direction of the body recess being in parallel to at least one of a longitudinal direction or a latitudinal direction of the physical quantity detector.

2. The physical quantity measurement device according to claim 1, wherein:
   the physical quantity detector includes a sensor unit having the detection element;
   the outer surface of the protection body has a front surface and a back surface opposite to the front surface in the thickness direction;
   the physical quantity detector is protected with exposing the sensor unit to a front surface side; and
   the body recess is arranged on the front surface.

3. The physical quantity measurement device according to claim 2, wherein:
   the physical quantity detector has a first plate surface disposed on a front surface side of the protection body and a second plate surface disposed on a back surface side of the protection body; and
   a bottom surface of the body recess is disposed between the first plate surface and the second plate surface of the physical quantity detector in the thickness direction.

4. The physical quantity measurement device according to claim 1, wherein:
   the body recess is a groove extending along a peripheral portion of the physical quantity detector in the orthogonal direction.

5. The physical quantity measurement device according to claim 4, wherein:
   the orthogonal direction includes a predetermined specific direction; and
   a length of the body recess is larger than a length of the physical quantity detector in the predetermined specific direction.

6. The physical quantity measurement device according to claim 1, further comprising:
   a detection support that supports the physical quantity detector with mounting the physical quantity detector on a plate surface thereof, wherein:
   the detection support has an extension portion extending from a peripheral portion of the physical quantity detector in the orthogonal direction; and
   the body recess is disposed at a position facing the extension portion in the thickness direction.

7. The physical quantity measurement device according to claim 1, further comprising:
   a surface forming portion arranged inside the body recess to be deformable according to a deformation of the protection body and providing a continuous surface continuously connected to the outer surface of the protection body.

8. The physical quantity measurement device according to claim 1, wherein:
   the physical quantity detector has a base that supports the detection element;
   an outer surface of the base includes a base recess for reducing a stress applied from the base to the detection element due to a deformation of the protection body.

9. The physical quantity measurement device according to claim 1, further comprising:
   a physical quantity processor protected by the protection body and into which a detection result of the physical quantity detector is input, wherein:
   the body recess is disposed on the outer surface of the protection body at a position spaced apart from the physical quantity processor in the orthogonal direction.

10. A physical quantity measurement device for measuring a physical quantity of a fluid, the physical quantity measurement device comprising:
    a measurement flow passage through which the fluid flows;
    a physical quantity detector having a plate shape, detecting the physical quantity of the fluid by a detection element in the measurement flow passage, and including the detection element for detecting the physical quantity of the fluid and a base for supporting the detection element;
    a protection body that protects the physical quantity detector; and
    a base recess arranged on an outer surface of the base at a position spaced apart from the detection element in an orthogonal direction which is orthogonal to a thickness direction of the physical quantity detector; wherein,
    the physical quantity detector having a plate shape includes:
    a first plate surface;
    a second plate surface opposite to the first plate surface;
    a plate surface recess, which is disposed on the second plate surface; and
    a membrane for providing a bottom surface of the plate surface recess, on which the detection element is arranged; and
    the base recess together with the plate surface recess is disposed on the second plate surface.

11. The physical quantity measurement device according to claim 10, wherein:

a detection support that supports the physical quantity detector with mounting the physical quantity detector on a plate surface thereof, wherein:
the base recess is disposed on a facing surface of the outer surface of the base facing the detection support, and is covered by the detection support.

12. The physical quantity measurement device according to claim 10, wherein:
the base recess is a groove extending along a peripheral portion of the base in the orthogonal direction orthogonal to the thickness direction.

* * * * *